(12) United States Patent
Sato et al.

(10) Patent No.: US 7,184,027 B2
(45) Date of Patent: Feb. 27, 2007

(54) TOUCH PANEL, DISPLAY DEVICE AND METHOD OF PRODUCING TOUCH PANEL

(75) Inventors: Koji Sato, Kariya (JP); Kahoru Mori, Nukata-gun (JP); Akito Toyoda, Nishikamo-gun (JP); Masayoshi Muramatsu, Hoi-gun (JP); Masaaki Ozaki, Kariya (JP); Takaharu Idogaki, Okazaki (JP); Tsuneo Uchida, Okazaki (JP); Harumi Suzuki, Kariya (JP)

(73) Assignee: Denso Corporation, Kariya (JP)

( * ) Notice: Subject to any disclaimer, the term of this patent is extended or adjusted under 35 U.S.C. 154(b) by 146 days.

(21) Appl. No.: 10/166,605

(22) Filed: Jun. 12, 2002

(65) Prior Publication Data

US 2002/0180712 A1 Dec. 5, 2002

Related U.S. Application Data

(63) Continuation of application No. PCT/JP01/09014, filed on Oct. 12, 2001.

(30) Foreign Application Priority Data

| Oct. 13, 2000 | (JP) | 2000-313729 |
| Nov. 7, 2000 | (JP) | 2000-339036 |
| Nov. 20, 2000 | (JP) | 2000-353092 |
| Feb. 21, 2001 | (JP) | 2001-045260 |
| Mar. 16, 2001 | (JP) | 2001-076308 |
| Mar. 16, 2001 | (JP) | 2001-076309 |

(51) Int. Cl.
*G09G 5/00* (2006.01)

(52) U.S. Cl. .................................................. 345/173
(58) Field of Classification Search ............... 345/87, 345/156, 173, 174, 175; 178/18.01, 18.03, 178/18.1–18.3; 349/12, 122, 18.03, 153, 349/187, 190; 428/343, 345, 352
See application file for complete search history.

(56) References Cited

U.S. PATENT DOCUMENTS

| 4,875,378 A | | 10/1989 | Yamazaki et al. |
| 5,451,724 A | | 9/1995 | Nakazawa et al. |
| 5,566,027 A | | 10/1996 | Saitoh et al. |
| 5,738,934 A | * | 4/1998 | Jones ........................... 428/220 |
| 5,739,888 A | * | 4/1998 | Ogura et al. ................. 349/153 |
| 5,844,175 A | * | 12/1998 | Nakanishi et al. ......... 178/18.03 |
| 5,926,310 A | | 7/1999 | Tamura et al. |
| 5,955,198 A | | 9/1999 | Hashimoto et al. |
| 6,016,134 A | * | 1/2000 | Ota ............................ 345/104 |
| 6,088,069 A | * | 7/2000 | Farlow ........................ 349/12 |

(Continued)

FOREIGN PATENT DOCUMENTS

| JP | A-S61-131314 | 6/1986 |
| JP | A-S62-50730 | 3/1987 |
| JP | U-S62-62347 | 4/1987 |
| JP | A-S62-163227 | 7/1987 |
| JP | A-S63-4512 | 1/1988 |
| JP | A-S63-204313 | 8/1988 |
| JP | U-S63-143827 | 9/1988 |
| JP | A-S63-284629 | 11/1988 |
| JP | A-H05-173707 | 7/1993 |
| JP | A-H06-44863 | 2/1994 |

(Continued)

*Primary Examiner*—Amare Mengistu
(74) *Attorney, Agent, or Firm*—Posz Law Group, PLC

(57) ABSTRACT

This invention provides a touch panel having excellent durability in a high-temperature high-moisture environment and a production method thereof. In a touch panel 1 including a pair of transparent glass substrates 1a and 2a each having a transparent electrode 1b, 2b and so arranged as to oppose each other through a seal portion 3, a thickness of the seal portion 3 is set to be not greater than 8 μm (exclusive of 0). In this way, moisture permeating through the seal portion 3 and entering a gap between the pair of transparent glass substrates 1a and 2a can be reduced.

27 Claims, 32 Drawing Sheets

U.S. PATENT DOCUMENTS

| | | | |
|---|---|---|---|
| 6,204,906 B1 * | 3/2001 | Tannas, Jr. ................. | 349/153 |
| 6,310,612 B1 * | 10/2001 | Kotsubo et al. ............ | 345/173 |
| 6,310,614 B1 * | 10/2001 | Maeda et al. ............... | 345/173 |
| 6,380,497 B1 * | 4/2002 | Hashimoto et al. ......... | 200/5 A |
| 6,411,344 B2 | 6/2002 | Fujii et al. | |
| 6,461,736 B1 * | 10/2002 | Nagashima et al. ........ | 428/432 |
| 6,495,253 B1 * | 12/2002 | Koyama et al. ............ | 428/343 |
| 6,549,195 B2 * | 4/2003 | Hikida et al. ............... | 345/173 |
| 6,629,833 B1 * | 10/2003 | Ohya et al. ................. | 425/458 |
| 6,884,833 B2 * | 4/2005 | Chheang et al. ............ | 524/445 |
| 2001/0008433 A1 | 7/2001 | Fujii et al. | |
| 2002/0101409 A1 * | 8/2002 | Yokoyama et al. ......... | 345/173 |

FOREIGN PATENT DOCUMENTS

| | | |
|---|---|---|
| JP | A-H06-60765 | 3/1994 |
| JP | A-H06-266491 | 9/1994 |
| JP | A-H07-20993 | 1/1995 |
| JP | U-H07-25428 | 5/1995 |
| JP | A-H07-141086 | 6/1995 |
| JP | A-H08-17288 | 1/1996 |
| JP | 408192492 * | 7/1996 |
| JP | A-H09-146707 | 6/1997 |
| JP | 409146707 A * | 6/1997 |
| JP | U-3048333 | 2/1998 |
| JP | A-H10-63428 | 3/1998 |
| JP | A-H10-133016 | 5/1998 |
| JP | H10-133817 | 5/1998 |
| JP | A-H10-326153 | 12/1998 |
| JP | A-11-149342 | 6/1999 |
| JP | A-H11-174206 | 7/1999 |
| JP | A-H11-212077 | 8/1999 |
| JP | A-H11-242561 | 9/1999 |
| JP | A-H11-297160 | 10/1999 |
| JP | A-2000-10717 | 1/2000 |
| JP | A-2000-20241 | 1/2000 |
| JP | A-2000-112663 | 4/2000 |
| JP | A-2000-207127 | 7/2000 |
| JP | A-2000-276298 | 10/2000 |
| JP | A-2002-82772 | 3/2002 |
| JP | A-2002-196886 | 7/2002 |
| WO | WO 9603672 A1 | 7/1994 |

* cited by examiner

TOUCH PANEL, DISPLAY DEVICE AND METHOD OF PRODUCING TOUCH PANEL

CROSS-REFERENCE TO RELATED APPLICATIONS

This is a continuation of Application PCT/JP01/09014, filed Oct. 12, 2001.

BACKGROUND OF THE INVENTION

1. Field of the Invention

This invention relates to a touch panel disposed on a display front surface of a display device such as a liquid crystal display device, a display device and a method of producing a touch panel.

2. Description of the Related Art (A) Transparent conductive films formed on opposing surfaces of upper and lower substrates of a touch panel are corroded by moisture and have low durability. Therefore, it has been attempted in the past to change the material of the upper and lower substrates from a resin, through which moisture easily permeates, to glass through which moisture does not easily permeate, to improve the durability (Japanese Unexamined Patent Publication (Kokai) No. 10-133817).

However, touch panels for use in a stable domestic environment can satisfy the moisture resistance requirement even with the conventional construction described above but when they are used for a long time in a high-temperature high-moisture environment such as inside an automobile, the conventional construction cannot satisfy the moisture resistance requirement.

It has been found for the first time that, as a result of the observations by the inventor in experiments, the moisture enters a space between a pair of glass substrates opposing each other in a touch panel generally available on the market (a touch panel adopted in a commercial liquid crystal monitor for car navigation) in the course of 400 hours when the touch panel is left standing in a high-temperature high-moisture environment of 65° C. and 95% RH, and the touch panel does not function normally after.

When the thickness of a seal portion (in a sectional direction) that bonds the pair of glass substrates, and is possibly one of the route of invasion of the moisture into the commercial touch panel used for the experiments, was measured, it was found to be 20 µm.

On the basis of the new finding, by the inventor, that invasion of the moisture into the touch panel depends on the thickness of the seal portion, this invention aims at providing a touch panel that can be used for a long time even in a high-temperature high-moisture environment by setting a thickness of a seal portion to a predetermined range so as to avoid invasion of the moisture into a space between a pair of glass substrates by permeating through the seal portion, a display device and a method of producing the touch panel.

(B) As a display device of this kind, a display device is known that arranges a transparent touch switch on a display light outgoing side of a liquid crystal display device of a car navigation apparatus, for example.

While watching switches displayed on the liquid crystal display device, an operator directly touches and operates the surface of the touch panel and has the feeling that the operator is operating the switch displayed on the liquid crystal display device. When such a touch panel is employed, switches that have been arranged in the past at the periphery of the liquid crystal display device can be eliminated, and the operation of the liquid crystal display device becomes easier.

In the construction of the touch panel, however, there are four positions at which the touch panel is in contact with air. That is, they are the outer surfaces of a pair of transparent insulating substrates and the outer surface of transparent conductive films formed on the inner side of the substrates. Reflection of incident light from outside always occurs on these outer surfaces in touch with air, and display of the display device disposed at the back of the touch panel becomes more difficult to see.

When the display device and the touch panel are combined with each other, external light is reflected on the surface of the touch panel, and display light from the display and reflected external light are superposed on each other. It has thus been found that external light reaching the display light outgoing side of the display device is reflected by a polarization plate arranged on the display light outgoing side and makes display light more difficult to watch due to reflected external light in the same way as described above in addition to the problem that display light is difficult to watch for the observer due to the influences of reflected external light.

In a touch panel capable of suppressing reflected light from the touch panel and a display device comprising the combination of this touch panel with a display device, this invention aims at providing a touch panel for such a display device, and a display device capable of suppressing reflected light from the display device and improving the display quality of the display device.

(C) One of the touch panels according to the prior art is described in Japanese Unexamined Patent Publication (Kokai) No. 10-133817 described above.

An explanation will be given more concretely. A seal material consisting of a thermosetting resin for forming a seal portion is printed on a fixed glass substrate. A movable glass substrate having a smaller thickness than the fixed glass substrate is put on the fixed glass substrate. Then, heat is applied to set the seal material while a pressing force is applied to the pair of glass substrates, thereby completing the touch panel.

When the seal material 33' is pressed as shown in FIG. 42 during the production process of this touch panel, the width of the seal material 33' expands to the outside and the inside of the touch panel, and an opposing gap between the pair of glass substrates 31a and 32a becomes small due to the pressing force and the surface tension of the resin of the seal material 33'. When the seal material 33' is thermally set thereafter, the viscosity of the resin expands with the rise of the temperature in the setting process, so that the width of the seal material 33' becomes even greater and the resin is set while the opposing gap becomes small.

As a result, the narrowness of the opposing gap between the pair of glass substrates 31a and 32a created by pressing the glass substrates 31a and 32a in turn invites the problem that so-called "Newton's rings" develop in the seal portion obtained after setting, as shown in FIG. 43. The occurrence of the Newton's rings is particularly remarkable at corner portions 33b of the seal portion 33. Symbol N represents the Newton's ring occurrence area.

To eliminate the Newton's rings, it has been attempted in the past to seal a gas into the space between the pair of glass substrates so as to raise the internal pressure of this space, to expand the movable glass substrate and thus to expand the gap. However, even when the gas is charged into the space between the pair of glass substrates and to raise the internal pressure of the space, the Newton's rings cannot be eliminated.

The inventor of the invention has specifically examined the occurrence position of the Newton's rings and has found that the Newton's rings occur particularly at the corners of the seal portions corresponding to the corner portions at the end portions of the glass substrates.

As to why the occurrence of the Newton's rings cannot be eliminated even when the gas is sealed, the inventors have found the following fact. Because the gas is charged after the seal portion is set, the seal portion is rigid during the expansion process of the glass substrate caused by charging of the gas. Therefore, the seal portion fails to follow the expansion of the glass substrate. When charging of the gas is stopped, the operation of returning the glass substrate to the original state acts on the glass substrate with the result that the gap between the pair of glass substrates is not expanded and the Newton's rings occur.

In view of the observation given above, this invention aims at providing a touch panel capable of preventing the occurrence of the Newton's rings and a production method thereof.

SUMMARY OF THE INVENTION

I. Means for Solving the Problem Described in Paragraph (A) Will be Explained.

To satisfy the requirements in an automobile environment, for example, the inventor set the reference for the touch panel that it should normally operate even after it is left standing in a high-temperature high-moisture environment of 65° C. and 95% RH for 1,000 hrs. If the touch panel can satisfy such a condition, it can satisfy a higher durability requirement than in a domestic environment.

The inventors have found that to satisfy this requirement, a thickness of the seal portion in a sectional direction be set to 8 μm or below (20 μm×400/1,000=8 μm) under the state where the width of the seal portion is set to the same value.

On the basis of this finding, the invention of claim 1 sets the thickness of the seal portion to 8 or below (exclusive of 0). In consequence, the amount of moisture permeating through the seal portion and entering the gap between the pair of glass substrates can be reduced, and a touch panel having a high durability to moisture can be provided.

In claim 2, the thickness of the seal portion is further set to 5 μm or below. When the thickness is 5 or below, the moisture resisting effect can be further promoted, and the touch panel has sufficient durability even in a severe environment such as inside an automobile where the changes of temperature and moisture are remarkable.

When the thickness of the seal portion is reduced, the gap between the pair of glass substrates becomes small. When the thickness of one of the glass substrates having the touch area is set to from 0.2 to 0.4 mm as recited in claim 3, an operation load for touching and conducting the transparent conductive films of the pair of glass substrates becomes small in addition to the small thickness of the seal portion, and an operation factor of the touch panel can be improved.

Incidentally, when the thickness of the glass substrate in the touch area is smaller than 0.2 mm, the operation load of the touch panel becomes excessively small, so that an erroneous operation is likely to occur, in addition the increase of the cost of production of the glass substrate. When the thickness exceeds 0.4 mm, on the contrary, the operation load becomes so great that the touch panel becomes difficult to handle.

More preferably, the lower limit value of the glass substrate is 0.3 mm as stipulated in claim 3. In other words, the touch panel is likely to operate even at such a load that the user does not positively touch the touch area of the touch panel. In the case of the car navigation of the automobile, in particular, the driver tends to touch an intended position while tracing the navigator screen during driving without watching the screen. In such a case, the touch panel is likely to operate during this tracing process. The touch panel is also likely to operate due to vibration such as when the car is driving on a hazardous road.

The preferred thickness of the glass substrate is 0.4 mm as stipulated in claim 4. In other words, when the thickness of the glass substrate is 0.4 mm, a large number of glass substrates can be cut out from a large-sized glass sheet, the glass sheet is suitable for mass-production, and the cost of reduction can be reduced.

The touch area of the touch area is a region encompassed by the seal portion in the glass substrate. The operation load is different between the center of the touch area (center of the glass substrate) and the periphery of the touch area (near the seal portion). The inventor has set the upper limit of the operation load to 200 gf as the upper limit value of the operation load described in Japanese Unexamined Patent Publication (Kokai) No. 10-133817 and the erroneous operation limit value to the lower limit value of 20 gf. When the relationship between the range of the operation load and the thickness of the seal portion is examined in conjunction with the Young's modulus of the glass substrate having the touch area, it has been found that the Young's modulus preferably falls within the range of 730,000 kgf/cm$^2$ to 750,000 kgf/cm$^2$ under the condition that the thickness of the seal portion is 8 μm or below, as stipulated in claim 6. Even the portion in the proximity of the seal portion that requires a high load as the touch load can satisfy the upper limit value of the touch load when the Young's modulus of the glass substrate in the touch area is up to 750,000 kgf/cm$^2$. This means that the touch panel can be touched up to the portion near the seal portion, and most of the touch area can be used.

Preferably, the moisture permeability of the seal portion does not exceed $8 \times 10^{-12}$ g·cm/cm$^2$·sec·cmHg under a predetermined condition as stipulated in claim 7. A material of the seal portion having such a moisture permeability is a thermosetting type epoxy resin as stipulated in claim 8. These claims 7 and 8 can provide a thickness of the seal portion of 8 μm or below. To use a material having a high moisture permeability, for example, the thickness of the seal portion must be reduced much more, and the upper limit value of the thickness of the seal portion reliably becomes smaller than 8 μm. This means that freedom of design of the thickness of the seal portion is reduced.

When the thickness of the seal portion becomes smaller, the Newton's rings start to occur. The Newton's rings make it more difficult to watch the display of the display device having the touch panel assembled thereto. In claim 9, however, a transfer portion for electrically connecting wiring portions respectively formed on the pair of glass substrates is arranged more inward than the seal portion, and the sum of the thickness t1 of the transfer portion and the wiring portions and the thickness t2 of the seal portion are so set as to satisfy the relation t1>t2. Therefore, the glass substrate of the touch area inclusive of the portion near the seal portion can be shaped into an outwardly protruding shape as stipulated in claim 10.

This means that the gap in the proximity of the seal portion can be enlarged, and the occurrence of the Newton's rings near the seal portion can be avoided.

Preferably, the transfer portion for electrically connecting the wiring portions with each other is formed of a conductive particle consisting of a resin particle and a metal film plated to the surface of the resin particle, as stipulated in claim 11. When the transfer portion comprising such a conductive material is employed, the particle diameter of the transfer portion itself can be decreased and does not prevent the thickness of the seal portion from being set to 8 μm or below. In other words, the transfer portion has been formed by using a silver paste in the past, and a particle diameter of the silver particles in the silver paste of at least 5 μm is the machining limit. According to the transfer portion of claim 11 having a structure in which the metal film covers the surface of the resin particles, however, the diameter of the resin particles can be reduced to about 2 μm, for example, and the metal film formed by plating can be set to a thickness of less than 1 μm. Therefore, the diameter of the transfer portion can be reduced to about at most 3 μm, and freedom of design for setting the thickness of the seal portion to 8 μm or below can be increased.

The invention of claim 12 employs the construction in which the seal portion covers the wiring portions. Therefore, as the wiring portions are superposed on the seal portion, the wiring portions need not be secured as independent regions. This means that the areas of the regions of the wiring portion and the region of the seal portion that exist round the outer periphery of the touch switch region (the region in which the transparent conductive film is formed) of the touch panel can be reduced. Therefore, a so-called "narrow frame structure" can be provided. In consequence, the vertical and transverse sizes of the glass substrate of the touch panel can be made smaller than the case where the regions of the wiring portions independently exist provided that the planar area of the touch switch region is the same and eventually, the size of the touch panel can be decreased. From another aspect, the planar area of the touch switch region can be increased, and its function as the switch can be expanded.

In the invention of claim 13, the wiring portions comprise a baked body of an organic metal compound. Organic matters are discharged as a decomposition gas during the baking process of this organic metal compound, and the remaining metal film is extremely thin and has a film thickness of 1 μm or below.

It has been customary in the past to constitute the wiring portions of the touch panel by using a baked body of a silver paste. However, the silver particle of this silver paste has a particle diameter of greater than 5 μm and when such a silver paste is used, the thickness of the seal portion cannot be set to the range of not greater than 8 μm. However, the invention of claim 13 can acquire the wiring portions whose thickness can be set to 1 μm or below, and the thickness of the seal portion can be set to 8 μm or below. Consequently, invasion of the moisture through the seal portion can be avoided.

Incidentally, a metal film having a thickness of 1 μm or below can be formed by means such as vacuum deposition or sputtering, but such means require a large setup. In contrast, when the organic metal compound is used as in claim 13, screen printing is possible and the production process becomes extremely simple.

The invention of claim 14 can exhibit the functions and effects of claims 1 to 9 as a whole. In other words, the invention of claim 14 provides an ideal touch panel that makes it possible to avoid invasion of the moisture into the touch panel by reducing the thickness of the seal portion, to set the operation load of the touch area of the touch panel to a low level while avoiding a misoperation without deteriorating the touch performance, and to avoid the occurrence of Newton's rings while reducing the thickness of the seal portion.

The inventions of claims 15 to 18 can exhibit the functions and effects corresponding to those of claims 5, 10, 11 and 13. Therefore, the inventions of claims 15 to 18 can further promote the functions and effects of the invention of claim 14.

In the invention of claim 19, a polarization plate for damping external light reflected by the outside surface of the glass substrate is directly fitted to the surface outside the glass substrate of the touch area and moreover, the outside surface of the other glass substrate is in direct contact with air. Therefore, the reflection damping effect of external light is equivalent to that of the conventional construction in which a polarization plate and a phase difference plate are provided to one of the glass substrates and a phase difference plate is provided to the other glass substrate. In other words, as these two phase difference plates can be omitted, the cost of the touch panel as a complete product can be reduced.

In the invention of claim 20, the transparent conductive films of the pair of glass substrates are directly exposed to the space throughout their entire surface to the space defined between the pair of glass substrates with the exception of the connection portions with the wiring portions. This is a construction in which the Newton's rings do not easily occur because the glass substrate of the touch area protrudes outward while the thickness of the seal portion of the touch panel is reduced, as already described.

In the conventional touch panels, it has been necessary to form a large number of dot spacers formed of a photo-setting type resin having a predetermined particle diameter on the transparent conductive film of the glass substrate opposite to the glass substrate of the touch area so as to cope with the Newton's rings. In the invention of claim 20, the transparent conductive films are directly exposed into the space between the pair of substrates, and a part of the transparent conductive films is not covered with the dot spacers. Since the formation of the dot spacers is not necessary, the cost of production can be reduced.

The invention of claim 21 specifies the application of the touch panel of the invention to the application for automobiles. When applied to automobiles, the touch panel of the invention can exhibit the effects of claims 1 to 20. It becomes thus possible for the first time to accomplish a touch panel that can withstand the use in a high-temperature high-moisture environment such as inside the automobiles.

In the invention of claim 22, the touch panel is disposed on the display side of the car navigation display. The invention of claim 22 can exhibit the same function and effect of that of claim 21, and can accomplish a car navigation touch panel free from the erroneous operation as described already. Because the touch panel of the invention can operate at a low touch load even in the proximity of the seal portion, the touch area, that is, a switching portion, can be set in the proximity of the seal portion of the touch panel. Therefore, a touch panel having a large quantity of switching portions, that is, a large quantity of information, can be provided.

The invention of claim 23 specifies the display to a liquid crystal display. The liquid crystal display is thin and compact. As the touch panel according to the invention is as thin as 8 μm or below, the compactness of the liquid crystal display is not spoiled when the touch panel of the invention is combined with the liquid crystal display.

According to claims 24 and 25, the display device comprising the combination of the touch panel of the invention with a display does not spoil compactness of the display as described in claim 23, and can contribute to the reduction of the size of the display device as a whole.

In claim 26, a pair of transparent glass substrates each having a transparent conductive film formed thereon is so arranged that the substrates oppose each other through a seal material. A gap between the pair of glass substrates is expanded before the seal material is set, and after the gap is expanded, the seal material is set. Because the seal material that impedes expansion of the gap is not yet set but can undergo plastic deformation, deformation of the pair of glass substrates for expanding the gap is not impeded. Therefore, the gap can be easily expanded and can keep an expanded state, and the occurrence of the Newton's rings can be avoided. In claim 26, when the pair of glass substrates is pressed through the seal material, the thickness of the seal material is set to 8 μm or below as a predetermined thickness. Therefore, the gap between the pair of glass substrates becomes uniform. Though the glass substrates expand during the expansion process of the gap between the pair of glass substrates, they can smoothly expand and the occurrence of swell on the surface of the glass substrates after expansion can be avoided. Consequently, the occurrence of the Newton's rings can be more reliably avoided.

Here, a gas can be charged into the gap between the pair of glass substrates to expand the gap as stipulated in claim 29. In this case, as the seal material is not yet set at the time of charging of the gas, the seal material has flexibility and can undergo plastic deformation. Therefore, the seal material undergoes plastic deformation in such a fashion as to follow the expansion of the glass substrates during the charging process of the gas into the space, and the glass substrates uniformly expand and keep this expansion even after the stop of charging of the gas. Because of the uniform expansion of the glass substrates, the gap between the pair of glass substrates expands and keeps the expansion state. Consequently, the occurrence of the Newton's rings can be avoided.

In claim 30, gas is charged into the space between the pair of glass substrates while no pressure is applied to them, and the problem that the seal material cannot undergo plastic deformation during the expansion of the glass substrate can be avoided. Therefore, the glass substrates can expand without stress, and the effects of claims 26 and 29 can be more improved.

The method described in claim 31, that does not impart the pressure to the glass substrates during setting of the seal material, is preferred. In other words, if the pressure is imparted to the glass substrates under the state where the glass substrates are once expanded and the occurrence of the Newton's rings is avoided, swelling is likely to develop on the glass substrates and the Newton's rings can again occur in some cases. When the seal material is set while no pressure is imparted to the pair of glass substrates as described in claim 31, however, the occurrence of swelling on the glass substrates can be avoided.

According to the invention of claim 27, the touch panel is produced while the transparent conductive films of the pair of glass substrates are directed exposed into the space between the pair of glass substrates throughout their entire surfaces with the exception of the their connection portions with the wiring portions, thereby omitting the step of forming of the dot spacers of the prior art described in claim 20. Therefore, the production steps of the touch panel can be simplified and the cost of production can be reduced.

The invention of claim 28 discloses a production method of a touch panel using a transfer portion having a specific structure. This production method can exhibit the same function and effect as the function and effect described in claim 11.

II. Next, Means for Solving the Problem Described in the Foregoing Paragraph (B) Will be Explained. The Features of this Solution Means Are Basically as Follows.

(1) A touch panel including a pair of transparent insulating substrates each having a transparent conductive film and arranged in such a fashion to oppose each other on the side of the transparent conductive films through a seal portion, one of the pair of transparent insulating substrates having a touch area, wherein a first light diffusion portion is provided to an outside surface of one of the transparent insulating substrates keeping touch with air, and a second light diffusion portion is provided to at least one of the outside surface of the other transparent insulating substrate and the outside surface of each of the transparent conductive films that keeps touch with air.

(2) The touch panel described in (1), wherein the second light diffusion portion is provided to the outside surface of at least one of the transparent conductive films.

(3) The touch panel described in (1), wherein the second light diffusion portion is provided to the outside surface of the other transparent insulating substrate.

(4) The touch panel described in (1), wherein the second light diffusion portion is provided to the outside surface of the other transparent insulating substrate and to the outside surface of each of the transparent conductive films.

(5) The touch panel described in (1), wherein the first and second light diffusion portions comprise concavo-convex portions.

(6) A touch panel including a display device for emitting display light, and a touch panel arranged on the display light outgoing side of the display device and having a pair of mutually opposing substrates each having a transparent conductive film, wherein a light diffusion portion is provided to a surface of the display device on the display light outgoing side, a surface of one of the electrode substrates on the opposite side to the display outgoing side of the display device of the pair of the electrode substrates of the touch panel and on the incidence side of display light from the display device keeps direct touch with air, and a light diffusion portion is provided to a surface of the display device on the display light outgoing side.

(7) A display device according to (6), wherein the display device is a liquid crystal display device, the liquid crystal display device is equipped with a pair of polarization plates for liquid crystal display, the surface of one of the polarization plates on the display light outgoing side from the liquid crystal display device has the light diffusion portion described above, the surface of the other electrode substrate of the touch panel has the light diffusion portion, and a reflection prevention plate having the light diffusion portion is arranged on the surface of the other electrode substrate of the touch panel.

(8) The display device according to (7), wherein the light diffusion portion comprises a concavo-convex portion.

(9) The display device according to (7), wherein the reflection prevention plate comprises a polarization plate and a concavo-convex portion formed on the display light outgoing side of the polarization plate.

(10) The display device according to (9), wherein an absorption axis of the polarization plate of the reflection prevention plate is in conformity with an absorption axis of one of the polarization plates of the liquid crystal display device.

(11) A display device according to (8), wherein a spectral transmission factor of the touch panel inclusive of the polarization plate is substantially flat within the range of the display light outgoing wavelength from the liquid crystal display, and the touch panel inclusive of the polarization plate permits permeation of display light within the whole display light outgoing wavelength range.

(12) A display device according to (6), wherein the surface of either one of the transparent electrodes of the touch panel keeping touch with air has a concavo-convex portion.

(13) A display device according to (6), wherein the surface of one of the electrode substrates of the touch panel keeping touch with air has a concavo-convex portion.

(14) A liquid crystal display device including a display device for emitting display light and a touch panel arranged on the display light outgoing side of the display device and having a pair of mutually opposing substrates each having a transparent electrode, wherein a transparent fluid is arranged between a surface of the display device on the display light outgoing side and a surface of one of the electrode substrates opposite to the display light outgoing side of the display device among the pair of electrode substrates, and a light diffusion portion is provided to a surface of the other electrode substrate on the opposite side to the display device and on the display light outdoing side of the display device among the pair of electrode substrates.

(15) A liquid crystal display device including a display device for emitting display light and a touch panel arranged on the display light outgoing side of the display device and having a pair of mutually opposing substrates each having a transparent electrode, wherein a surface of the display device on the display light outgoing side and a surface of one of the electrode substrates opposite to the display light outgoing side of the display device among the pair of electrode substrates are bonded by using a transparent adhesive, and a surface of the other electrode substrate opposite to the display device and on the display light outgoing side of the display device among the pair of electrode substrates has a light diffusion portion.

(16) The display device according to (15), wherein the display device is a liquid crystal display device, the light diffusion portion comprises a polarization plate and the concavo-convex portion formed on the display light outgoing side of the polarization plate, the polarization plate to be arranged on the opposite side to the touch panel among the polarization plates for conducting liquid crystal display of the liquid crystal display device is conjointly used by the polarization plate provided to the touch panel, and an absorption axis of the polarization plate of the liquid crystal display device crosses that of the polarization plate of the touch panel.

These constructions will be explained in further detail.

According to the invention (1), the first light diffusion portion is provided to the outside surface of one of the transparent insulating plates having the touch area and keeping touch with air, and the second light diffusion portion is provided to at least one of the outside surface of the other transparent insulating substrate and the outside surface of the transparent conductive film of each of these transparent insulating substrates. Therefore, these first and second light diffusion portions diffuse external light incident into the touch panel. It is therefore possible to prevent external light from being inputted to the eyes of the operator operating the touch panel.

According to the invention (2), the light diffusion portion is provided to the outside surface of at least one of the transparent conductive film. This construction, too, can provide the same effect as that of the invention (1). Since the light diffusion portion is provided to the transparent conductive film, it can be easily formed at the time of formation of the transparent conductive film.

According to the invention (3), the second light diffusion portion is provided to the outside surface of the other transparent insulating substrate. Therefore, the same effect as that of the invention (1) can be obtained.

According to the invention (4), the second light diffusion portion is provided to the outside surface of the whole construction of the touch panel. Therefore, the reflection suppressing effect of external light is great.

According to the invention (5), the concavo-convex portion has a simple construction as the light diffusion portion and can effectively diffuse light.

According to the invention (6), the light diffusion portion is provided to the surface of the display device for emitting display light on the display light outgoing side, the surface of the electrode substrate opposing the display device of the touch panel keeps direct touch with air, and the light diffusion portion is provided to the surface of the touch panel on the display light outgoing side. Therefore, the light diffusion portion provided to this surface diffuses external light incident into the surface of the display device of the touch panel on the display light outgoing side. On the other hand, the light diffusion portion provided to the surface of the display device on the display light outgoing side diffuses external light incident into the display device through the touch panel, and external light is prevented from again passing through the touch panel. Since external light is prevented from overlapping with display light from the display device and from reaching the eyes of the observer, the display quality of the display device can be improved.

In the invention (6), the invention (7) employs the construction wherein the display device is a liquid crystal display device, the light diffusion portion is provided to one of the pair of polarization plates of the display device for liquid crystal display on the display outgoing side, and a reflection prevention plate having a light diffusion portion is arranged on the surface of the other electrode substrate of the touch panel. Therefore, the reflection prevention plate can prevent reflection of external light on the surface of the touch panel, and the light diffusion portion utilizing the polarization plate of the liquid crystal display device can suppress reflection of external light on the surface of the display device. The invention (7), in particular, is based on the invention (6) as the premise, and the surface of the electrode substrate opposing the display light outgoing side of the liquid crystal display device inside the touch panel keeps direct touch with air. Therefore, when display light is incident into the touch panel and passes through this touch pane, it is not modulated. Consequently, quality of display light is not deteriorated. For these reasons, the invention (7) can suppress not only the influences of external light but also degradation of quality of display light itself. In consequence, degradation of display light can be further prevented.

In the invention (7), the light diffusion portion may comprise the concavo-convex portion as described in (8) and the reflection prevention plate of the touch panel may comprise a polarization plate and a concavo-convex portion formed on the display light outgoing side of this polarization plate. In this case, the concavo-convex portion is simple means for coping with diffusion of display light, can effectively diffuse display light and can further suppress the influences of external light.

When the polarization plate is employed as the reflection prevention plate of the touch panel as in the invention (9), contrast of the liquid crystal display device can be improved. In this case, the absorption axis of the polarization plate of the reflection prevention plate and the absorption axis of one of the polarization plates of the liquid crystal display device preferably coincide with each other. Consequently, when display light outgoing from the liquid crystal display device passes through the polarization plate of the touch panel, display light is not absorbed by the polarization plate and hence, the drop of luminance of display light can be prevented.

According to the invention (11), the spectral transmission factor of the touch panel inclusive of the polarization plates is substantially flat within the range of the display light outgoing wavelength from the liquid crystal display device. As a result, the touch panel inclusive of the polarization plates has characteristics to permeate light within the whole range of the display light outgoing wavelength from the liquid crystal display device, and it becomes possible to suppress the changes of luminance and chromaticity of display light from the liquid crystal display device.

According to the invention (12), the concavo-convex portion is disposed on the surface of either one of the transparent electrodes of the touch panel that keeps touch with air. Therefore, the concavo-convex portion can diffuse external light reflected by the transparent electrodes themselves of the touch panel and the influences of external light can be further suppressed.

Such an effect can also be accomplished by disposing the concavo-convex portion on the surface of one of the electrode substrates of the touch panel keeping touch with air as in the invention (13).

The inventions (14) and (15) employ the construction in which the display device for emitting display light and the touch panel are bonded while the transparent fluid or the transparent adhesive is interposed between them, and the light diffusion portion is provided to the surface of the electrode on the display light outgoing side among the pair of transparent electrode substrates of the touch panel. When the refractive index of the transparent fluid is set to be match with that of the transparent substrates of the touch panel and the display device, the transparent fluid can suppress reflection of external light much more than when the opposing portion between the touch panel and the display device is the air layer. Also, the light diffusion portion of the touch panel can suppress reflection of external light.

In this case, when the display device (15) is constituted as the liquid crystal display device as in the invention (16), the light diffusion portion comprises the polarization plate and the concavo-convex portion formed on the display light outgoing side of the polarization plate, and the polarization plate provided to the touch panel functions also as the polarization plate to be arranged on the opposing side to the touch panel among the polarization plates for conducting liquid crystal display of the display device. Further, the absorption axis of the polarization plate of this touch panel preferably crosses the absorption axis of the other polarization plate of the liquid crystal display. According to this construction, when display light of the liquid crystal display device passes through the touch panel, the liquid crystal of the liquid crystal display device twists display light in the polarization plate of the touch panel, and display light outgoes from the touch panel while keeping the twisted direction. Therefore, contrast of display light can be improved. The transparent fluid, the transparent adhesive and the concavo-convex portion of the polarization plate diffuse external light. Therefore, the invention (16) described above can suppress the influences of external light while the contrast of display light from the display device is improved, and can provide a display having high quality.

III. Next, means for solving the problems described in paragraph (C) will be explained. The features of the solution means are as follows.

(17) A touch panel including a pair of transparent insulating substrates each having a transparent conductive film and arranged in such a fashion to oppose each other with a gap on the side of the transparent conductive films, and to form a space between them through a seal portion having corners corresponding to corners of the end portions of the transparent insulating substrates, wherein at least the opposing gap of the opposing portion at each corner of the end portion of the pair of transparent insulating substrates is set so that it becomes wide at a portion adjacent to the inside of the space with the corner of the seal portion being the boundary and relatively narrow at a portion adjacent to the outside of the space.

(18) A touch panel including a pair of transparent insulating substrates each having a transparent conductive film and arranged in such a fashion to oppose each other with a gap on the side of the transparent conductive films, and to form a space between them through a seal portion having corners corresponding to corners of the end portions of the transparent insulating substrates, wherein at least the opposing gap of the opposing portion at each corner of the end portion of the pair of transparent insulating substrates is set so that it becomes wide at a portion adjacent to the inside of the space with the corner of the seal portion being the boundary and relatively narrow at a portion adjacent to the outside of the space, and a thickness of at least the corner portion of the seal portion is great on the inner circumferential side adjacent to the space than on the outer circumferential side.

(19) The touch panel according to (17) or (18), wherein the sectional shape of at least the corner of the seal portion has a wedge shape so that at least the opposing gap at the opposing portion of the corner of the end portion of the pair of transparent insulating substrates is wide at a portion adjacent to the inside of the space with the corner of the seal portion being the boundary and is narrow at a portion adjacent to the outside of the space.

(20) The touch panel according to (17) or (18), wherein the opposing gap at the whole opposing portion of the end portion of the pair of transparent insulating substrates is set so that it is wide at a portion adjacent to the inside of the space with the seal portion being the boundary and is narrow at a portion adjacent to the outside of the space.

(21) The touch panel according to (17) or (18), wherein the whole sectional shape of the seal portion is substantially wedge shape.

(22) The touch panel according to (17) or (18), wherein one of the pair of transparent insulating substrates has an outwardly protruding shape from the inside to the outside of the space.

(23) The touch panel according to (17) or (18), wherein the pair of transparent insulating substrates each comprise a glass substrate.

(24) A method for producing a touch panel including a pair of transparent insulating substrates each having a transparent conductive film and arranged in such a fashion to oppose each other on the side of the transparent conductive films through a seal portion, comprising the steps of arranging the pair of glass substrates in such a fashion as to oppose each other through the seal portion; expanding a gap between the pair of glass substrates at a pre-stage to setting of the seal material; and setting said seal material.

(25) A method for producing a touch panel according to (24), wherein the gap is expanded by charging a gas into the space between the pair of glass substrates.

(26) A method for producing a touch panel according to (25), wherein the pair of glass substrates are pressed after they are so arranged to oppose each other through the seal portion, and the seal portion is reduced to a predetermined thickness.

(27) A method for producing a touch panel according to (25), wherein a gas is further charged into the space after the seal portion is set.

(28) A method for producing a touch panel according to (25), wherein the gas is charged into the space under the state where no pressure is applied to the pair of glass substrates.

(29) A method for producing a touch panel according to (24), wherein setting of the seal portion is conducted under the state where a pressure is not imparted to the pair of glass substrates.

(30) A method for producing a touch panel according to (24), wherein the seal portion contains a thermosetting type resin, and only heat is imparted to the pair of glass substrates, but pressure is not imparted to the pair of glass substrates, when the thermosetting type resin is set.

(31) A method for producing a touch panel according to (24), wherein a portion of one of the glass substrates corresponding to the seal portion is allowed to undergo deformation in such a fashion as to reduce the seal portion to a predetermined thickness by applying a pressure to the portion corresponding to the seal portion with the exception of the touch area of one glass substrate of the pair of glass substrates, so that the gap between the pair of glass substrates is much more reduced in a portion in the proximity of the seal portion than in the touch area and eventually, the gap of the touch area is expanded relatively in comparison with the portion in the proximity of the seal portion.

(32) A method for producing a touch panel according to (31), wherein setting of the seal portion is conducted under the state where a pressure is applied to portions of the pair of glass substrates with the exception of the touch area that correspond to the seal portion.

(33) A method for producing a touch panel according to (31), wherein one of the glass substrates on the touch area side of the pair of glass substrates has a smaller thickness than the other glass substrate, and the pressure is applied from the side of one of the glass substrates having a smaller thickness.

Hereinafter, these inventions will be explained in further detail.

The invention (17) provides the touch panel including the pair of transparent insulating substrates each having the transparent conductive film, wherein the pair of transparent insulating substrates are so arranged as to oppose each other with the gap as to define a space through the seal portion, and the seal portion has the corners corresponding to the corners at the end portions of the transparent insulating substrates. At least the opposing gap at the opposing portion of each corner at the end portion of the pair of transparent insulating panel is set in such a fashion as to become wide at the portion adjacent to the inside of the space with the corner of the seal portion as the boundary and relatively narrow at the portion adjacent to the outside of the space. Therefore, the Newton's rings that remarkably occur at the corners of the seal portion can be avoided.

According to the invention described in (18), the thickness of at least the corner of the seal portion is greater on the inner peripheral side than on the outer peripheral side. When the seal portion having such a construction is employed, at least the opposing gap at the opposing portion of the corners at the end portions of the pair of transparent insulating substrates can be set to be wide at the portions adjacent to the inside of the space, with the corners of the seal portion as the boundary, and to be relatively small at the portions adjacent to the outside of the space. As a result, the Newton's rings that remarkably occur at the corners of the seal portion can be avoided. According to this invention (18), the opposing gap at the corners can be easily expanded when the thickness of the seal portion is set to a predetermined thickness.

According to the invention (19), at least the corner of the seal portion has a wedge-shaped sectional shape. Therefore, the opposing gap continuously expands, and the occurrence of the Newton's rings can be further avoided.

According to the inventions (20) and (21), the opposing gap can be expanded throughout the entire range of the transparent insulating substrates not only at the corners of the seal portion but also at other portions. Therefore, it is possible to provide a touch panel that is almost free, or completely free, from the occurrence of the Newton's rings in the touch panel as a whole.

Incidentally, if one of the insulating substrates has a protruding shape from inside to the outside of the space as in the invention (22), the occurrence of the Newton's rings can be more effectively avoided.

Similar effects can be acquired when the pair of transparent insulating substrates comprises glass substrates as in the invention (23).

Japanese Unexamined Patent Publication (Kokai) No. 6-44863 as a prior art example discloses a construction in which a wedge-shaped spacer or separator is disposed at a seal portion of an outer periphery, the spacer or separator is a double-face adhesive tape, and insulating substrates are bonded to the upper and lower surface of the tape. In this prior art example, the wedge-shaped spacer or separator enlarges an opposing gap between the upper and lower insulating substrates so as to prevent short-circuit between transparent conductive films respectively disposed on the upper and lower insulating substrates. However, the wedge shape is discontinuous at the corners of the end portions of the upper and lower insulating substrates, and the wedge-shaped spacer or separator cannot be disposed at the corners. Therefore, it is not possible to set the opposing gap of the pair of insulating substrates at the corners so that the opposing gap becomes wide a portion adjacent to the inside of the space with each corner of the seal portion as the boundary and narrow at a portion adjacent to the outside of the space. In other words, this prior art example has a concept entirely different from that of the present invention.

According to the invention (24), the pair of transparent insulating substrates each having the transparent conductive film are so arranged as to oppose each other through the seal portion, the gap between the pair of insulating substrates is expanded before the seal portion is set, and after the gap is expanded, the seal portion is set. Therefore, the gap that would otherwise be an obstacle is not yet set when the gap is expanded, and can undergo plastic deformation. Because deformation of the pair of glass substrates is not impeded by the expansion of the gap, the gap can be easily expanded and keeps the expanded state. Accordingly, the occurrence of the Newton's rings can be avoided.

Here, the gap between the pair of insulating substrates can be expanded by charging the gas into the space of the pair of insulating substrates as in the invention (25). Since the seal portion is not yet set at the time of charging of the gas in this case, the seal portion is more flexible than when it is set and can undergo plastic deformation. When the gas is charged into the space, the seal portion follows expansion of the insulating substrates and undergoes plastic deformation. In consequence, the insulating substrates uniformly expand and keep the expansion after charging of the gas is stopped. Therefore, the gap between the pair of insulating substrates expand with the uniform expansion of the insulating substrates and can keep that state, and the occurrence of the Newton's rings can be avoided.

When the pair of insulating substrates is pressed through the seal portion as in the invention (26), the seal portion is crushed to a predetermined thickness with the result that the gap between the pair of insulating substrates becomes uniform. This uniform expansion is further promoted during the process in which the gas is subsequently charged into the space to expand the insulating substrates, and surface swell of the insulating substrates after expansion can be avoided. Consequently, the occurrence of the Newton's rings can be avoided further reliably.

When the Newton's rings still occur due to surface swell of the insulating substrates to a certain extent even after the seal portion is set after expansion of the insulating substrates, the surface swell can be corrected by further charging the gas into the space of the pair of insulating substrates after setting of the seal portion to further expand the insulating substrates as in the invention (27). Therefore, the occurrence of the Newton's rings after setting of the seal portion can be eliminated.

In the invention (28) described above, the gas is charged into the space while no pressure is applied to the pair of insulating substrates and in this way, it becomes possible to avoid the problem that the seal portion cannot undergo plastic deformation at the time of expansion of the insulating substrates. Therefore, the effects of (25) and (26) can be further promoted.

When the seal portion is set, the method of (29) that does not impart the pressure to the insulating substrates is preferred. In other words, when the pressure is imparted to the insulating substrates under the state where they are once expanded to avoid the occurrence of the Newton's rings, swell is likely to develop in the insulating substrates and the Newton's rings again occur in some cases. The occurrence of swell on the insulating substrates can be avoided when the seal portion is set while no pressure is imparted to the pair of insulating substrates as in the invention described in (13).

Incidentally, when the material containing the thermosetting type resin is used for the seal portion as in the invention (14), a method is suitable that imparts only heat to the pair of insulating substrates but does not impart the pressure at the time of setting of the seal portion, as in the invention (14).

Methods for expanding the gap between the pair of insulating substrates includes the method that imparts the pressure to the portions one of the pair of insulating substrates having the touch area that correspond to the seal portion with the exception of the touch area, and causes deformation of these portions so as to reduce the seal portion to a predetermined thickness. Eventually, this method expands relatively much more the gap having the touch area than portions in the proximity of the seal portion.

In this method, too, because the seal portion is not yet set, the seal portion undergoes plastic deformation at the deformation stage of one of the insulating substrates, and the pair of insulating substrates can undergo deformation. Therefore, the gap between the pair of insulating substrates can be expanded. As a result, the occurrence of Newton's rings can be avoided.

In this case, the seal portion may be set while the pressure is imparted to the portions of one of the insulating substrates corresponding to the seal portion with the exception of the touch area when the seal portion is set, as in the invention (32). The application of the pressure to the seal portion can improve seal performance. In this case, since no pressure is imparted to the touch area, swelling does not develop even when the pressure is applied to one of the insulating substrates, and the occurrence of the Newton's rings can be avoided.

In the invention described in (33), one of the insulating substrates of the pair of insulating substrates on the touch area side is set to a smaller thickness than the other insulating substrate, and the pressure is imparted from the side of one of the insulating substrates having a smaller thickness. Therefore, deformation of the insulating substrates becomes easy, and no problem occurs during expansion of the gap between the pair of insulating substrates.

When the pair of transparent insulating substrates comprises glass substrates as in the invention (34), similar effects can be accomplished in the same way as in the inventions of (24) to (33).

DETAILED DESCRIPTION OF THE PREFERRED EMBODIMENTS

The following embodiment 1, modified embodiment of the embodiment 1, embodiment 2 and other embodiments solve the problems described in the foregoing paragraph (A).

[Embodiment 1]

Figure 1:
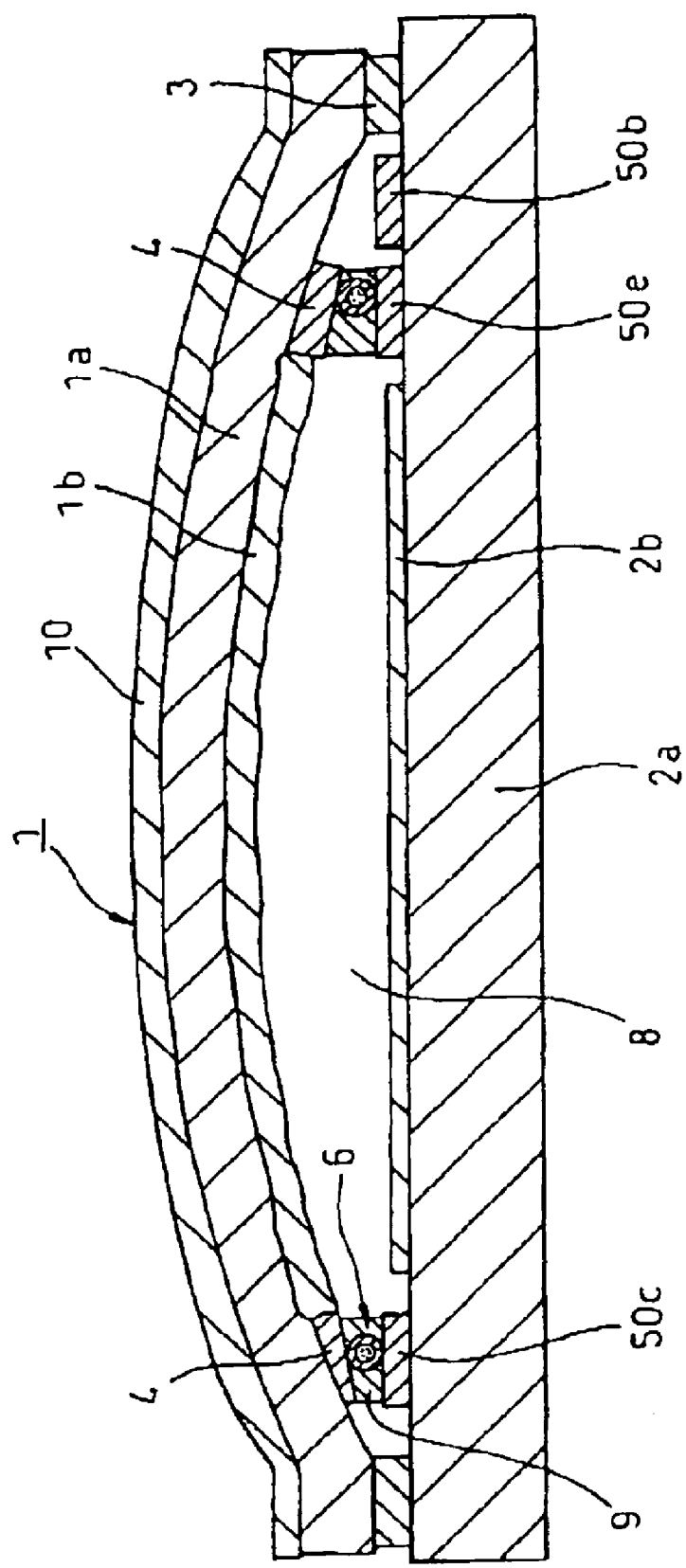
FIG. 1 shows an embodiment 1 of a touch panel, and is a sectional view taken along a line I—I of FIG. 6.
Figure 16:
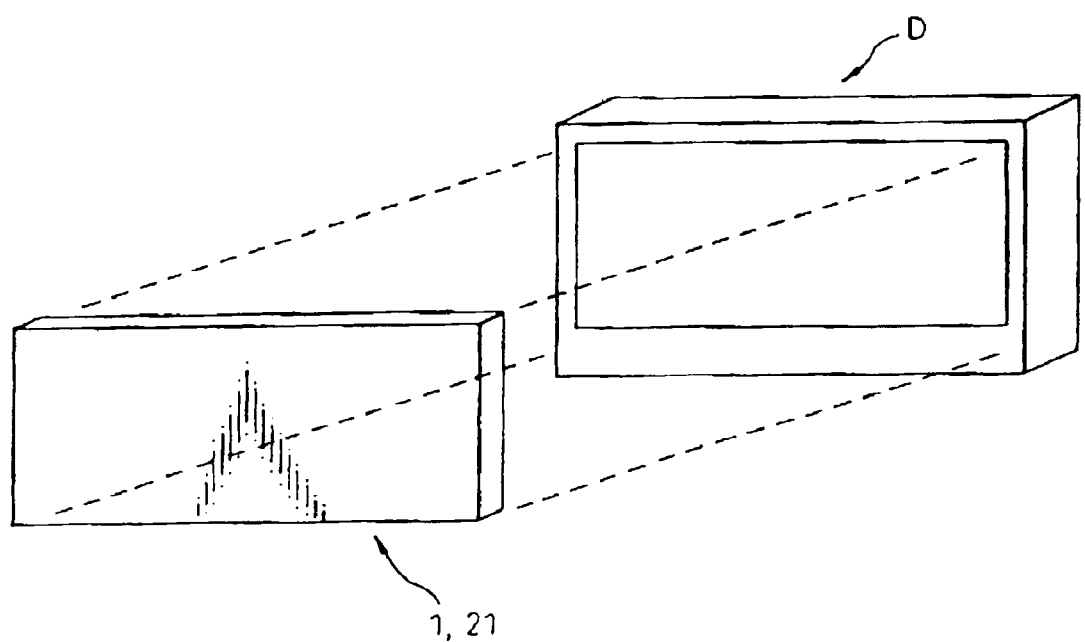
FIG. 16 is a conceptual view showing the arrangement state of the touch panel of the embodiment 1.

FIGS. 1 to 6 represent the embodiment 1. In FIG. 1, reference numeral 1 denotes a touch panel. This touch panel 1 is arranged on a display side of a car navigation liquid crystal display device D as shown in FIG. 16. The touch panel 1 is used as a switch for changing the display state of the liquid crystal display device D as shown in FIG. 1, and includes a pair of glass substrates 1a and 2a that are bonded and fixed to one another through a seal portion 3 in such a fashion as to define a space portion 8.

One of the glass substrates 1a has a touch area an operator of the touch panel 1 operates with fingers. When operated, this touch area moves slightly due to flexible deformation. The other glass substrate 2a is fixed on a display side of the liquid crystal display device D.

The glass substrates 1a and 2a are formed of a lead boro-silicate glass material, for example. One of the glass substrate 1a has a thickness of 0.4 mm while the other 2a has a thickness of 1.1 mm.

Figure 4:
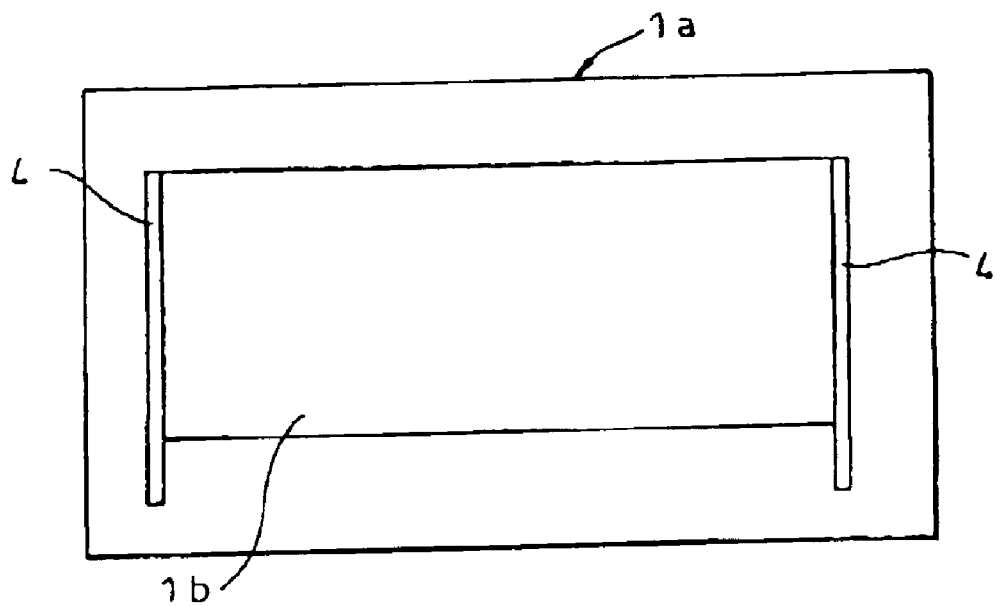
FIG. 4 is a plan view of a glass substrate on a touch area side in the embodiment 1.
Figure 5:
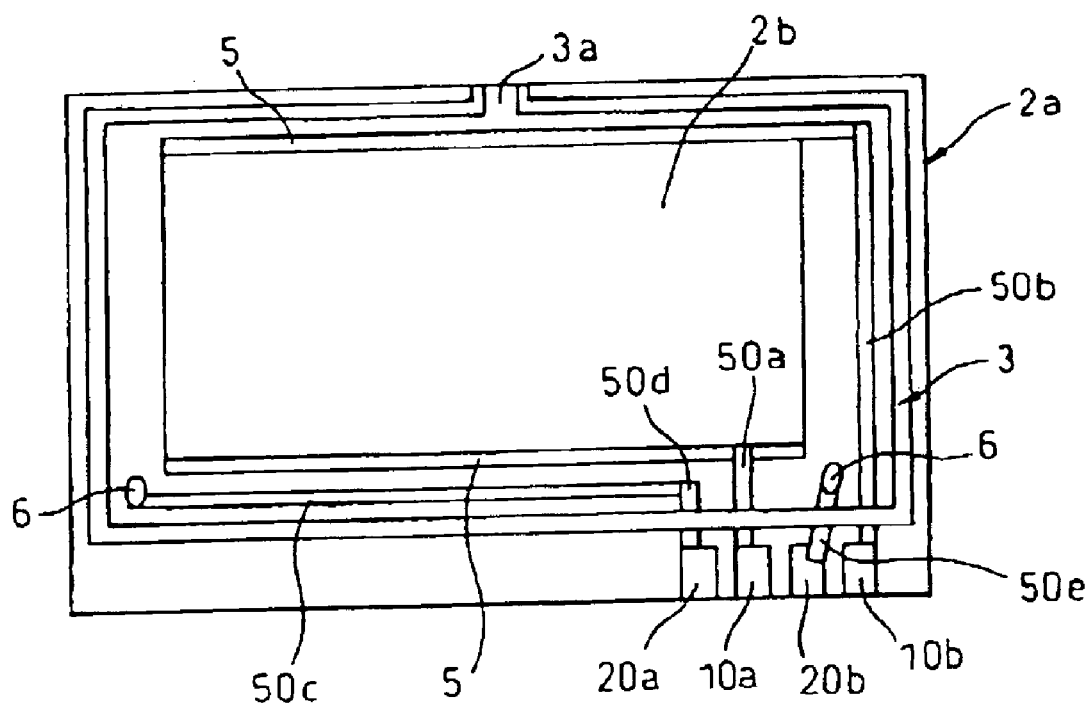
FIG. 5 is a plan view of another glass substrate in the embodiment 1.
Figure 6:
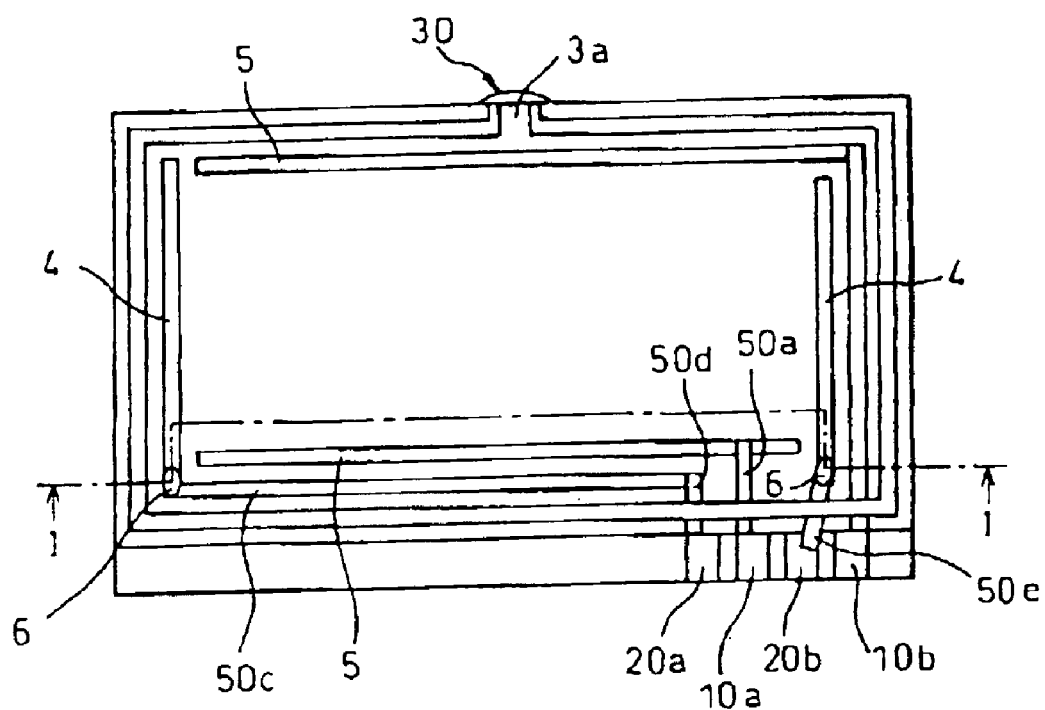
FIG. 6 is a plan view showing the state where a glass substrate shown in FIG. 4 and a glass substrate shown in FIG. 5 are put one upon another.

Transparent conductive films 1b and 2b are respectively formed on these glass substrates 1a and 2a. The transparent conductive film 1b of the glass substrate 1a has a rectangular shape as shown in FIG. 4. Wiring portions 4 are formed on the glass substrate 1a for establishing electric connection with opposing two sides of the transparent conductive film 1b (right and left end portions in FIG. 4). Similarly, the transparent conductive film 2b of the glass substrate 2a has a rectangular shape as shown in FIG. 5. Wiring portions 5 are formed on the glass substrate 2a for establishing electric connection with opposing two sides of the transparent conductive film 2b (upper and lower end portions in FIG. 5).

On the glass substrate 2a are formed a wire branch portion 50a, a wire branch portion 50b, a wire branch portion 50c, a wire branch portion 50d, a wire branch portion 50e, terminal portions 10a and 10b forming a pair, and terminal portions 20a and 20b forming a pair.

Of the wiring portions 5, the wiring portion 5 on the upper side is electrically connected to the terminal portion 10b through the wire branch portion 50b, and the wiring portion 5 on the lower side is electrically connected to the terminal portion 10a through the wire branch portion 50a. An electric connector (not shown) for supplying a power source is connected to these terminal portions 10a, 10b, 20a and 20b.

When the glass substrate 1a and the glass substrate 1b are superposed with each other, the wire branch portions 50c and 50d electrically connect the wiring portion 4 on the right side of the class substrate 1a (see FIG. 4) to the terminal portion 20a, and the wire branch portion 50e electrically connects the wiring portion 4 on the left side to the terminal portion 20b. A transfer portion 6 establishes these electrical connections. In other words, the transfer portion 6 is clamped between the wiring portion 4 on the right side of the glass substrate 1a (see FIG. 4) and the wire branch portion 50e of the glass substrate 2a and between the wiring portion on the left side of the glass substrate 1a (see FIG. 4) and the wire branch portion 50c of the glass substrate 2a, and these members are electrically connected to one another.

The transfer portion 6 comprises a resin particle 6a and a metal film 6b formed on the surface of the resin particle 6a. Incidentally, the transfer portion 6 is formed by use of a dispenser at positions corresponding to the portions described above by adding conductive particles (6a, 6b), having the construction described above, into a retaining material made of the same material as that of the seal portion 3. The member formed of this retaining material is indicated as a retaining body 9.

Figure 2:
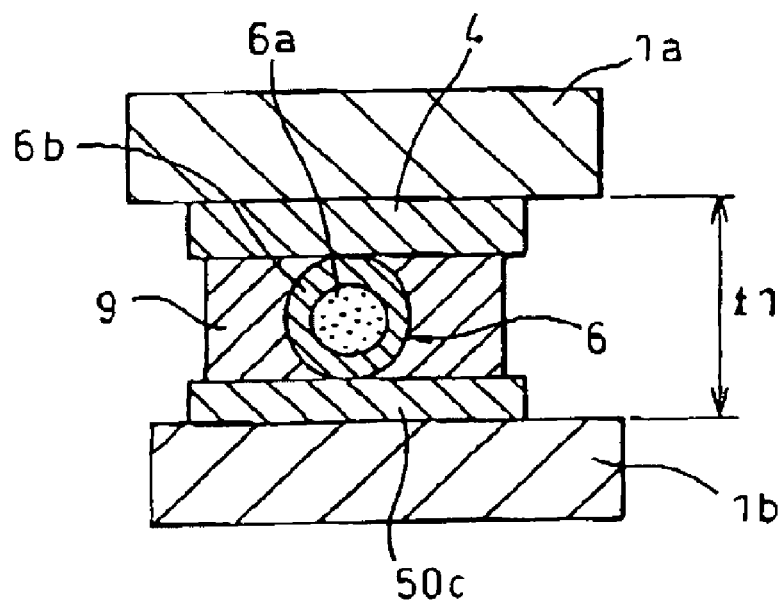
FIG. 2 is a sectional view showing a connection relation between a transfer portion as a principal portion of the embodiment 1 and a wiring portion.
Figure 3:
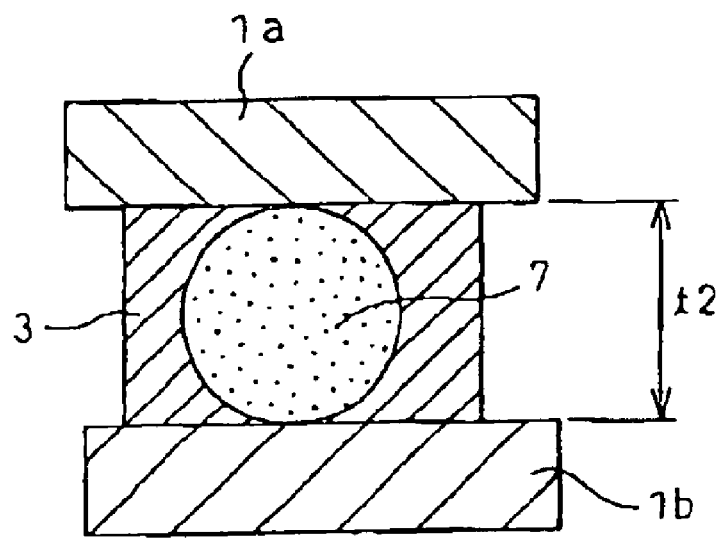
FIG. 3 is a sectional view showing a seal portion as another principal portion of the embodiment 1.

As shown in FIGS. 2 and 3, the sum of the thickness t1 of the transfer portion 6, the wiring portion 4 and the wiring portion 50c and the thickness t2 of the seal portion 3 are so set as to satisfy the relation t1>t2. Because of this relation, the glass substrate 1a of the touch panel has a drum-like shape that protrudes outward as shown in FIG. 1.

The pair of glass substrates 1a and 2a is superposed, bonded and fixed to each other through the seal portion 3 in such a fashion that their transparent conductive films 1b and 2b face each other and the space 8 can be formed between them through a gap.

During the production process of the touch panel, the seal portion 3 is disposed at the outer peripheral edge portion of the glass substrate 2a, that is, outside the transparent conductive film 2b, the vertical wiring portion 5 and the wire branch portions 50b and 50c. A seal port 3a is formed at one position and is sealed by a sealant 30.

The seal portion 3 is formed of a thermosetting type epoxy resin having a moisture permeability of $4.12 \times 10^{-12}$ g·cm/cm$^2$·sec·cmHg at 65° C. and 95% RH. The sealant 30 is formed of a UV-setting type acrylic resin having a moisture permeability of $4.35 \times 10^{-11}$ g·cm/cm$^2$·sec·cmHg at 65° C. and 95% RH. The full length of the seal portion 3 sealing the outer periphery of the touch panel is approximately 532 mm. Since the seal port 3a has a width of 4 mm, the moisture permeability of the sealant 30 can be neglected. A spacer particle 7 having a diameter of about 3 μm such as a silica spacer or a glass fiber is mixed into the seal portion 3 as shown in FIG. 3.

Incidentally, the thickness of the seal portion 3 is set to 3 μm and the maximum gap between the glass substrates 1a and 2a is set to 10 μm in FIG. 1.

A polarization plate 10 is bonded to the outside surface of the glass substrate 1a of the touch panel 1. The polarization plate 10 damps external light that is to be incident into the touch panel 1. The outside surface of the other glass substrate 2a is directly exposed to air.

[Modified Embodiment of Embodiment 1]

Figure 7:
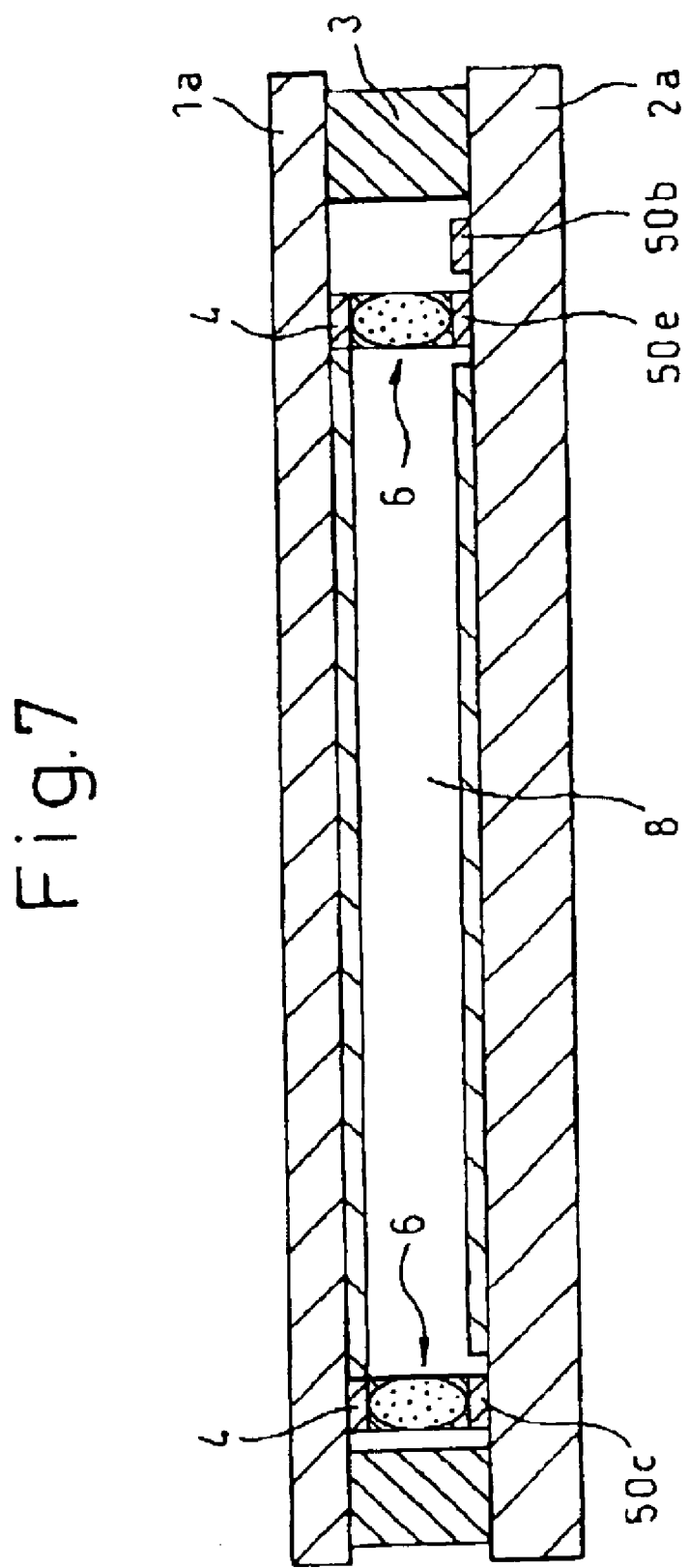
FIG. 7 shows a modified embodiment of the embodiment 1, and is a sectional view taken along a line VII—VII of FIG. 8.
Figure 8:
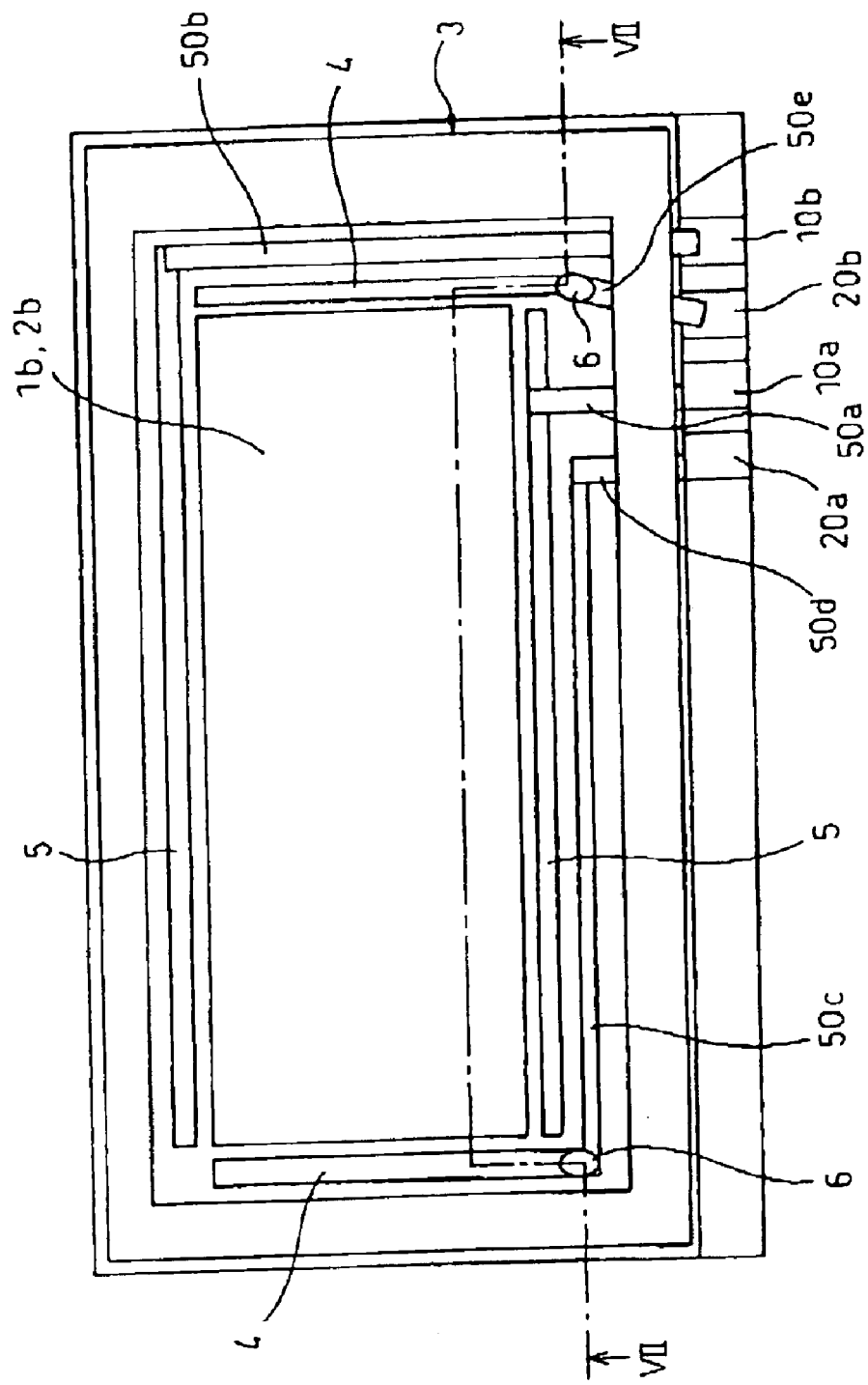
FIG. 8 is a plan view showing a modified embodiment of the embodiment 1.

FIGS. 7 and 8 shows a modified embodiment of Embodiment 1. This modified embodiment is different from Embodiment 1 in only that the space 8 between the pair of glass substrates 1a and 2a is not expanded unlike Embodiment 1, and the rest of the constructions are the same as those of Embodiment 1.

The relative positions of the seal portion 3, the wiring portions 4 and 5 and the wire branch portions 50a to 50e are shown in FIGS. 7 and 8. FIG. 7 is a sectional view taken along a line VII—VII of FIG. 8, and FIG. 8 is a projection view when the pair of glass substrates 1a and 2a is superposed and viewed from the side of the glass substrate 1a. With respect to transparent conductive films 1b and 2b, only a portion where they are superposed is shown in FIG. 8 although, in fact, the transparent conductive films 1b and 2b are electrically connected to wiring portions 4 and 5 respectively. In addition, this is the case with the after-described embodiments in which a pair of glass substrates is superposed. Thus, transparent conductive films on glass substrates are shown only at a superposed portion in such embodiments.

[Embodiment 2]

Figure 9:
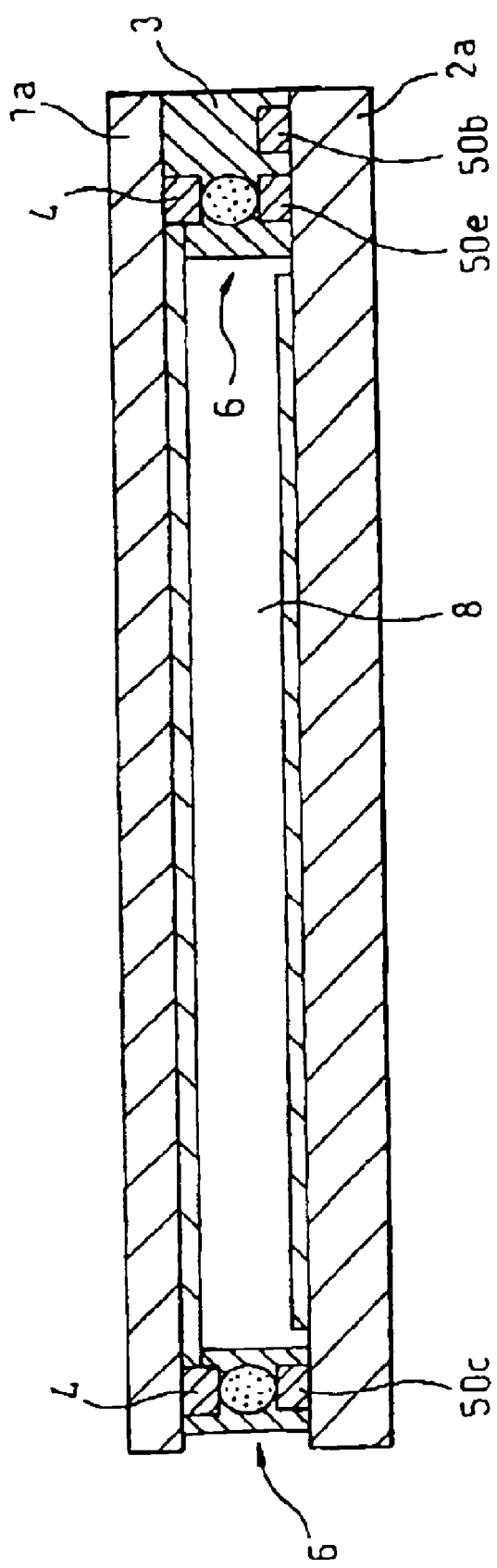
FIG. 9 shows an embodiment 2, and is a sectional view taken along a line IX—IX of FIG. 10.
Figure 10:
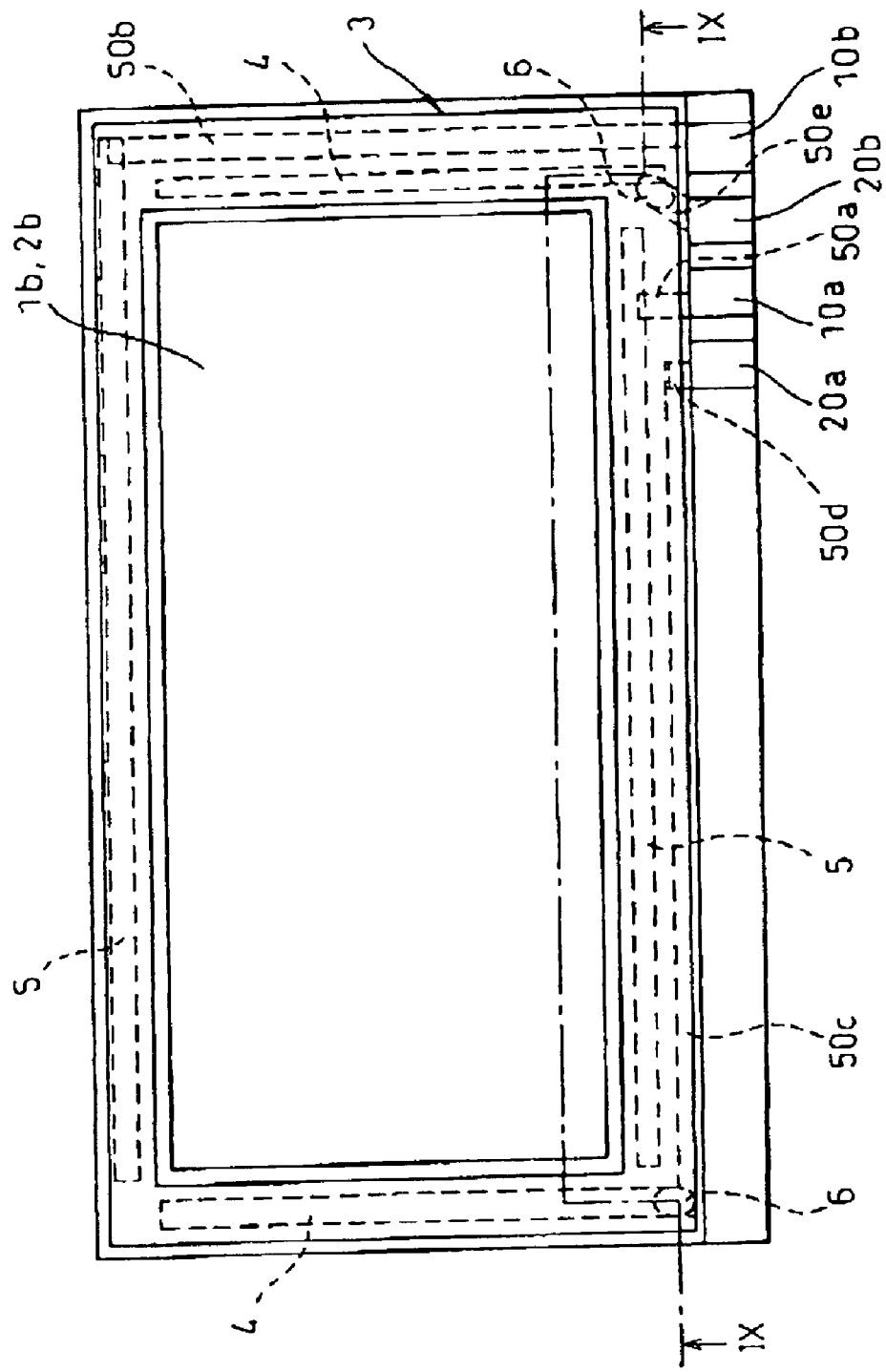
FIG. 10 is a plan view of the embodiment 2.
Figure 11:
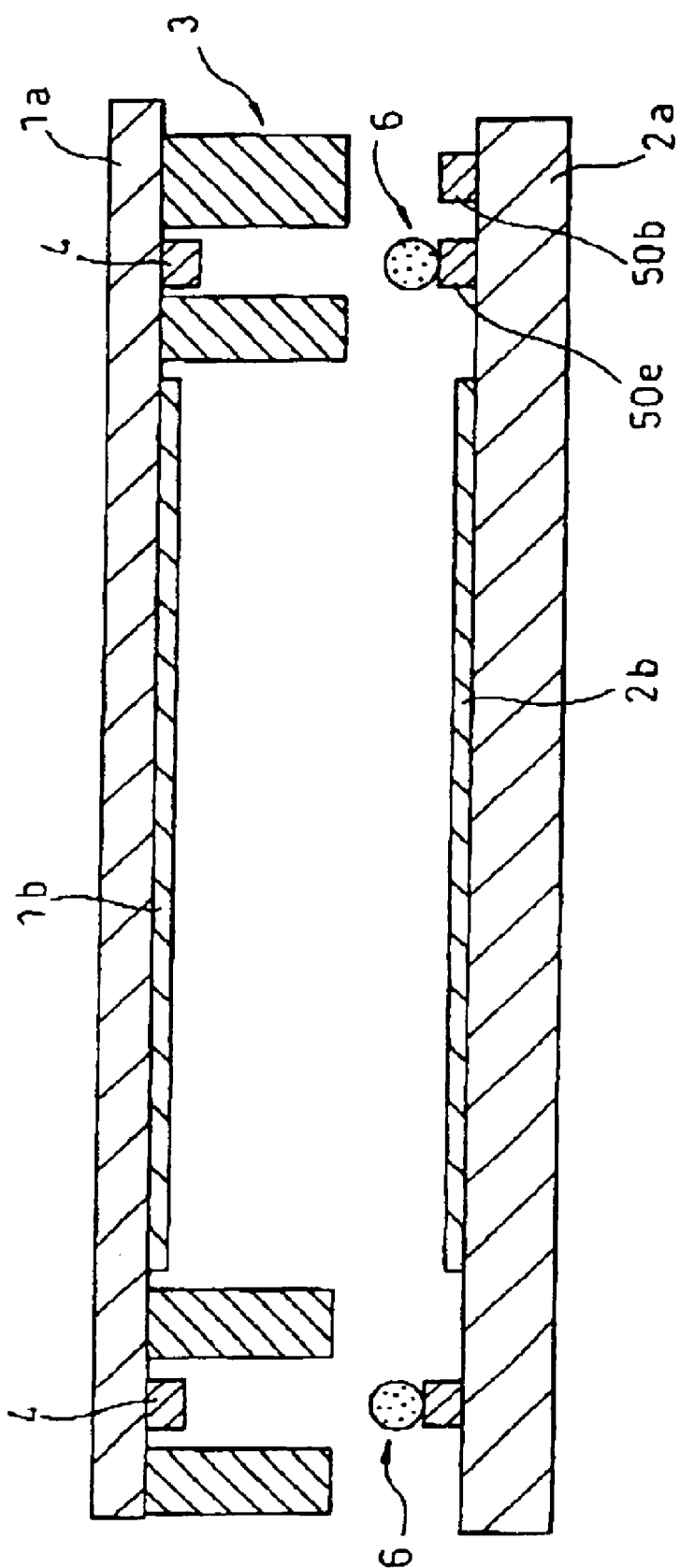
FIG. 11 is a sectional view useful for explaining a production method of the embodiment 2.

FIGS. 9 to 11 depict Embodiment 2. This Embodiment 2 is different from Embodiment 1 in only that the seal portion 3 is so set as to cover the wiring portions 4 and 5 and the wire branch portions 50b and 50c in Embodiment 1, and the rest of the constructions are the same as those of Embodiment 1. In Embodiment 2, the swelling drum shape of the glass substrate 1a on the touch area side in Embodiment 1 is omitted from the drawings.

As shown in FIGS. 9 and 10, in particular, the wiring portions 4 and 5 and the wire branch portions 50b and 50c are buried into the seal portion 3 to achieve a so-called "narrow frame structure" in which the sum of the area of the wiring portions 4 and 5, the area of the wire branch portions 50b and 50c and the area of the seal portion that exist on the outer periphery of the touch switch region of the touch panel can be reduced.

According to this Embodiment 2, the areas of the wiring portions 4 and 5 and the wire branch portions 50b and 50c overlap with the area of the seal portion 3. Therefore, the independent areas as the wiring portions 4 and 5 and wire branch portions 50b and 50c can be eliminated.

EXAMPLE 1

Figure 12:
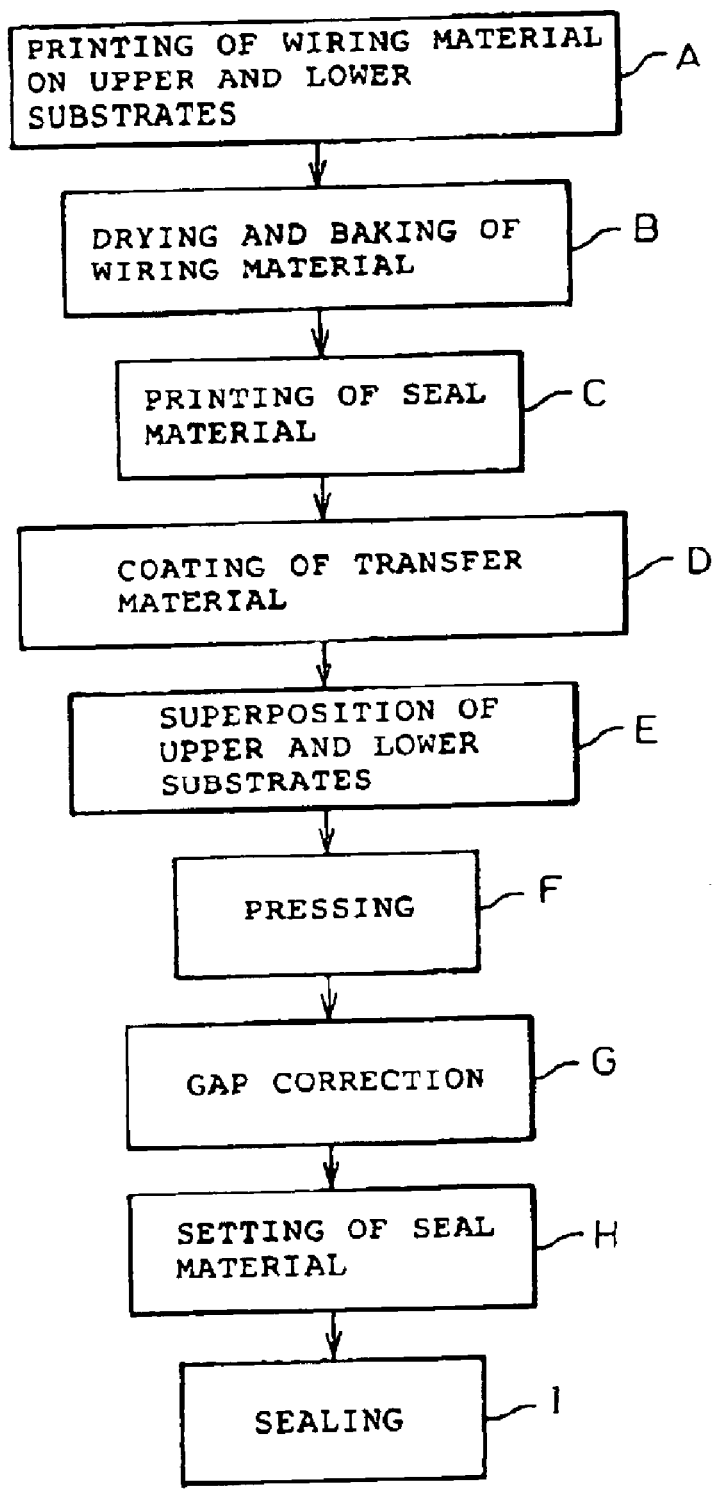
FIG. 12 is a flowchart useful for explaining a production method of the embodiment 1.

Next, a production method of the touch panel according to Embodiment 1 described above will be explained. FIG. 12 shows the process flow of the production method, and the explanation will be given with reference to this flowchart. In Step A, a glass substrate 1a (thickness: 0.4 mm) and a glass substrate 2a (thickness: 1.1 mm) each having a transparent conductive film 1b, 2b formed in advance thereon are prepared, and wiring portions 4 and 50a to 50e and terminal portions 10a, 10b, 20a and 20b are printed by using an organic metal compound on each glass substrate 1a, 2a in accordance with a screen printing method. The thickness after printing is about 10 μm.

Here, an organic acid is mixed with a coordination compound of an aliphatic acid silver and an amine to form the organic metal compound. More concretely, the organic metal compound has a composition consisting of 35 to 45% of the aliphatic acid silver, 10 to 20% of dihydroterpineol, 10 to 20% of 1,2-diaminocyclohexane, 10 to 20% of cyclohexanecarbonic acid, 1 to 10% of acetic acid and 1 to 5% of phthalic anhydride. The aliphatic acid silver is expressed by R—COOAg. R is an alkyl group such as a methyl group, an ethyl group, a propyl group, and so forth. This example uses a product XE102-25 of Namix K. K.

In the next Step B, each glass substrate 1a, 2a having the wiring portion 4, the wire branch portions 50a to 50e and the terminal portions 10a, 10b, 20a, 20b and 5 formed thereon is dried at 150° C. for 10 minutes and is then baked at 280° C. for 60 minutes. As a result of these drying and baking steps, the coordination compound of aliphatic acid silver is decomposed and silver precipitates. Because amine, the organic acid and the aliphatic acid are discharged as the decomposition gas, the thickness of the wiring portion 4, the wire branch portions 50a to 50e and the terminal portions 10a, 10b, 20a and 20b after baking is about 1 μm in the sectional direction and the specific resistance is $8 \times 10^{-6}$ Ω·cm.

In Step C, the seal portion 3 is formed by screen printing in such a fashion as to leave the seal port 3a round the outer periphery of one of the glass substrates 2a. Silica spacers and a thermosetting type epoxy resin having a moisture permeability of $4.12 \times 10^{-12}$ g·cm/cm$^2$·sec·cmHg at 65° C. and 95% RH are mixed to prepare a material of this seal portion 3. This example uses a product obtained by blending 0.8wt % of "Hi-Precica" (trademark) N3N (particle diameter: 2.8 μm) of Ube-Nitto Kasei K. K. with "Structbond" (trademark) XN-31A-A of Mitsui Chemical Co.

In Step D, the transfer portion 6 is formed on the glass substrate 2a as shown in FIG. 5. A transfer material prepared by adding 2 wt % of a conductive particle (particle diameter: 3.5 μm) obtained by plating gold to the surface of a resin particle is applied to the glass substrate 2a by using a dispenser to form this transfer portion 6. The conductive particle is "Micro-Pearl" (trademark) AU-2035 (gold plating) of Sekisui Kagaku K. K.

In Step E, the pair of glass substrates 1a and 2a are put one upon another and in the next Step F, the pair of glass substrates 1a and 2a is pushed at a pressure of 0.1 to 3 kg/cm$^2$ through a jig. In consequence, the seal portion 3 is crushed to a uniform thickness of about 3 μm throughout its entire periphery.

After Step F is carried out, the glass substrates 1a and 2a are bonded to each other. Therefore, Newton's rings develop on the entire surface when this assembly is observed with eye from the glass substrate 1a side.

Therefore, in Step G, air is charged between the pair of glass substrates 1a and 2a. In other words, air set to a discharge pressure of 5 Kg/cm$^2$ is charged into the space 8 between the glass substrates 1a and 2a from the seal port 3a of the seal material 3 through an air-charging machine (not shown), and charging of air is stopped. Thereafter, the pair of glass substrates 1a and 2a bonded to each other is separated, and the Newton's rings disappear.

Under the condition after charging of air, the gap between the glass substrates 1a and 2a is large at the central portion and is small at the peripheral portion, and the glass substrate 1a has the drum-like shape as shown in FIG. 1. Incidentally, since the glass substrate 1a has a smaller thickness, it exhibits a swelling condition. FIG. 1 exaggeratedly illustrates this swelling state for ease of understanding.

The drum-like shape is achieved when the total thickness t1 at the transfer portion 6 and the thickness t2 of the seal portion 3 satisfy the relation t1>t2 as described already. The condition shown in FIG. 1 is maintained even after charging of air is stopped.

In the next Step H, the pair of glass substrates 1a and 2a is placed into a furnace (not shown) and is then left standing at 150° C. for one hour to thermally set the seal portion 3. Incidentally, no pressure is imparted to the portion of the seal member 3 of the pair of glass substrates 1a and 2a.

After setting of the seal portion 3 is complete, the pair of glass substrates 1a and 2a is withdrawn from the furnace and is naturally cooled down to the room temperature. When the pair of glass substrates 1a and 2a is examined, the drum-like shape prior to setting of the seal portion 3 is as such maintained. The occurrence of the Newton's rings is not confirmed at this time.

In Step I, a sealant 30 made of a UV setting type acrylic resin (3052B) of Three-Bond Co. is applied to the seal port 3a of the seal portion 3, and UV is irradiated (accumulated light power: 1,000 mJ/cm$^2$) to set the sealant 30.

The touch panel is completed through the process steps described above.

Next, the superiority of this invention will be explained by various experimental examples.

EXPERIMENTAL EXAMPLE 1

The touch panel having the construction of Example 1 and produced by the process steps A to I was left standing in a high-temperature high-moisture environment of 65° C. and 95% RH. Even after the passage of 1,000 hours, the touch panel was found to operate normally. When the touch panel was disassembled, invasion of the moisture into the space between the pair of glass substrates was not observed, and corrosion of the transparent conductive film and each wiring portion was not observed, either.

COMPARATIVE EXAMPLE 1

A prior art example will be explained. A touch panel was produced basically on the basis of the steps shown in FIG. 12. This example is different from Example 1 in that the seal portion had a thickness of 20 μm, each wiring portion was a baked body of silver paste having a silver particle of 5 μm and the transfer portion was formed by applying a paste-like material having a silver particle of 5 μm by means of a dispenser.

When the touch panel of this Comparative Example 1 was left standing in a high-temperature high-moisture environment of 65° C. and 95% RH in the same way as in Example 1, an operation defect of the touch panel occurs at 400 hours. When this touch panel was disassembled, corrosion was partially observed in the transparent conductive films of the pair of glass substrates and in each wiring portion. This means that the moisture enters the space between the pair of glass substrates.

EXPERIMENTAL EXAMPLE 2

An experiment was carried out to examine how an operation load changes in accordance with the relation between the thickness of the glass substrate on the touch area side and the thickness of the seal portion when the operation load to the glass substrate was set to from 20 to 200 gf. The result is shown in FIGS. 13 to 15.

The touch panel used for this experiment was produced by the production method of Embodiment 1, and has a diagonal size of 6 inches.

Figure 13:
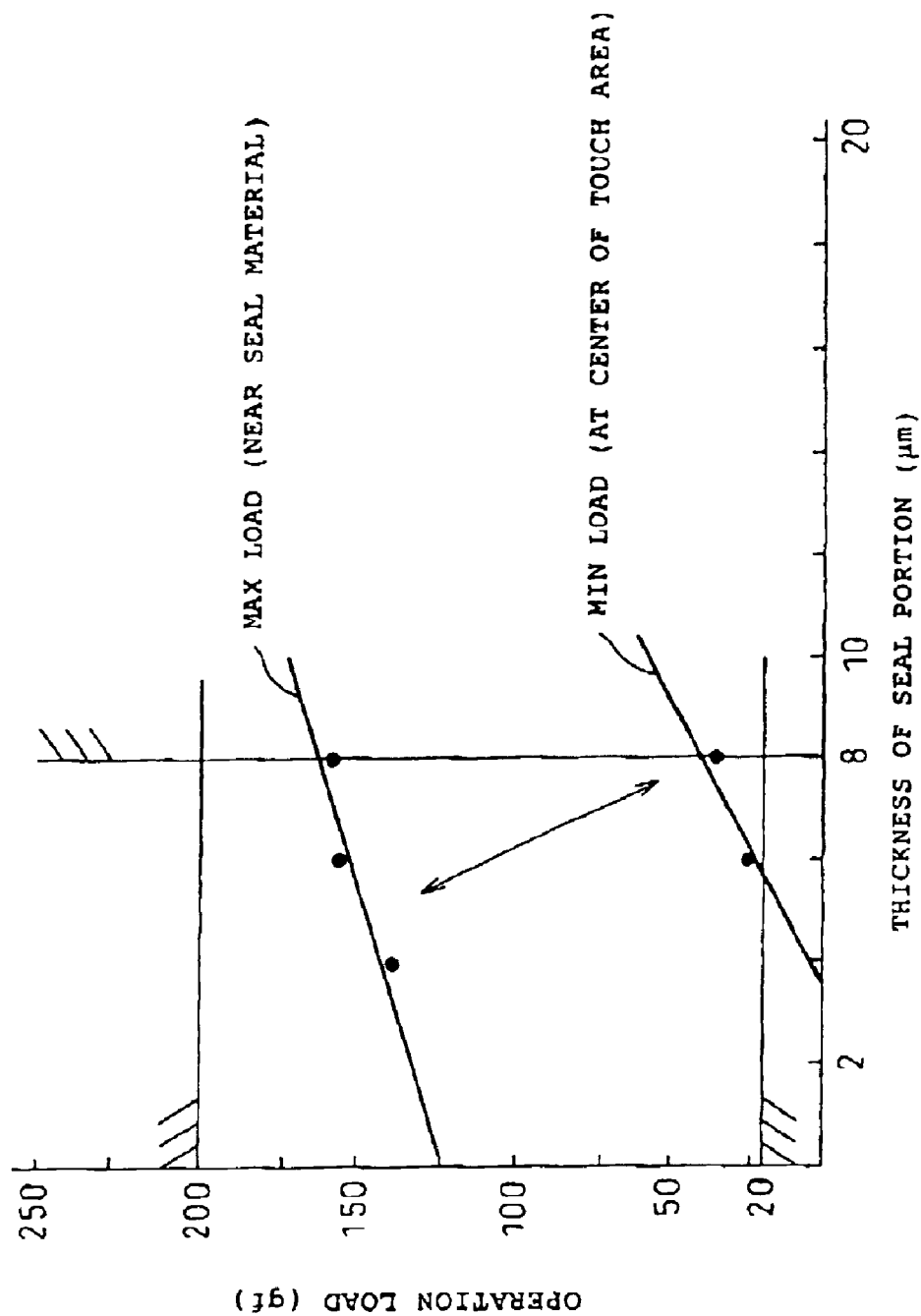
FIG. 13 is a graph useful for explaining an experimental example 2.
Figure 14:
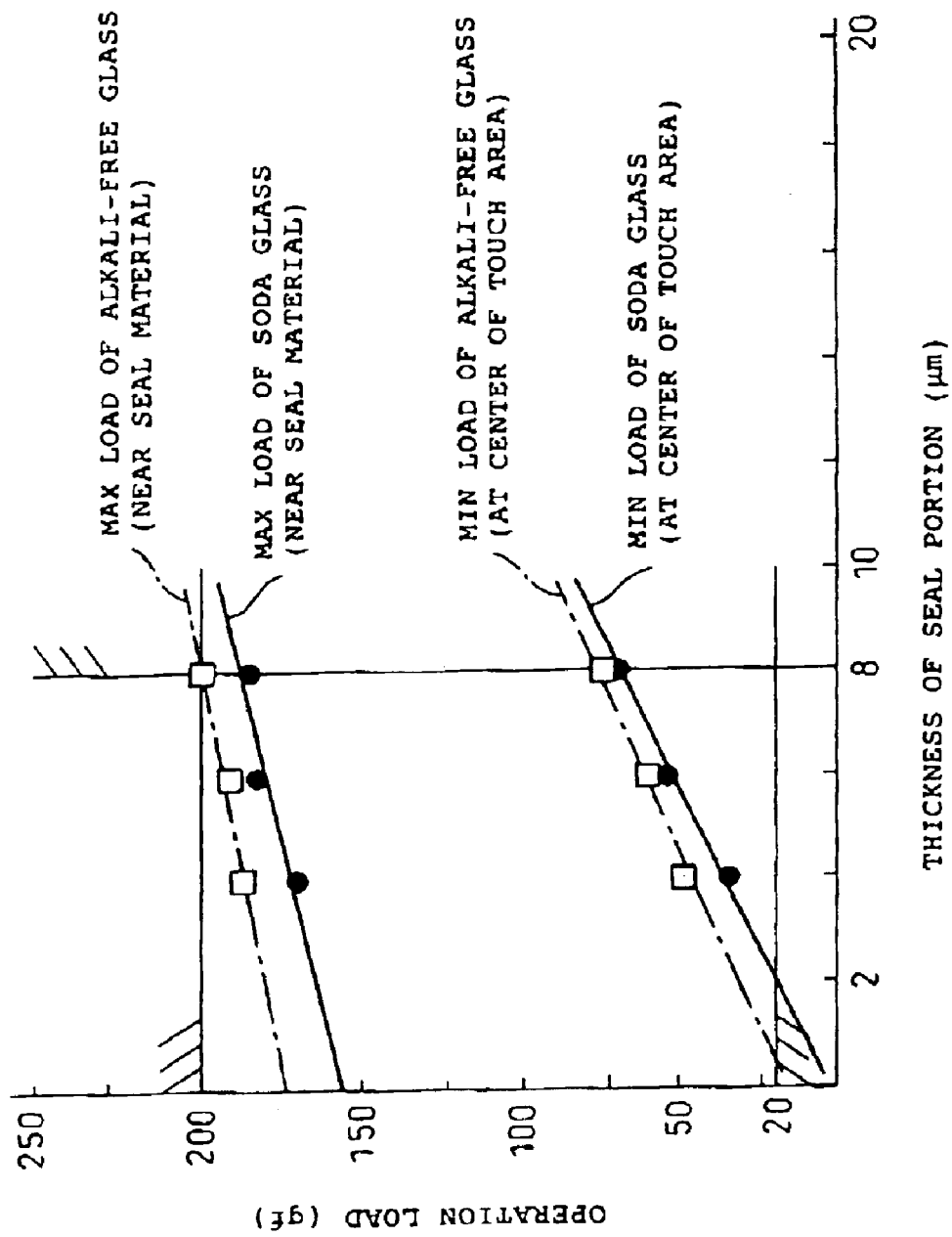
FIG. 14 is a graph useful for explaining the experimental example 2.
Figure 15:
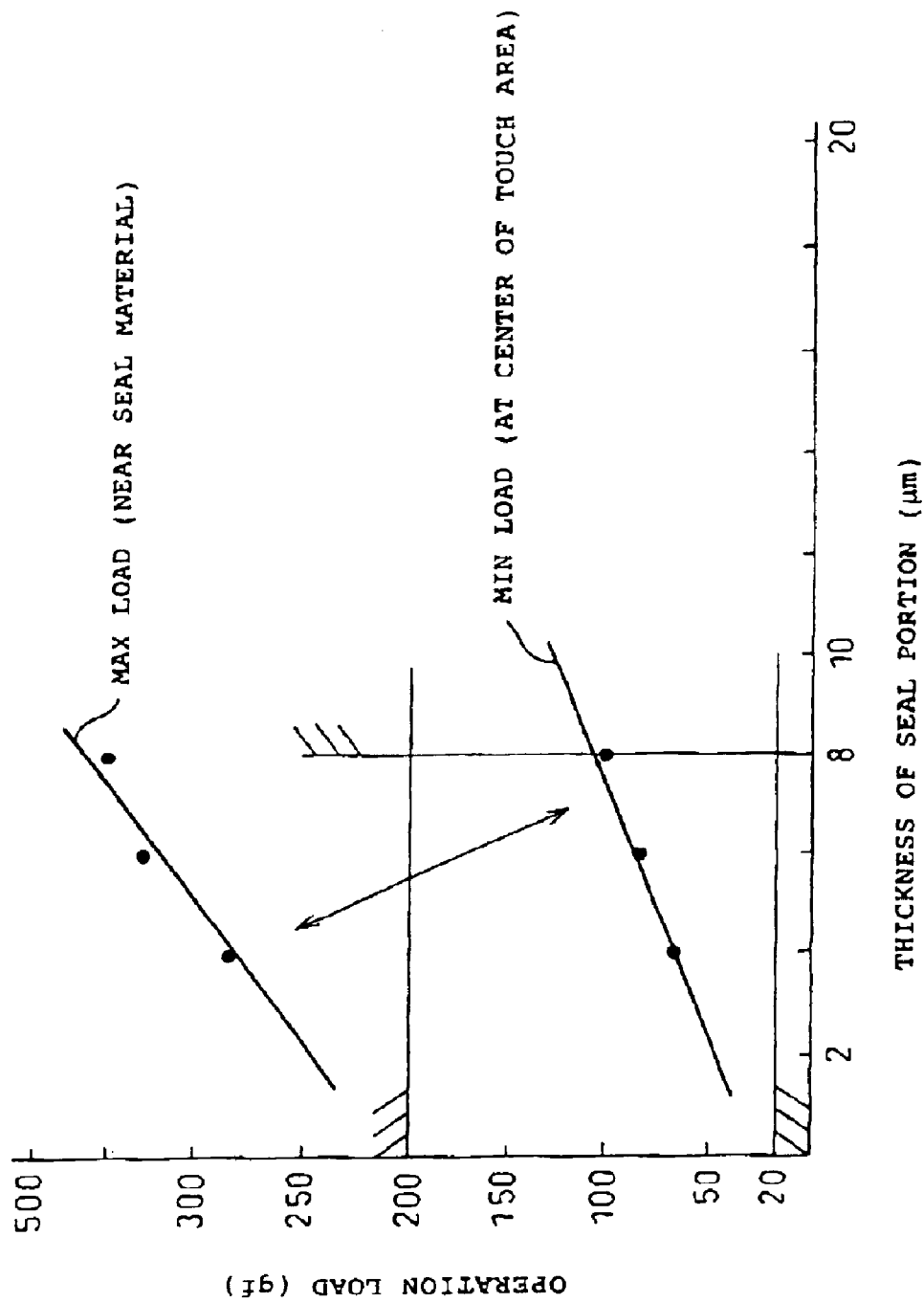
FIG. 15 is a graph useful for explaining the experimental example 2.

In the touch panel shown in FIGS. 13 to 15, the abscissa represents the thickness of the seal portion and the ordinate does the operation load at that time. These graphs represent the change of the operation load when the thickness of the glass substrate on the touch area side is set to 0.2 mm, 0.4 mm and 0.55 mm, respectively.

Incidentally, the upper limit value (200 gf) described in Japanese Unexamined Patent Publication (Kokai) No. 10-133817 and an erroneous operation value of 20 gf in a car environment were used as the upper and lower limit values (110 gf±90 gf) of the operation load.

It can be seen from FIG. 13 that to obtain an operation load of 20 to 200 gf when the thickness of the glass substrate is set to 0.2 mm, the thickness of the seal portion must be from 7 to 8 μm. This means that a gap that gives an operation load of not greater than 200 gf at portions near the seal portion, at which the operation load becomes maximal, and an operation load of at least 20 gf at the touch area center, at which the operation load becomes minimal, is from 7 to 8 μm.

FIG. 14 shows the result when a soda glass substrate having a thickness of 0.4 mm and a Young's modulus of 730,000 kgf/cm$^2$ and an alkali-free glass substrate having a thickness of 0.4 mm and a Young's modulus of about 750,000 kgf/cm$^2$ are used for the glass substrates on the touch area Side. It can be understood from FIG. 14 that both upper and lower limit values of the operation load can be substantially satisfied when the thickness of the seal portion is 8 μm or below.

FIG. 15 shows the result when the thickness of the glass substrate is set to 0.55 mm. In order for the upper limit value of the operation load to be below 200 gf, the thickness of the seal portion must be 1 μm or below. Because the short-circuit of each transparent conductive film of the pair of glass substrates due to foreign matters occurring during the production process and the Newton's rings develop, this condition cannot be accomplished.

The data of the thickness of the glass substrate of 0.3 mm is not available. Since it can be anticipated, in principle, that this data may be in between 0.2 mm and 0.4 mm, the experiment is not specifically conducted.

The results shown in FIGS. 13 to 15 cover the results of the touch panels of the 6-in size. However, it has been confirmed that the operation load does not much change within the range of 4 to 8 inch sizes and the result of the 6-in size can be applied also to the touch panels having a panel size of 4 to 8 inches although the operation load somewhat varies (it becomes high when the touch panel size becomes small and becomes small when the panel becomes large).

EXAMPLE 2

A touch panel was produced in the same way as in Example 1 with the exception that an acrylic-modified epoxy adhesive (moisture permeability: 8.26×10$^{-12}$ g·cm/cm$^2$·sec·cmHg) that was set within a short time on irradiation of UV was used as the material of the seal portion and the sealant in Example 1.

As a result, it was confirmed that this touch panel exhibits no problem even after the passage of 1,000 hours in a high-temperature high-moisture environment at 65° C. and 95% RH in the same way as the touch panel of Example 1.

Incidentally, the bonding strength of the UV setting type adhesive is sensitive to cleanness of the bonding surface (because it sensitively changes with the degree of contamination). Therefore, it is preferred to use the heat-setting type epoxy adhesive in the same way as in Example 1.

EXAMPLE 3

Example 3 measures the moisture permeability of the seal portion 3. Table 1 tabulates the result. It can be understood from Table 1 that among the materials in Table 1, it is the thermosetting type epoxy resin that exhibits the lowest moisture permeability when left standing at 65° C. and 95% RH.

TABLE 1

| material | thermosetting epoxy type | acrylic-modified epoxy type | acrylic type | silicone type | fluorocarbon type |
|---|---|---|---|---|---|
| permeability (g · cm/cm² · cmHg) | $4.12 \times 10^{-12}$ | $8.26 \times 10^{-12}$ | $4.35 \times 10^{-11}$ | $1.82 \times 10^{-10}$ | $1.95 \times 10^{-11}$ |

In Table 1, the moisture permeability is determined in accordance with the following formula:

$$\Delta w = k(bc/a) \cdot (Pout - Pin) \Delta t$$

Here, $\Delta w$ represents the moisture permeation quantity and its unit is g·cm, and k is the moisture permeability and its unit is as tabulated in Table 1. Symbols a, b and c respectively represent the width a of the seal portion 3 (the width when the seal portion is viewed from a plane), its thickness and length (the length of the entire periphery of the seal portion). The unit is cm. (Pout–Pin) represents the water partial pressure between the outside space and the inside space of the touch panel and its unit is cmHg. $\Delta t$ represents the time difference and its unit is sec.

When the pair of glass substrates of the touch panel is bonded by the seal portion having a certain sectional area and when the water partial pressures of the space of the touch panel and its outside are respectively Pin and Pout, the moisture amount entering the space is determined by the formula given above. As can be understood from this formula, the moisture amount is proportional to (thickness b×length c) of the seal portion and is inversely proportional to the width a. Therefore, when c and a are fixed, the moisture amount is proportional to the thickness b. It can thus be understood that the thickness b of the seal portion predominantly governs the moisture amount entering the space of the touch panel.

EXAMPLE 4

Example 4 represents the production method of Embodiment 2. This production method is analogous to the production method of Embodiment 1 shown in FIG. 12, and the differences reside in the printing position of the wiring material in Step A and in the printing shape of the seal material in Step C. The following explanation will be given on only these differences.

In other words, the position of the wiring material in Step A was the printing position of the seal material.

Next, the shape of the seal material in Step C was such that it completely covered the width of the wiring material when the substrates 1a and 2a were put one upon another as shown in FIG. 10.

As shown more concretely in FIG. 11, the seal material was printed on both sides of the wiring material in such a shape that when the substrates 1a and 2a were put one upon another, the seal material completely covered the width of the wiring material. When the seal material was printed onto the wiring material, the disadvantage develops in that the seal materials entered the contact portion for the electric connection of the transfer material with the other substrate, and the electric connection could not be established between both substrates 1a and 2a.

In this Example 4, the seal material was printed on both sides of the wiring material, and when the substrates were put one upon another in Step E, the seal material was reduced in such a fashion as to cover the wiring material (FIG. 11).

After the printing position of the wiring material and the seal material was adjusted in this way, the process steps shown in FIG. 12 were carried out in the same way as in Example 1.

When the touch panel produced in this Example 4 was left standing in the same high-temperature high-moisture environment as that of Example 1, the same result as that of Example 1 could be obtained.

[Other Embodiments]

This invention is not limited to the embodiments described above. Though the foregoing embodiments use Ag as the metal of the organic metal compound constituting each wiring portion and each terminal portion, it is of course possible to use Au or Cu.

The preparations containing the organic metal compound may be those which contain the combination of the organic metal compound, the amine and the organic acid, and are not limited to the compounds in which the organic metal compound, the aliphatic acid and the metal are bonded.

An inert gas may of course be used as the gas to be charged between the pair of glass substrates 1a and 2a, besides air.

The following Embodiments 3 to 11 and "other embodiments" solve the problem described in the foregoing paragraph (B).

[Embodiment 3]

Figure 17:
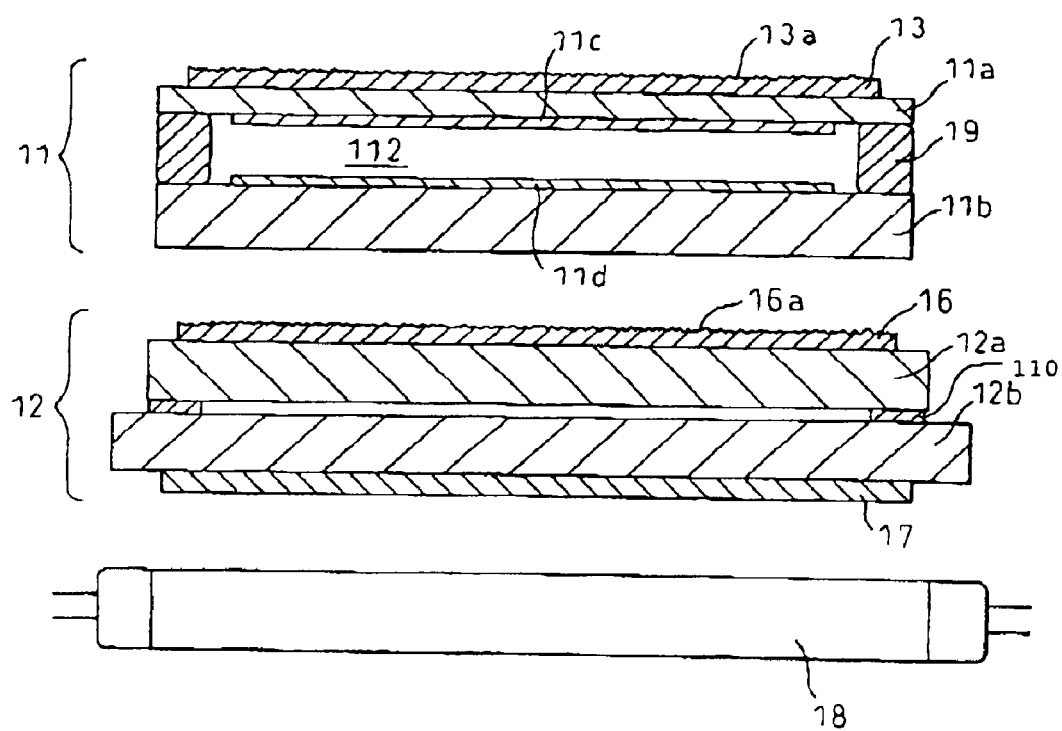
FIG. 17 is a sectional view showing a display device of an embodiment 3.

FIG. 17 is a sectional view of a liquid crystal display device equipped with the touch panel according to the invention. Reference numeral 11 denotes the touch panel. Reference numeral 12 denotes the liquid crystal device that emits display light. The touch panel 11 is fixed to a display Light outgoing side of the liquid crystal display device 12. FIG. 12 shows the touch panel 11 and the liquid crystal display device 12 in the spaced-apart relation in order to clarify their relationship.

The touch panel 11 has a known construction and is used as a switch for changing the display state of the liquid crystal display device 12. The touch panel 11 includes a pair of electrode substrates 11a and 11b. Each electrode plate 11a, 11b has a transparent glass substrate, an electrode 11c and an outer peripheral seal 19 for fixing the electrode substrates 11a and 11b. A polarization plate 13 is bonded to the display light outgoing side of the touch panel 11. The polarization plate 13 improves contrast of display light of a liquid crystal display portion 12.

Figure 21:
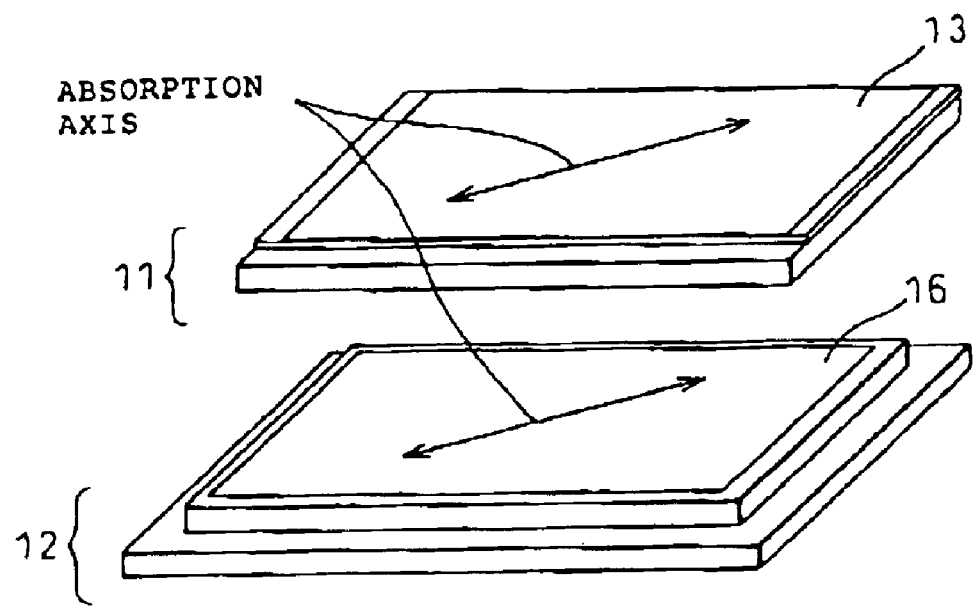
FIG. 21 is a perspective view of the embodiment 3.

The liquid crystal display device 12 has a known construction, and includes a pair of electrode substrates 12a and 12b, an outer peripheral seal 110 for fixing the electrode substrates 12a and 12b, a liquid crystal charged between the pair of the electrode substrates 12a and 12b and a back-light 18. Polarization plates 16 and 17 are respectively bonded to the pair of electrode substrates 12a and 12b of the liquid crystal display device 12. The polarization plates 16 and 17 are necessary for liquid crystal display and their absorption axes orthogonal cross each other. As a result, display becomes black when power is supplied to the pair of electrode substrates 12a and 12b, and becomes white when power is not supplied (or when the voltage is low). The absorption axis of the polarization plate 13 of the touch panel 11 is brought into conformity with that of the polarization plate 16 of the liquid crystal display device 12 so that display light incident to the touch panel 11 passes through the touch panel 11 reaches the eyes of the observer (refer to FIG. 21). Such a construction can prevent the drop of the quantity of display light after it passes through the touch panel 11.

In this Embodiment 3, an anti-glare treatment having a haze value of 7% is respectively applied to the surface of the polarization plate 13 of the touch panel 11 and to the surface of the polarization plate 16 of the liquid crystal display device 12 to form concavo-convexities as a light diffusion portion.

As the concavo-convex portions 13a and 16a are formed by the anti-glare treatment to the polarization plates 13 and 16, it becomes possible to prevent degradation of display light of the liquid crystal display device when external light is incident into the touch panel 11, that is, to prevent display light from becoming difficult to watch due to reflected light of external light.

While inventing this invention, the inventors conducted an experiment to examine the relationship between a reflection factor upon incidence of external light and degradation of display quality of the liquid crystal display device by twenty male and female monitors when the liquid crystal display device equipped with the touch panel is mounted to an automobile, which gives a particularly severe environment, and the liquid crystal display device displays a map. As a result, it has been found that a satisfactory result can be obtained when the reflection factor is not higher than 5.0%.

Figure 18:
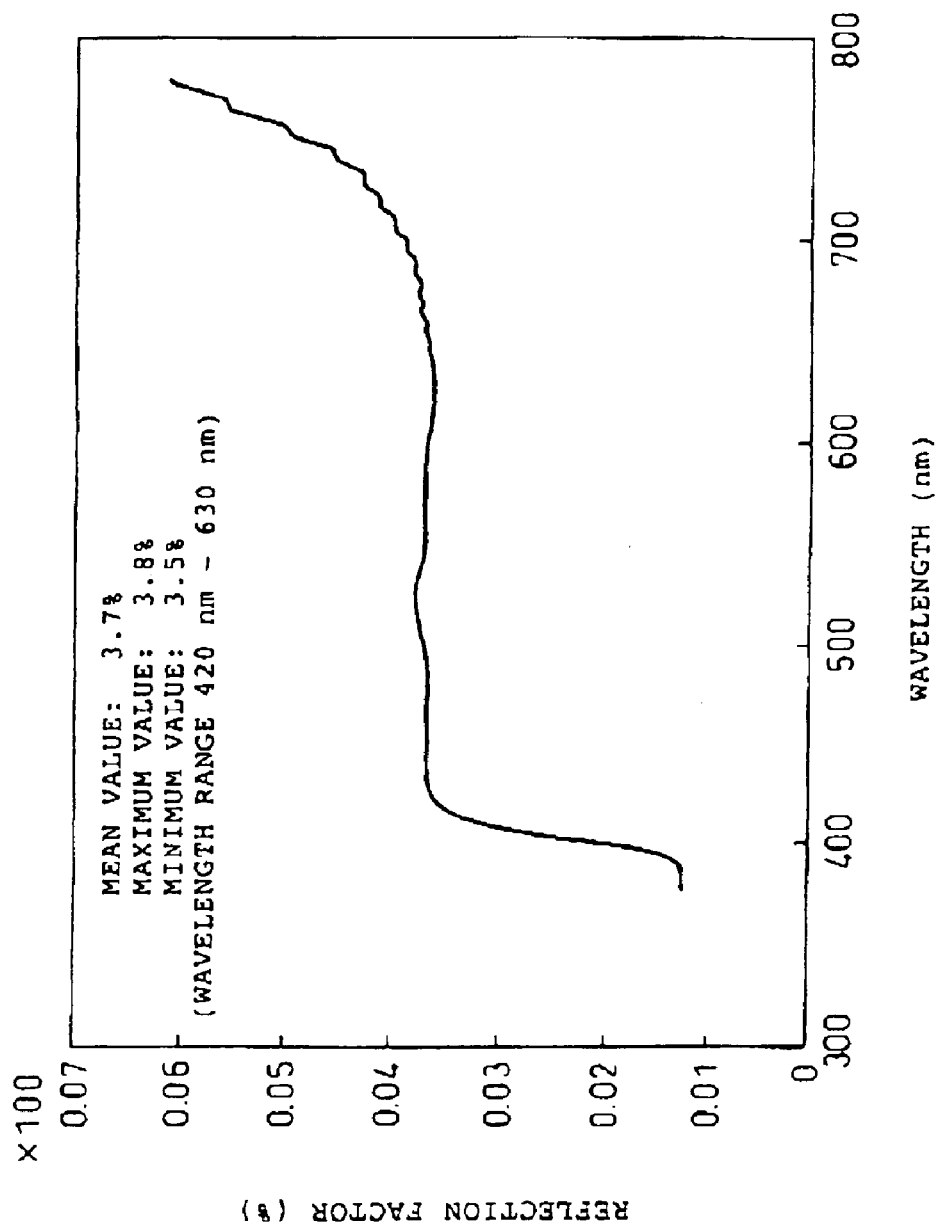
FIG. 18 is a graph useful for explaining the embodiment 3.

FIG. 18 shows the measurement data of the reflection factor of external light in the touch panel 11 equipped with the polarization plate according to Embodiment 3 as a single substance. The reflection factor is 3.7% in this case. The reflection factor becomes 4.6% in the overall system of the display device when this touch panel is arranged on the front surface of the liquid crystal display device 12. Thus, the standard described above can be satisfied.

As a comparative example, the reflection factor of external light in a touch panel 11 equipped with the polarization plate 16 on the display light outgoing side, on which the concavo-convex portion 16a is not formed by the anti-glare treatment, as a single substance is measured. As a result, the reflection factor is 6.1% and fails to satisfy the requirement of not higher than 5%.

Next, a reflection factor of external light is measured in the overall system of the display device in which the polarization plate 6 of the liquid crystal display device 12 is omitted. As a result, it has been found that the reflection factor rises to 7.9%. This is presumably because the reflection factor of the electrode substrate 12a, on the display light outgoing side of the liquid crystal display device 12, is high.

It can be found from the observation given above that in the display device having the touch panel 11 arranged on the front surface of the liquid crystal display device 12, the polarization plate 16 of the liquid crystal display device 12 and the concavo-convex portions 16a and 13a of the polarization plate 13 of the touch panel 11 are essentially necessary to reduce the reflection factor of external light to 5% or below.

Incidentally, when display light from the liquid crystal display device 12 passes through the touch panel 11, the change of chromaticity of display light is not desirable from the aspect of quality of display light.

Figure 19:
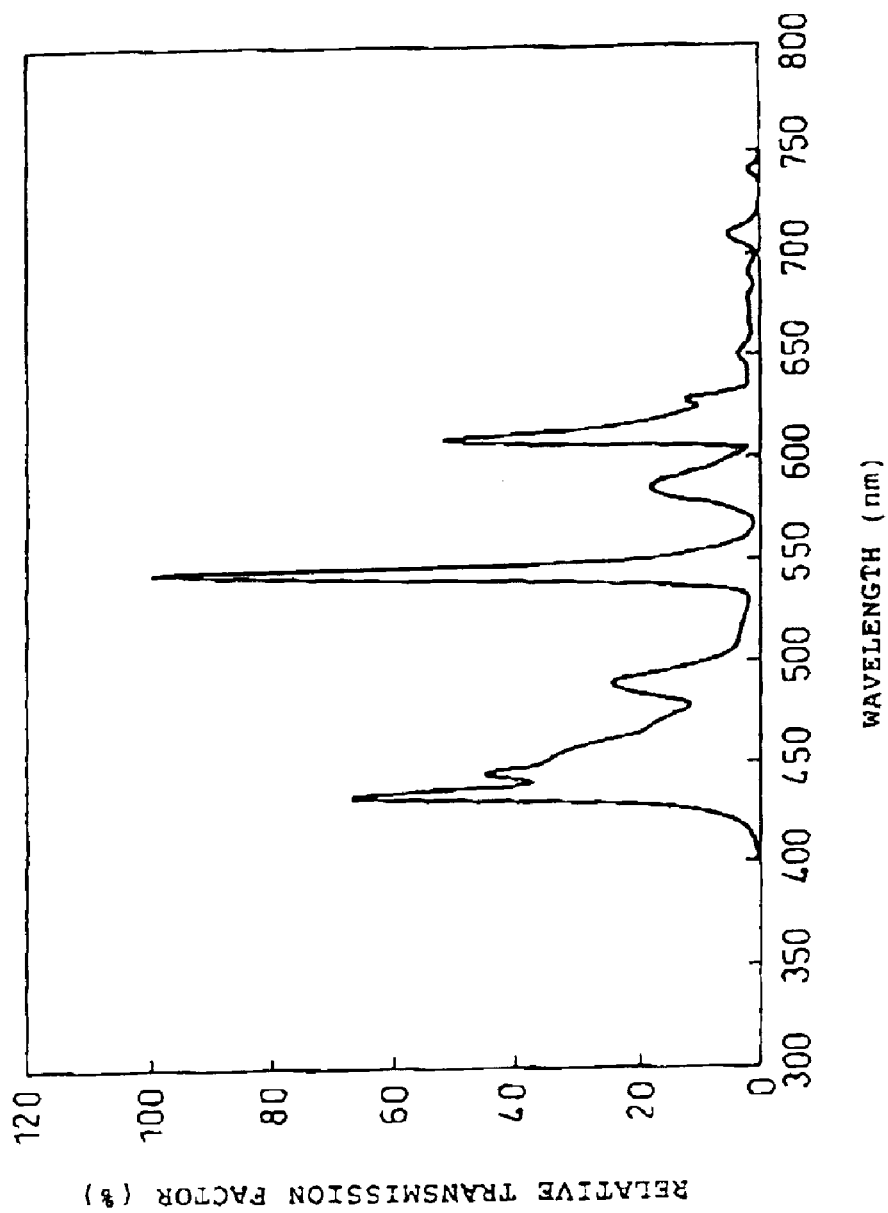
FIG. 19 is a graph useful for explaining the embodiment 3.

FIG. 19 shows relative transmission factor characteristics when the liquid crystal display device 12 displays white display. As is obvious from FIG. 19, the wavelength of display light outgoing from the liquid crystal display device 12 is within the range of 420 to 630 nm (which depends on the display light spectrum emitted from the back-light 18). Since light having the wavelength within this range transmits through the touch panel 11 and is recognized as the image by the eyes of the observer, the polarization transmission factor characteristics of the touch panel 11 equipped with the polarization plate are preferably flat at this wavelength. In other words, the display color of the liquid crystal display device 12 changes if the transmission factor is low or high at only a specific wavelength.

Figure 20:
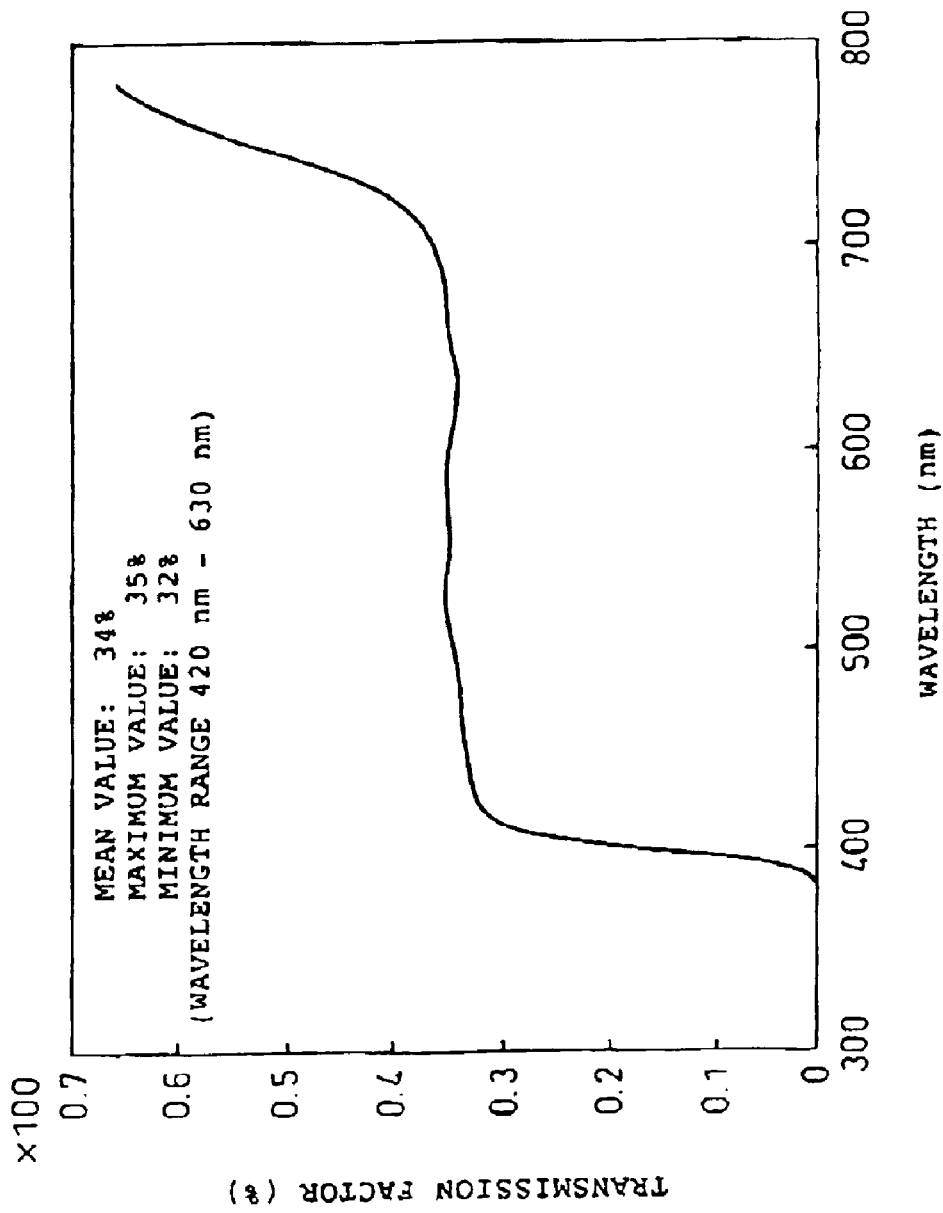
FIG. 20 is a graph useful for explaining the embodiment 3.

FIG. 20 shows a polarization transmission factor characteristics of the touch panel 11 equipped with the polarization plate in Embodiment 1 of the invention. It can be understood that the mean value is 34%, the maximum value is 35% and the minimum value is 32% at 420 to 630 nm, and the waveform is extremely flat.

When only the change of luminance of display light is taken into consideration, the change may well be within ±30% with the mean value being 100% but when the color change of display light is also taken into consideration, the change is preferably within ±10%.

[Embodiment 4]

Figure 22:
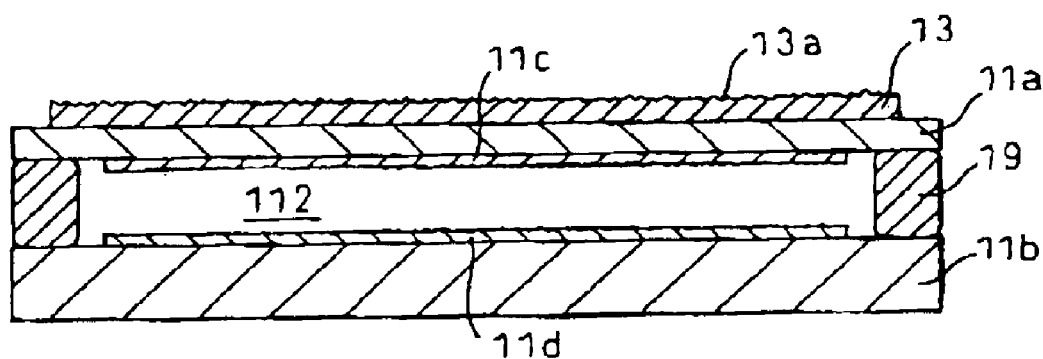
FIG. 22 is a sectional view showing an embodiment 4.

FIG. 22 shows Embodiment 4 in which concavo-convex portions are respectively disposed on the surfaces of the transmission electrodes 11c and 11d of the electrode substrates 11a and 11b as means for further reducing the reflection factor of external light in the construction of the touch panel 11 represented by Embodiment 3.

The refractive index of the transparent electrodes (ITO) 11c and 11d is approximately 2.0 and the refractive index of the glass substrate in the electrode substrates 11a and 11b is approximately 1.6. Therefore, it is clear that the interface on which the transparent electrodes 11c and 11d are in contact with air 112 is a large factor in the reflection of external light. In this Embodiment 4, the concavo-convex portions are therefore disposed on the surfaces of the transparent electrodes 11c and 11d keeping touch with air so as to reduce the reflection factor.

Incidentally, the production method of the touch panel in Embodiment 4 is as follows. First, fine particles of silica ($SiO_2$) and alumina ($Al_2O_3$) are blasted to the surfaces of the transparent electrodes 11c and 11d by a shot blast method (sand blast method) to form the concavo-convex portions. The outer peripheral seal 19 is then applied to either one of these transparent electrode substrates 11a and 11b. Both substrates are put one upon another and the outer peripheral seal 19 is set. Next, the polarization plate 13 is bonded to the display light outgoing side of the touch panel 13.

When the reflection factor of the touch panel 11 so fabricated is measured as the single substance, it is found 2.3%. It can be thus found that the reflection factor can be lowered from the reflection factor (3.7%) of the touch panel 11 according to Embodiment 3 as the single substance.

Incidentally, the concavo-convex portions are disposed on the transparent electrodes 11c and 11d on both surfaces in Embodiment 4. Needless to say, however, the effect of the invention can be also obtained when the concavo-convex portion is disposed on only one of the surfaces.

[Embodiment 5]

Figure 23:
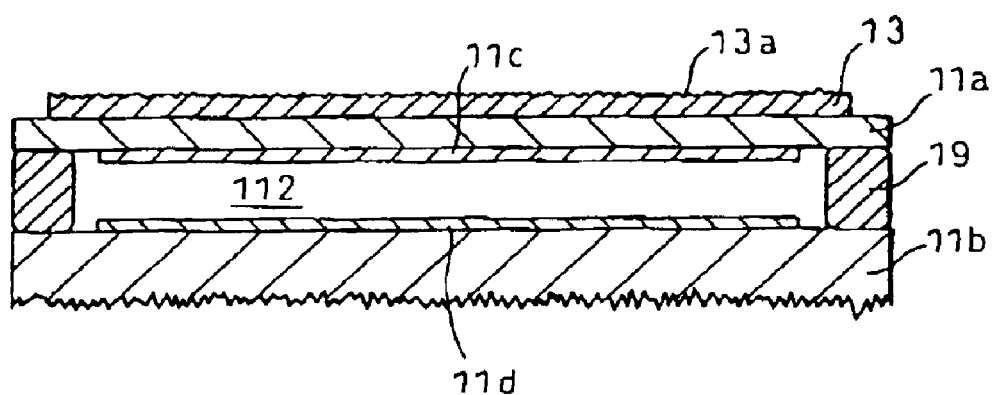
FIG. 23 is a sectional view showing an embodiment 5.

FIG. 23 shows Embodiment 5 wherein a concavo-convex portion is disposed on the surface of the electrode substrate 11b on the side of the liquid crystal display device 12 at which it keeps touch with air, as a structure for further reducing the reflection factor of external light.

The refractive index of the glass substrate of the electrode substrate 11b is approximately 1.6 and is smaller than the refractive index (2.0) of the transparent electrode 11d (ITO). Therefore, the reflection factor is smaller than that on the interface where the transparent electrode 11c keeps touch with air, but reflection certainly occurs. In this Embodiment 5, therefore, the concavo-convex portion is disposed on the surface of the electrode substrate 11b on the contact side with air so as to reduce the reflection factor of external light.

Incidentally, the production method of the touch panel in Embodiment 5 is as follows. First, fine particles of silica ($SiO_2$) and alumina ($Al_2O_3$) are blasted to the surfaces of the glass substrate by a shot blast method (sand blast method) to form the concavo-convex portion. The transparent electrode is formed on the surface opposite to this concavo-convex surface. The film of the transparent electrode is etched into a predetermined pattern, and the electrode substrate 11b is fabricated. The outer peripheral seal 19 is then applied to either one of the transparent electrode substrates 11a and 11b. Both substrates are put one upon another and the outer peripheral seal 19 is set.

When the reflection factor of the touch panel 11 so fabricated is measured as the single substance, it is found 3.3%. It can be thus found that the reflection factor can be lowered from the reflection factor (3.7%) of the touch panel 1 according to Embodiment 3 as the single substance. In this Embodiment 5, the concavo-convex portion is formed on the surface itself of the electrode substrate 11b, but a film-like sheet having a concavo-convex surface, for example, may of course be bonded to the surface of the electrode substrate 11b.

[Embodiment 6]

Figure 24:
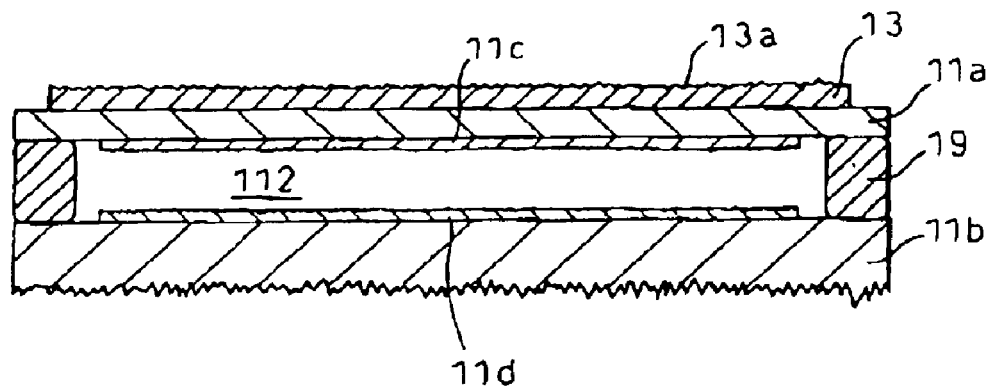
FIG. 24 is a sectional view showing an embodiment 6.

FIG. 24 shows Embodiment 6 comprising the combination of Embodiments 3 through 5.

[Embodiment 7]

Figure 25:
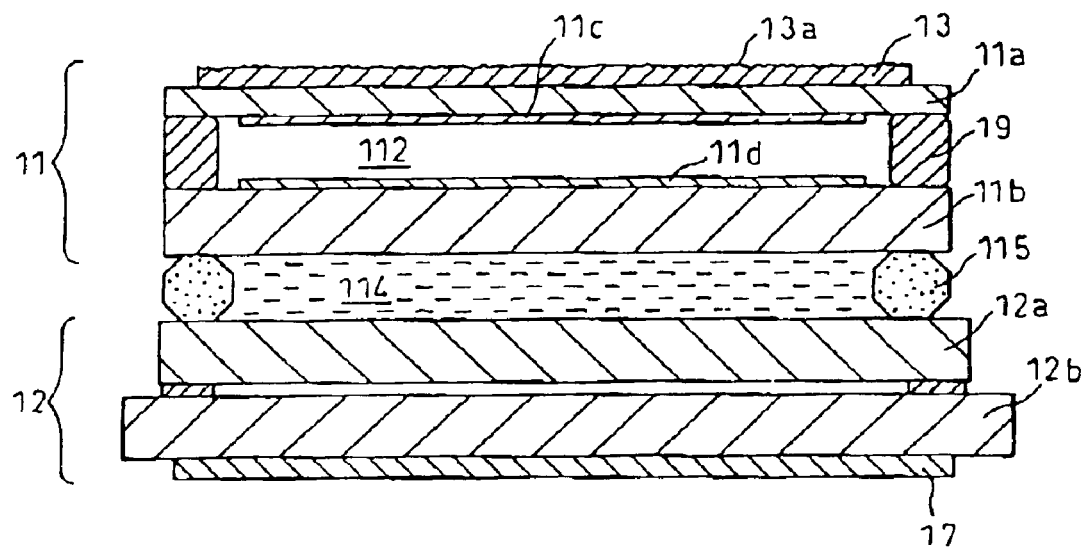
FIG. 25 is a sectional view showing an embodiment 7.

FIG. 25 shows Embodiment 7 wherein transparent silicone oil (refractive index: 1.58) having a refractive index approximate to that of the glass substrate of the electrode substrate 11b, 12a of each of the touch panel 11 and the liquid crystal display device 12 is charged between the touch panel 11 and the liquid crystal display device 12. In this Embodiment 7, the polarization plate 13 having the concavo-convex portion on the surface of the touch panel 11 on the display light outgoing side is bonded in the same way as in Embodiment 3, but the polarization plate 16 of the liquid crystal display device 12 on the display light outgoing side is omitted.

As described above, the polarization plate 16 of the liquid crystal display device of Embodiment 3 is omitted in this Embodiment 7. Therefore, the absorption axis of the polarization plate 13 is so arranged to cross the absorption axis of the polarization axis of the polarization plate 17 of the liquid crystal display device 12 so that the polarization plate 13 of the touch panel 11 bears also the function of the polarization plate 16.

In comparison with Embodiment 3, this Embodiment 7 can prevent much more the reflection of external light that is likely to develop on the interface between the electrode substrate 11b of the touch panel 11 and the air layer and on the interface between the polarization plate 16 of the liquid crystal display device 12 and the air layer.

Only the gist of the production method of the display device of Embodiment 7 will be explained. An outer peripheral seal 115 for sealing oil is formed between the liquid crystal display device 12 and the touch panel 11, and the silicone oil 114 is charged in a vacuum. From the aspect of the production process, the polarization plates 17 and 13 must be bonded to the surfaces of the electrode plates 12b and 11a before charging of the oil because the surfaces of the electrode substrates 12b and 11a, to which the polarization plate is to be bonded, are contaminated by the silicon oil after charging of the silicon oil and the bonding strength drops.

When the reflection factor of external light in display device equipped with the touch panel 11 of this Embodiment 7 so fabricated is measured, it is found 3.0%. It can be thus found that the reflection factor can be lowered from the reflection factor (4.6%) of external light according to Embodiment 3.

[Embodiment 8]

Figure 26:
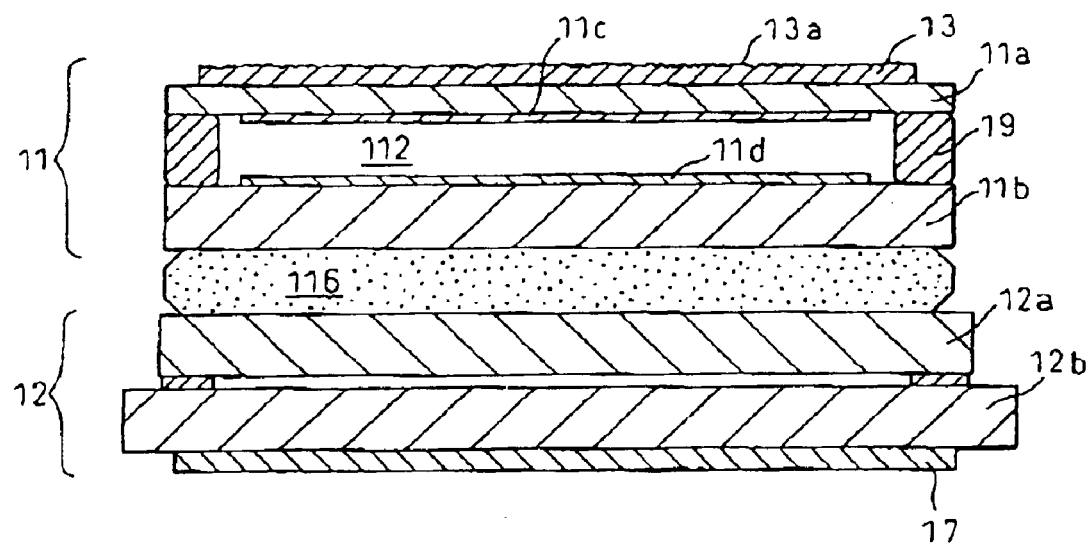
FIG. 26 is a sectional view showing an embodiment 8.

FIG. 26 shows Embodiment 8, that is the same as Embodiment 7 with only the exception that a resin (refractive index: approx. 1.6) having a refractive index approximate to that of the glass substrate of the electrode substrate 11b, 12a of each of the touch panel 11 and the liquid crystal display device 12 is used to bond the touch panel 11 and the liquid crystal display device 12 in place of the silicone oil 114 used in Embodiment 7. The rest of the constructions are the same as those of Embodiment 7.

The gist of the production method of the display device of this Embodiment 8 will be explained. A two-part type epoxy adhesive (XN1233) 116 having a refractive index of 1.55, a product of Nagase Chem-Tech K. K., is applied either to the center or to the end face of the electrode substrate 12a of the liquid crystal display device 12. The touch panel 11 is put and the epoxy adhesive is then thermally set. Incidentally, the polarization plate 17 of the liquid crystal display device 12 and the polarization plate 13 of the touch panel 11 are bonded to each other after setting the adhesive.

Using the heat-setting epoxy adhesive, this Embodiment 8 is free from the problem that the bonding strength drops due to the contamination of the surfaces of the electrode substrates 12b and 11a with the gas at the time of setting. When the bonding strength drops due to the contamination, however, the polarization plates 17 and 13 must be bonded before the setting step of the adhesive.

When the reflection factor of the display device equipped with the touch panel 11 of this Embodiment 8 is measured, it is found 3.1%. It can be thus found that the reflection factor can be lowered from the reflection factor (4.6%) of external light according to Embodiment 3.

[Embodiment 9]

Figure 27:
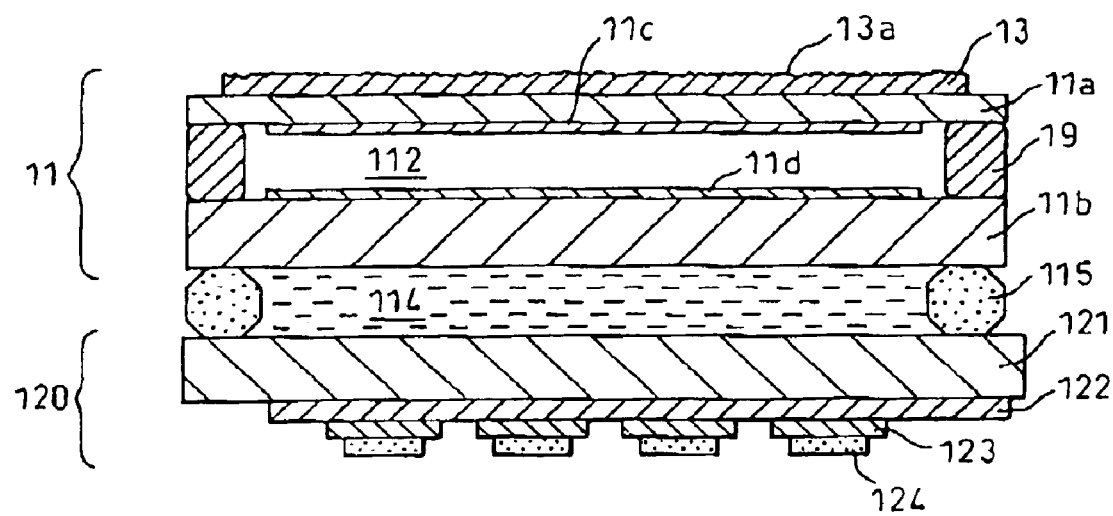
FIG. 27 is a sectional view showing an embodiment 9.

FIG. 27 shows Embodiment 9 wherein an organic EL panel is used in place of the liquid crystal display device 12 in Embodiment 7. A heretofore known organic EL panel, that is fabricated by serially laminating an anode 122 of a transparent electrode, an organic display light layer 123 and a cathode made of a metal over a surface of a transparent substrate 121 as shown in the drawing, is fixed on the rear surface side of the touch panel 11 in the same way as in Embodiment 7. In this Embodiment 9, too, the influences of reflection of external light on display light from the organic EL panel can be suppressed through a similar mechanism to that of Embodiment 7.

[Embodiment 10]

Figure 28:
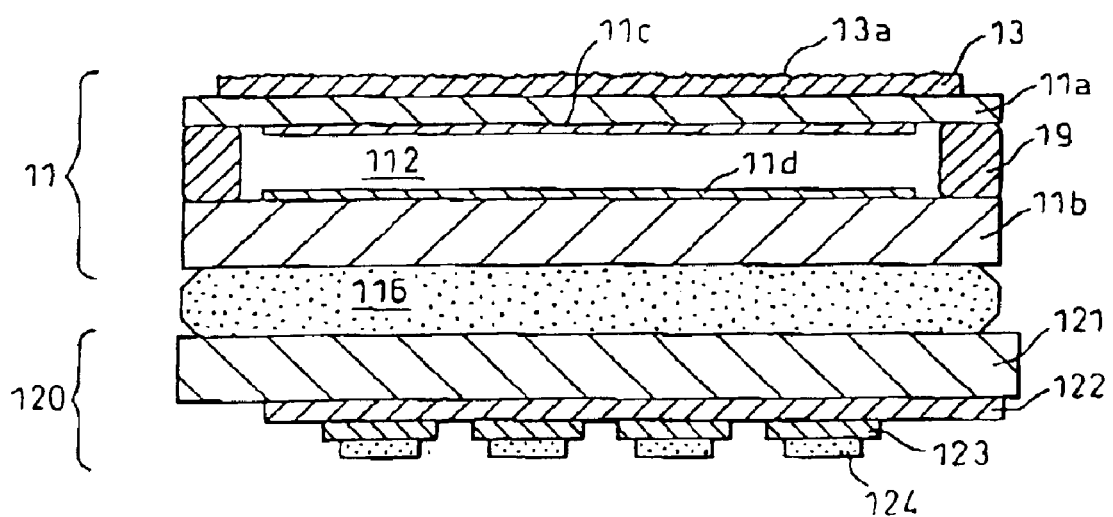
FIG. 28 is a sectional view showing an embodiment 10.

FIG. 28 shows Embodiment 10 wherein an organic EL panel is used in place of the liquid crystal display device 12 of Embodiment 8. As shown in the drawing, a heretofore known organic EL panel fabricated by serially laminating an anode 122 of a transparent electrode, an organic display light layer 123 and a cathode made of a metal over a surface of a transparent substrate 121, is fixed on the rear surface side of the touch panel 11 in the same way as in Embodiment 8. In this Embodiment 10, too, the influences of reflection of external light on display light from the organic EL panel can be suppressed through a similar mechanism to that of Embodiment 8.

[Embodiment 11]

When the reflection factor of each of the touch panels having the construction shown in FIGS. 22 to 24 as a single substance is measured, it is 2.3% for FIG. 22 and 3.3% for FIG. 23. Though the reflection factor in FIG. 24 is not measured, it is expected to be low from the measurement result of FIGS. 22 and 23. It can thus be understood that in the touch panel as a single substance in FIGS. 22 to 24, the reflection reducing effect, for external light, can be acquired.

[Other Embodiments]

The present invention is not particularly limited to the foregoing embodiments. For example, a reflection prevention coat (AR coat layer) may be formed as a light diffusion portion on the surface of each polarization plate 13, 16 in addition to the formation of the concavo-convex portion.

In the touch panel 11 of Embodiment 3, it is possible to omit the polarization plate 13 having the concavo-convex portion as the light diffusion portion and to form the concavo-convex portion by applying shot-blast, or the like, to the surface of the electrode substrate 11a of the touch plate 11 in place of the polarization plate 13.

Further, each of the foregoing embodiments uses the liquid crystal display device as the display device, but a flat panel such as an inorganic EL, an organic EL, a CRT, a PDP, etc, may of course be used.

Though the foregoing embodiments use the glass substrate as the transparent insulating substrate constituting the touch panel, a transparent resin substrate may of course be used.

The explanation given above explains the example of the reflected light diffusion portion directed to reflected light as the light diffusion portion, but the light diffusion portion may also handle transmitted light besides this reflected light.

As described above, this invention deals, as one problem, with the problem that display light from the display device is affected by influences of external light and becomes difficult to watch in the combination of the touch panel and the display device. To solve this problem, the invention employs the construction in which the concavo-convex portion is formed on the outside surface of the polarization plate 3 of the touch panel 1 and also on the outer surfaces of the transparent electrodes 1c and 1d of the touch panel. In consequence, the concavo-convex portion of the polarization plate 3 of the touch panel 1 and the concavo-convex portions of the transparent electrodes 1c and 1d diffuse external light incident into the touch panel 1. Therefore, it becomes possible to prevent display light from the liquid crystal display device, for example, disposed at the back of the touch panel from becoming difficult to watch for the observer.

The following Embodiment 12 and "other embodiments" solve the problem described in the foregoing paragraph (C).

[Embodiment 12]

Figure 29:
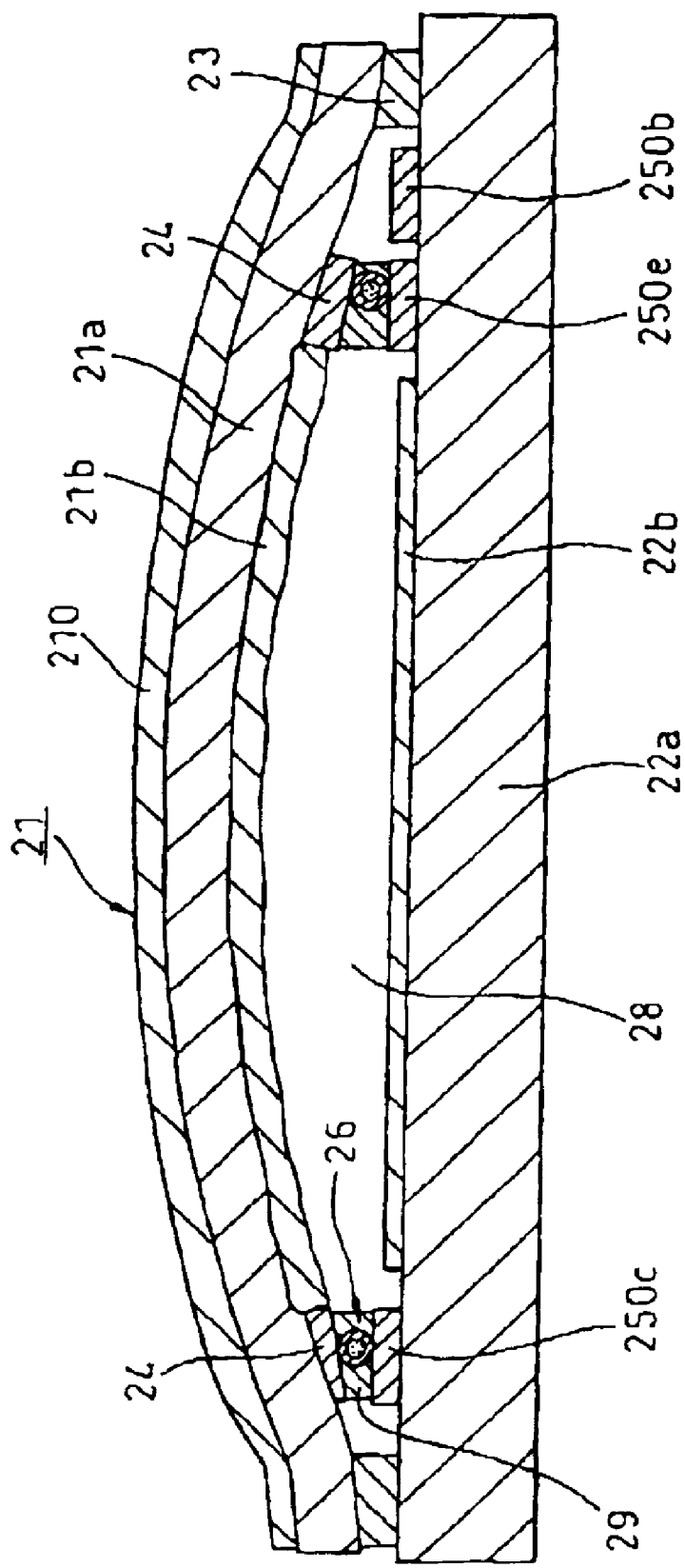
FIG. 29 shows another embodiment of a touch panel, and is a sectional view taken along a line XXIX—XXIX of FIG. 34.

FIGS. 29 to 34 show Embodiment 12. In FIG. 29, reference numeral 29 denotes a touch panel. This touch panel 21 is arranged on the display side of the liquid crystal display device D for car navigation shown in FIG. 16. The touch panel 21 is used as a switch for changing the display state of the liquid crystal display device D as shown in FIG. 29, and has a construction in which a pair of glass substrates 21a and 22a is bonded and fixed to each other while opposing each other through a seal portion 23 to define a space 28.

One of the substrates 21a has a touch area that an operator of the touch panel 21 operates with fingers. When operated, the touch area moves minutely due to flexible deformation. The other glass substrate 22a is fixed on the display side of the liquid crystal display device D.

The glass substrates 21a and 22a are made of a lead boro-silicate glass material, for example. One of the glass substrates 21a has a thickness of 0.4 mm and the other 22a, a thickness of 1.1 mm.

Figure 32:
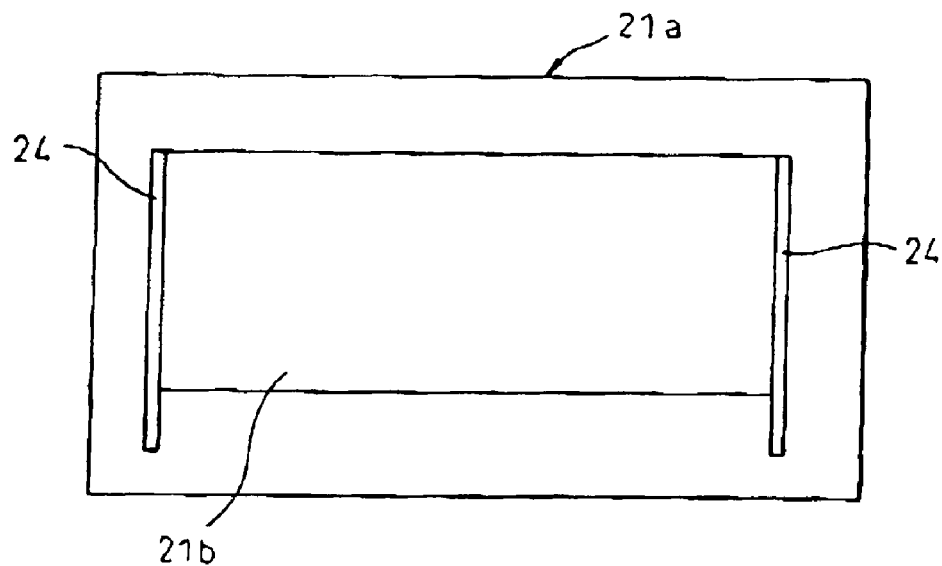
FIG. 32 is a plan view of a glass substrate on a touch area side in the embodiment 12.

A transparent conductive film 21b is formed on the glass substrate 21a while a transparent conductive film 22b is formed on the glass substrate 22a. The transparent conductive film 21b of the glass substrate 21a has a rectangular shape as shown in FIG. 32. Wiring portions 24 are formed on the glass substrate 21a in such a manner to be electrically connected to portions corresponding to two opposing sides of the transparent conductive film 21b (right and left end portions in FIG. 32). The transparent conductive film 22b of the glass substrate 22a, too, has a rectangular shape as shown in FIG. 33, and wiring portions 25 are formed on the glass substrate 22a in such a manner to be electrically connected to portions corresponding to two opposing sides of the transparent conductive film 221b (upper end lower end portions in FIG. 33).

On the glass substrate 22a are formed a wire branch portion 250a, a wire branch portion 250b, a wire branch portion 250c, a wire branch portion 250d, a wire branch portion 250e, terminal portions 210a and 210b forming a pair, and terminal portions 220a and 220b forming a pair.

Figure 33:
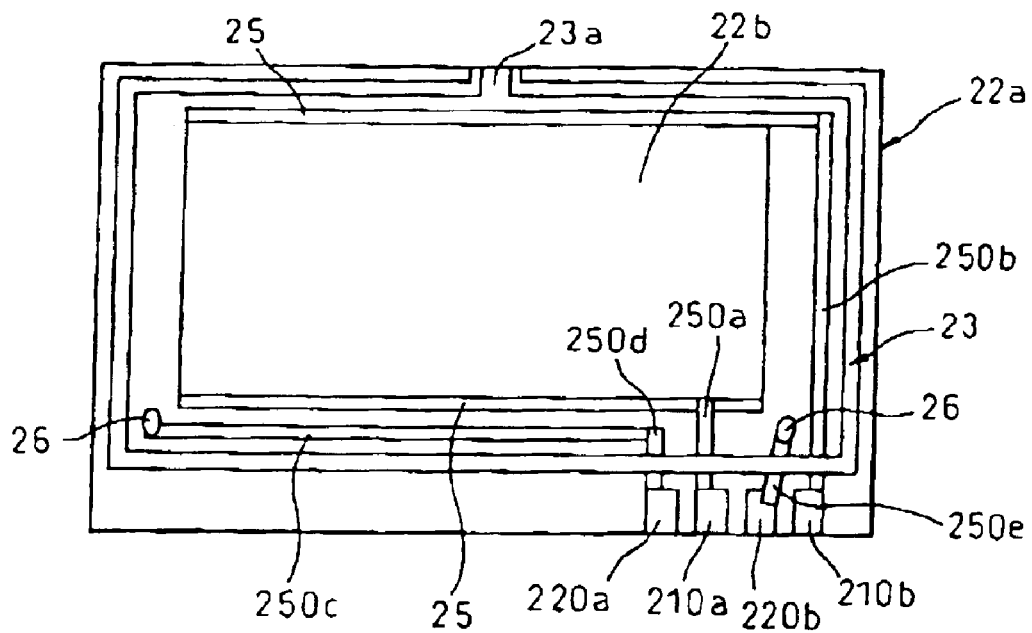
FIG. 33 is a plan view of another glass substrate in the embodiment 12.
Figure 34:
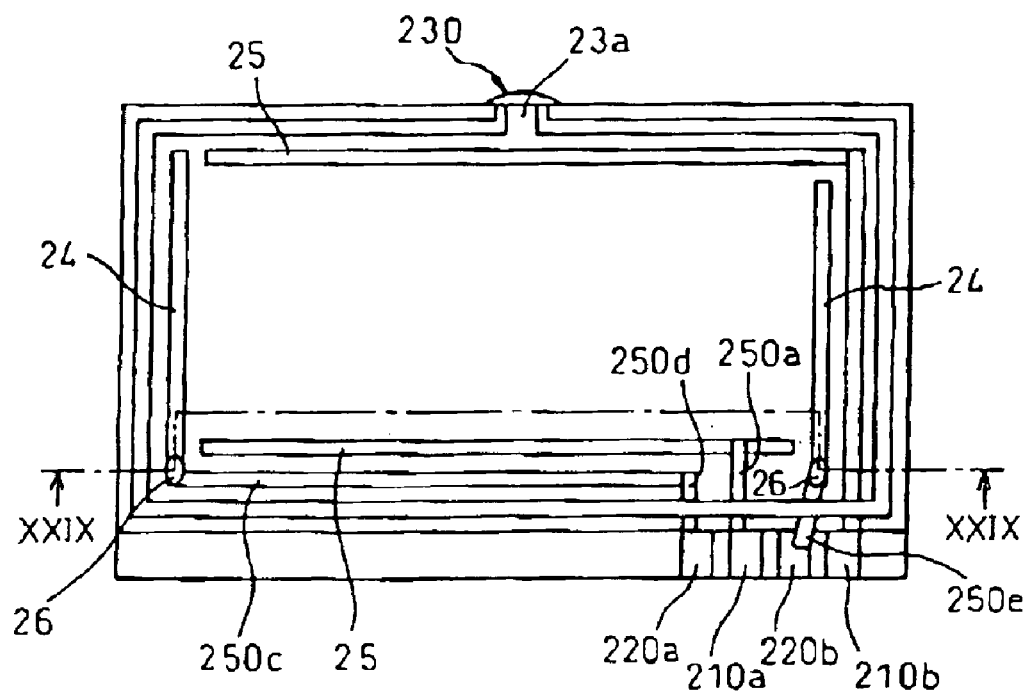
FIG. 34 is a plan view showing the state where a glass substrate shown in FIG. 32 and a glass substrate shown in FIG. 33 are put one upon another.

Of the wiring portion 25, the wiring portion on the upper side in FIG. 33 is electrically connected to the terminal portion 210b through the wire branch portion 250b, and the wiring portion 25 on the lower side is electrically connected to the terminal portion 210a through the wire branch portion 250a. An electric connector (not shown) is electrically connected to these terminal portions 210a, 210b, 220a and 220b.

When the glass substrate 21a and the glass substrate 21b are superposed with each other, the wire branch portions 250c and 250d electrically connect the wiring portion 24 on the right side of the glass substrate 21a (see FIG. 32) to the terminal portion 20a, and the wire branch portion 250e electrically connects the wiring portion 24 on the left side to the terminal portion 220b. A transfer portion 26 establishes these electrical connections. In other words, the transfer portion 26 is clamped between the wiring portion 24 on the right side of the glass substrate 21a (see FIG. 32) and the wire branch portion 250e of the glass substrate 22a and between the wiring portion on the left side of the glass substrate 1a (see FIG. 32) and the wire branch portion 250c of the glass substrate 22a, and these members are electrically connected to one another.

The transfer portion 26 comprises a resin particle 26a and a metal film 26b formed on the surface of the resin particle 26a. Incidentally, the transfer portion 26 is formed by use of a dispenser at positions corresponding to the portions described above by adding the conductive particles (26a, 26b) having the construction described above into a retaining material made of the same material as that of the seal portion 23. The member formed of this retaining material is indicated as a retaining body 29.

Figure 30:
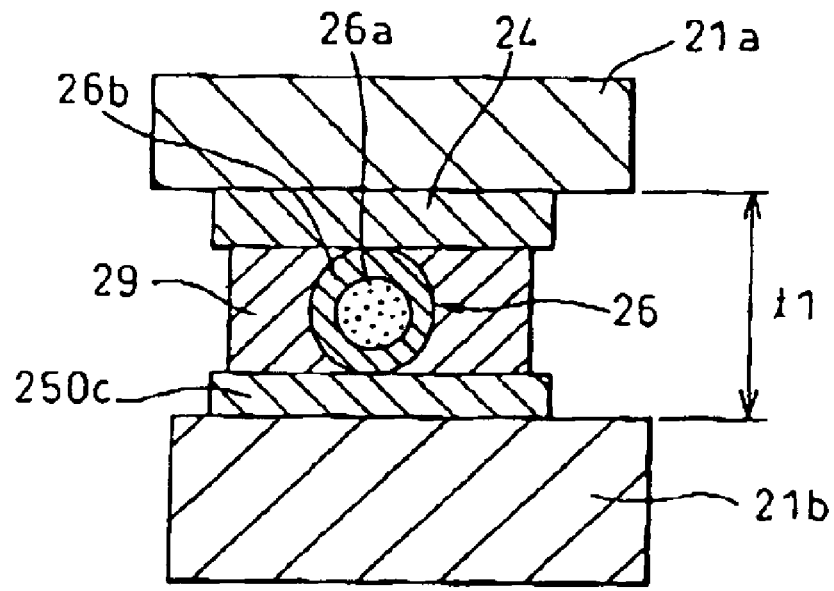
FIG. 30 is a sectional view showing a connection relation between a transfer portion as a principal portion of the embodiment 12 and a wiring portion.
Figure 31:
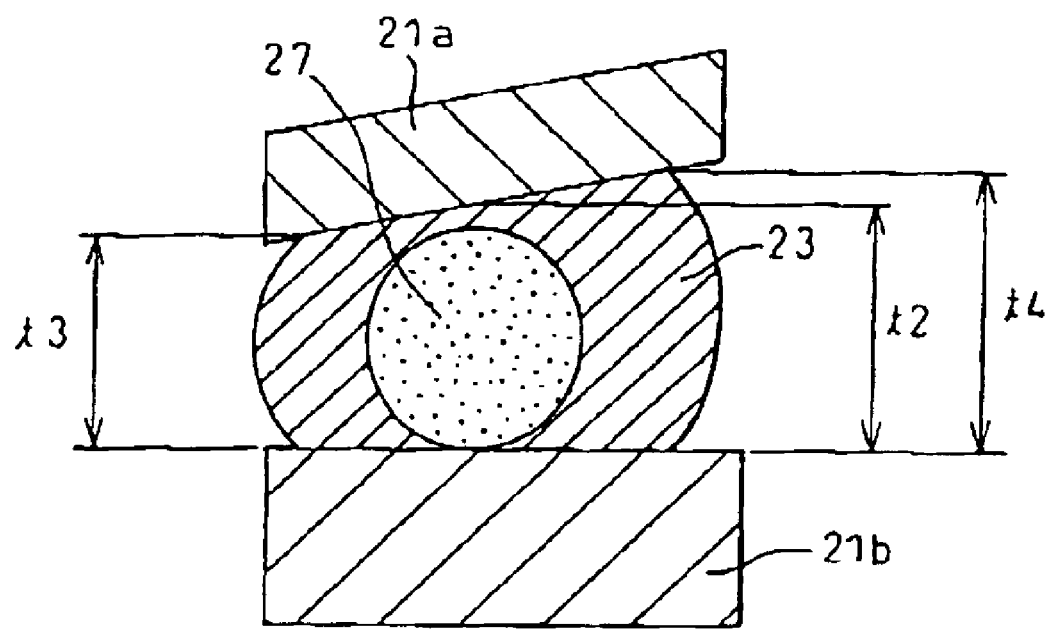
FIG. 31 is a sectional view showing a seal portion as another principal portion of the embodiment 12.

As shown in FIGS. 30 and 31, the sum of the thickness t1 of the transfer portion 26, the wiring portion 24 and the wiring portion 250c and the thickness t2 of the seal portion 23 are so set as to satisfy the relation t1>t2. Because of this relation, the glass substrate 21a of the touch panel has a drum-like shape that protrudes outward as shown in FIG. 29.

The pair of glass substrates 21a and 22a is superposed, bonded and fixed to each other through the seal portion 23 in such a fashion that their transparent conductive films 21b and 22b face each other and the space 28 can be formed between them through a gap.

During the production process of the touch panel, the seal portion 23 is disposed at the outer peripheral edge portion of the glass substrate 22a, that is, outside the transparent conductive film 22b, the vertical wiring portion 25 and the wire branch portions 250b and 250c. A seal port 23a is formed at one position and is sealed by a sealant 230.

The seal portion 23 is formed of a thermosetting type epoxy resin having a moisture permeability of $4.12 \times 10^{-12}$ g·cm/cm$^2$·sec·cmHg at 65° C. and 95% RH. The sealant 230 is formed of a UV setting type acrylic resin having a moisture permeability of $4.35 \times 10^{-11}$ g·cm/cm$^2$sec·cmHg at 65° C. and 95% RH. The full length of the seal portion 23 sealing the outer periphery of the touch panel is approximately 532 mm. As the seal port 23a has a width of 4 mm, the moisture permeability of the sealant 230 can be neglected. A spacer particle 27 having a diameter of about 3 μm such as a silica spacer or a glass fiber is mixed into the seal portion 23 as shown in FIG. 29.

Incidentally, the thickness of the seal portion 23 is set to 3 μm and the maximum gap between the glass substrates 21a and 22a is set to 10 μm in FIG. 29.

A polarization plate 210 is bonded to the outside surface of the glass substrate 21a of the touch panel 1. The polarization plate 210 damps external light that is to be incident into the touch panel 21. The outside surface of the other glass substrate 22a is directly exposed to air.

As shown in FIGS. 29 and 31, the seal portion 23 substantially has a wedge shape. In consequence, the opposing gap at the opposing portions of the pair of glass substrates 21a and 22a is broad at portions adjacent to the inside of the space 28 with the seal portion 23 being a boundary and is relatively narrow at portions adjacent to the outside of the space 28 throughout the entire range where the seal portion 23 exists.

[Other Embodiments]

Figure 35:
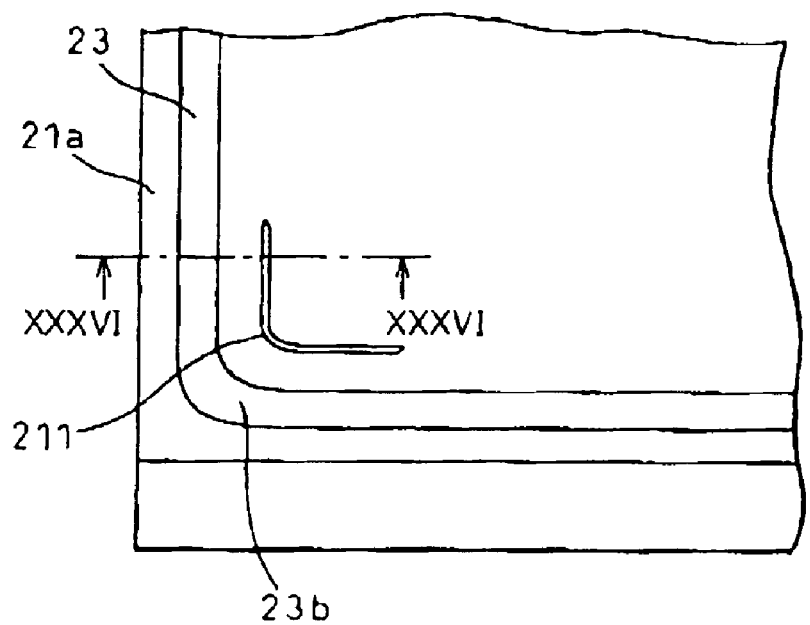
FIG. 35 is a sectional view showing principal portions of other embodiment.
Figure 36:
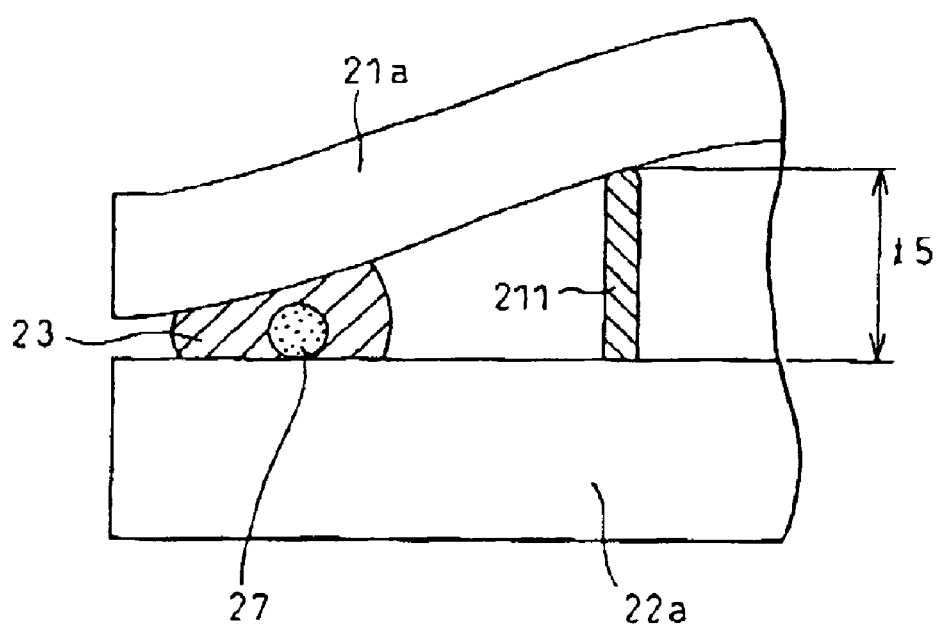
FIG. 36 shows the principal portions of other embodiments, and is a sectional view taken along a line XXXVI—XXXVI of FIG. 35.
Figure 37:
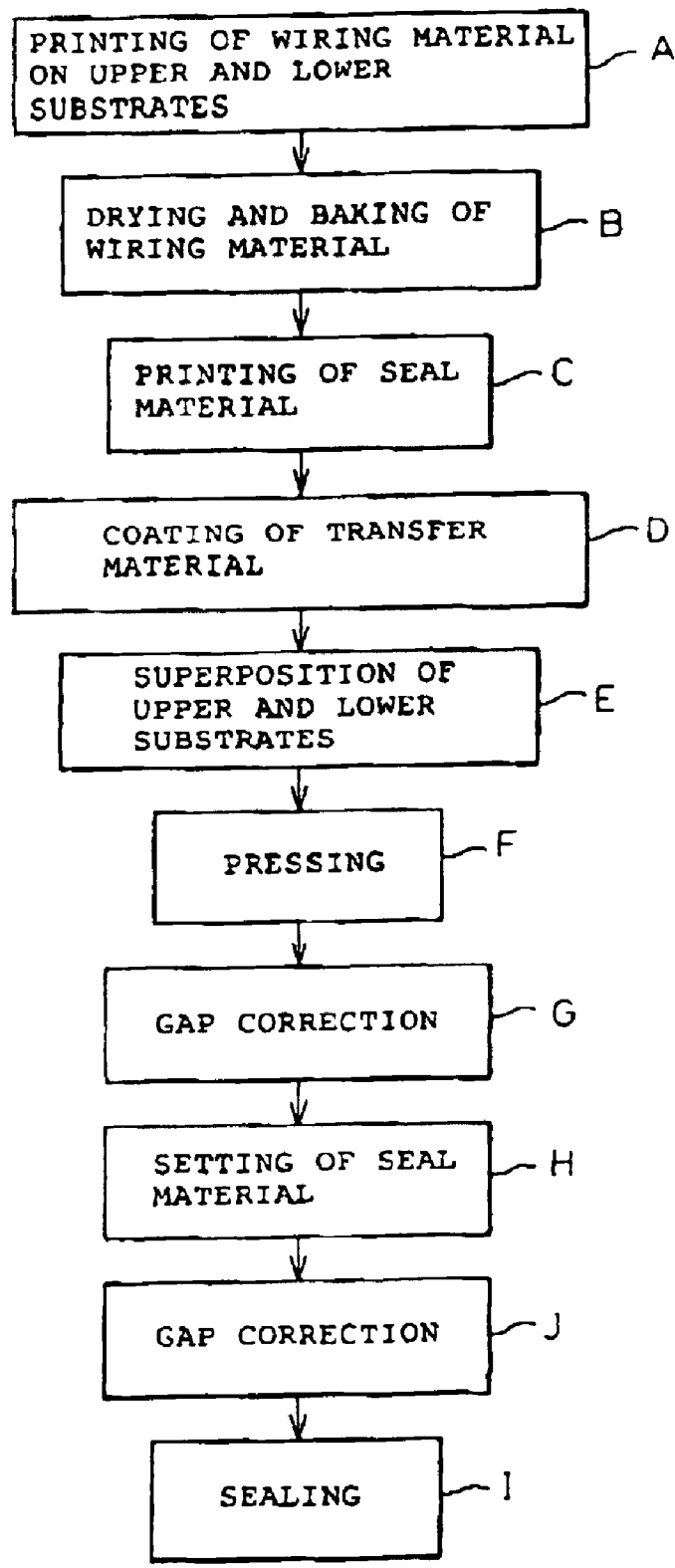
FIG. 37 is a flowchart useful for explaining a production method of the embodiment 7.

FIGS. 35 and 36 show another embodiment of the invention. In this embodiment, a corner spacer 211 having a shape profiling the shape of each corner 23b of the seal portion 23 is disposed inside each corner 23b. As can be seen from FIG. 36, the corner spacer 211 has a height greater than that of the outside gap of the seal portion 23.

Because the corner spacer 211 exists, the opposing gap in the proximity of the corner 23b of the seal portion 23 is further expanded. Consequently, the Newton's rings that are likely to develop in the proximity of the corner 23b of the seal portion 23 can be more reduced than in the embodiment shown in FIG. 29.

EXAMPLE 5

Next, the production method of the touch panel of Embodiment 12 will be explained. The explanation will be given with reference to the foregoing process flowchart of FIG. 12. In Step A, a glass substrate 21a (thickness: 0.4 mm) and a glass substrate 22a (thickness: 1.1 mm) each having a transparent conductive film 1b, 2b formed thereon in advance were prepared, and wiring portions 24 and 250a to 250e and terminal portions 210a, 210b, 220a and 220b were printed by using an organic metal compound on each glass substrate 21a, 21b in accordance with a screen printing method. The thickness after printing was about 10 μm.

Here, an organic acid was mixed with a coordination compound of an aliphatic acid silver and an amine to form the organic metal compound. More concretely, the organic metal compound had a composition consisting of 35 to 45% of aliphatic acid silver, 10 to 20% of dihydroterpineol, 10 to 20% of 1,2-diaminocyclohexane, 10 to 20% of cyclohexanecarbonic acid, 1 to 10% of acetic acid and 1 to 5% of phthalic anhydride. Aliphatic acid silver was expressed by R—COOAg. R was an alkyl group such as a methyl group, an ethyl group, a propyl group, and so forth. This example used a product XE102-25 of Namix K. K.

In the next Step B, each glass substrate 21a, 22a having the wiring portion 24, the wire branch portions 250a to 250e and the terminal portions 210a, 210b, 220a, 220b and 25 formed thereon was dried at 150° C. for 10 minutes and was then baked at 280° C. for 60 minutes. As a result of these drying and baking steps, the coordination compound of aliphatic acid silver was decomposed and silver precipitates. Because the amine, the organic acid and the aliphatic acid were discharged as the decomposition gas, the thickness of the wiring portion 24, the wire branch portions 250a to 250e and the terminal portions 210a, 210b, 220a and 220b after baking was about 1 μm in the sectional direction and the specific resistance is $8 \times 10^{-6}$ Ω·cm.

In Step C, the seal portion 23 was formed by screen printing in such a fashion as to leave the seal port 23a round the outer periphery of one of the glass substrates 22a. Silica spacers and a thermosetting type epoxy resin having a moisture permeability of $4 \times 10^{-12}$ g·cm/cm$^2$·sec·cmHg at 65° C. and 95% RH were mixed to prepare a material of this seal portion 23. This example used a product obtained by adding 0.8wt % of "Hi-Precica" (trademark) N3N (particle diameter: 2.8 μm) of Ube-Nitto Kasei K. K. to "Structbond" (trademark) XN-31A-A of Mitsui Chemical Co.

In Step D, the transfer portion 26 was formed on the glass substrate 22a as shown in FIG. 5. A transfer material prepared by adding 2 wt % of conductive particles (particle diameter: 3.5 μm) obtained by plating gold on the surface of a resin particles was applied to the glass substrate 22a by using a dispenser to form this transfer portion 26. The conductive particle was "Micro-Pearl" (trademark) AU-2035 (gold plating) of Sekisui Kagaku K. K.

In Step E, the pair of glass substrates 21a and 22a were put one upon another and in the next Step F, the pair of glass substrates 21a and 22a were pushed at a pressure of 0.1 to 3 kg/cm$^2$ through a jig. In consequence, the seal portion 23 was reduced to a uniform thickness of about 3 μm throughout its entire periphery.

After Step F was carried out, the glass substrates 21a and 22a were bonded to each other. Therefore, Newton's rings developed on the entire surface when this assembly was observed with eye from the glass substrate 21a side.

Therefore, in Step G, air was charged between the pair of glass substrates 21a and 22a. In other words, air set to a discharge pressure of 5 kg/cm² was charged into the space 28 between the glass substrates 21a and 22a from the seal port 23a of the seal material 23 through an air-charging machine (not shown), and charging of air is stopped. Therefore, the pair of glass substrates 21a and 22a bonded to each other was peeled, and the Newton's rings disappear.

Under the condition after charging of air, the gap between the glass substrates 21a and 22a was large at the central portion and was small at the peripheral portion, and the glass substrate 21a had the drum-like shape as shown in FIG. 29. Incidentally, as the glass substrate 21a has a smaller thickness, it exhibits a swelling state. FIG. 29 exaggeratedly illustrates this swelling state for ease of understanding.

The drum-like shape was achieved when the sum thickness t1 at the transfer portion 26 and the thickness t2 of the seal portion 23 satisfy the relation t1>t2 as described already. The condition shown in FIG. 29 was maintained even after charging of air was stopped.

In the next Step H, the pair of glass substrates 21a and 22a was arranged inside a furnace (not shown) and was then left standing at 150° C. for one hour to thermally set the seal portion 23. Incidentally, no pressure was imparted to the portion of the seal member 23 of the pair of glass substrates 21a and 22a.

After the setting of the seal portion 23 was complete, the pair of glass substrates 21a and 22a was withdrawn from the furnace and was naturally cooled down to the room temperature. When the pair of glass substrates 21a and 22a was examined, the drum-like shape prior to setting of the seal portion 23 was as such maintained. The occurrence of the Newton's rings was not confirmed at this time.

In step I, a sealant 30 made of a UV setting type acrylic resin (3052B) of Three-Bond Co. was applied to the seal port 23a of the seal portion 23, and UV was irradiated (accumulated light power: 1,000 mJ/cm²) to set the sealant 30.

The touch panel was completed through the process steps described above.

When the pair of glass substrates 21a and 22a was examined, it was found that the drum-like shape before setting of the seal portion 23 was as such maintained.

In this Example 5, air was charged into the space 28 between the pair of glass substrates 21a and 22a in Step C prior to the stage where the seal material constituting the seal portion 23 was set. Therefore, the pressure of air did not impede deformation of the pair of glass substrates 21a and 22a.

Therefore, the seal material before setting undergoes plastic deformation while being pulled in the state where it was bonded to the back of the pair of glass substrates 21a and 22a, in response to the deformation of the pair of glass substrates 21a and 22a. As the seal material was thermally set under this plastic deformation state, the viscosity of the seal material drops and the seal material describes a shape profiling the shape of the opposing gap in the proximity of the seal material of the pair of glass substrates 21a and 22a. The seal portion 23 substantially had a wedge shape under the state where the seal material was set and the seal portion 23 was formed.

When the maximum gap at the center of the space 28 of the drum-like touch panel was measured in Example 5, it was about 30 μm. The inside gap t4 as the portion adjacent to the inside of the gap 28 of the seal portion was about 5 μm, and the outside gap portion t3 as the portion adjacent to the outside of the space 28 of the seal portion 23 was about 3 μm. Furthermore, the seal portion 23 had a substantially wedge-like sectional shape as shown in FIG. 31. As the width of the seal portion 23 was about 2 mm, the slant angle θ in the sectional shape of the seal portion 23 was calculated as 0.057°. In other words, it could be calculated by t2=(t3+t4)/2.

Since the seal portion 23 had the shape described above, the Newton's rings that could occur at the corners of the seal portions 23 were not observed. Needless to say, the opposing gap at the opposing portion between the pair of glass substrates 21a and 22a was set so that it was wide at the portion adjacent to the inside of the space 28 with the seal portion 23 being the boundary and was relatively narrow at the portion adjacent to the outside of the space 28 throughout the entire range in which the seal portion 23 exists in this Example 5. Therefore, the occurrence of the Newton's rings could not be confirmed in the touch panel as a whole.

EXAMPLE 6

In Example 5, a resist (material) was spin-coated to a thickness of about 10 μm at inside and at four corners at the end portion of the glass substrate 22a, and each corner spacer 211 (height: approx. 10 μm) having the shape shown in FIG. 35 was formed by an ordinary patterning process. The seal portion 23 was then formed. The same thermosetting resin (seal material) as that of Example 5 was used to form the corner spacer 211 by use of a dispenser, and the glass substrate 21a was superposed.

Under this condition, the portions of the glass substrates 21a and 22a corresponding to the seal material were pressurized at a pressure of 0.1 to 3 Kg/cm², and the seal material was set while keeping this pressurization state under the same condition as that of Example 5.

In Example 6, the portion corresponding to the seal material was set under the pressurization state. In the touch panel so obtained, the inside gap t4 of the seal portion 23 was expanded by the corner spacer 211 at each corner 23b of the seal portion 23. Therefore, the occurrence of the Newton's rings that remarkably occurred at the corner portions 23b of the seal portion 23 could be more reliably avoided.

EXAMPLE 7

When the Newton's rings occurred, depending particularly on the degree of swell of the surface of the glass substrate 21a having a small thickness among the pair of glass substrates 21a and 22a after setting of the seal portion in Example 5, it was effective to further charge air between the pair of glass substrates 21a and 22a.

In other words, in this Example 7, a gap correction step J for correcting the gap between the pair of glass substrates 21a and 22a by again charging air was added before Step I but after setting of the seal portion 23. This Step J could eliminate the surface swell of the glass substrate 21a having a small thickness to correct the gap between the pair of glass substrates 21a and 22a, and to thus eliminate the occurrence of the Newton's rings.

EXAMPLE 8

Each of the foregoing embodiments charged the gas into the gap between the pair of glass substrates 21a and 22a as means for expanding the gap. This Example 8 enlarged the gap by causing the deformation of the glass substrates by using a jig. Incidentally, the construction and the material of the pair of glass substrates 21a and 22a used in Example 8, the film structure formed on these substrates and the material of the seal portion 23 were the same as those of Example 5.

Figure 38:
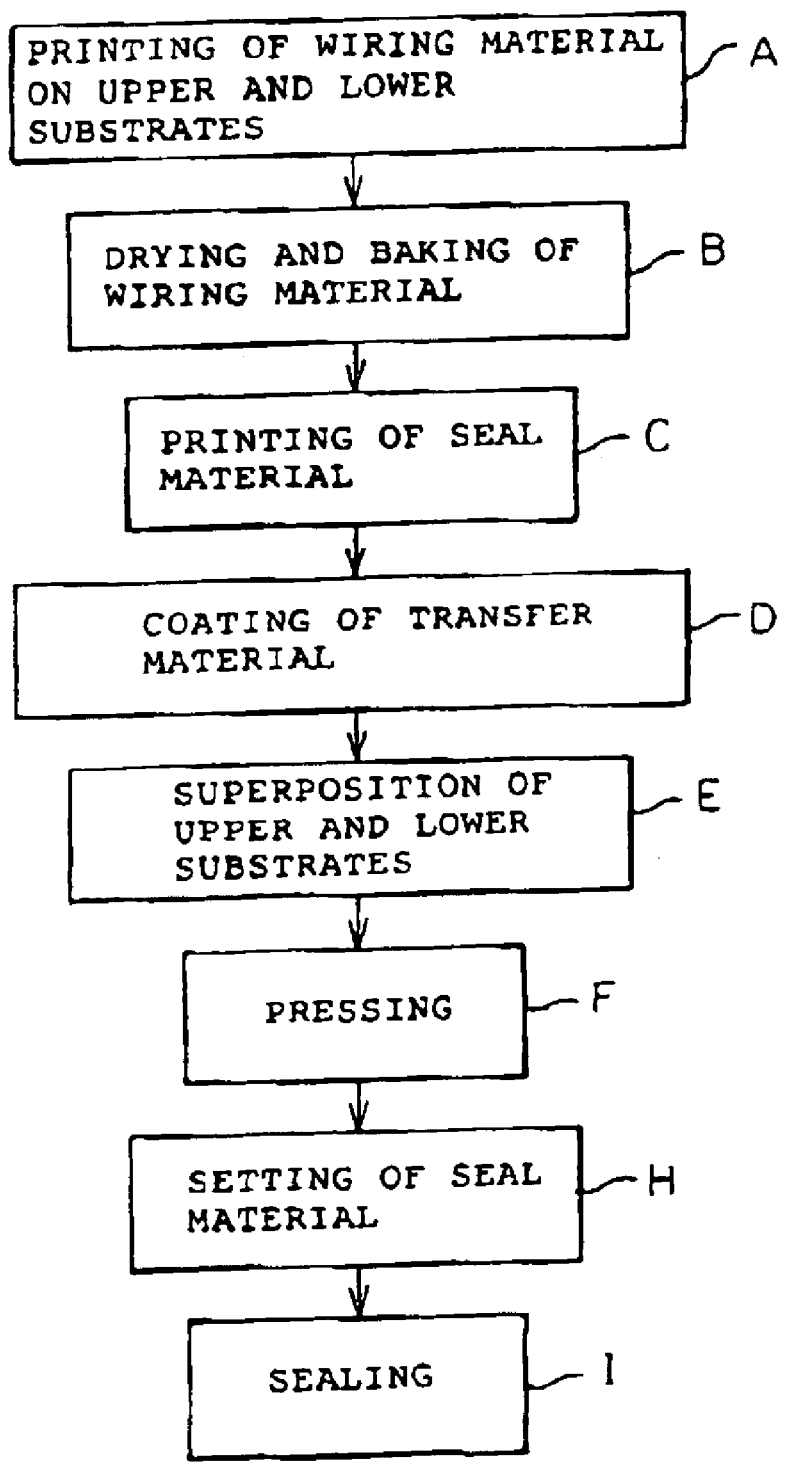
FIG. 38 is a flowchart useful for explaining a production method of the embodiment 8.
Figure 39:
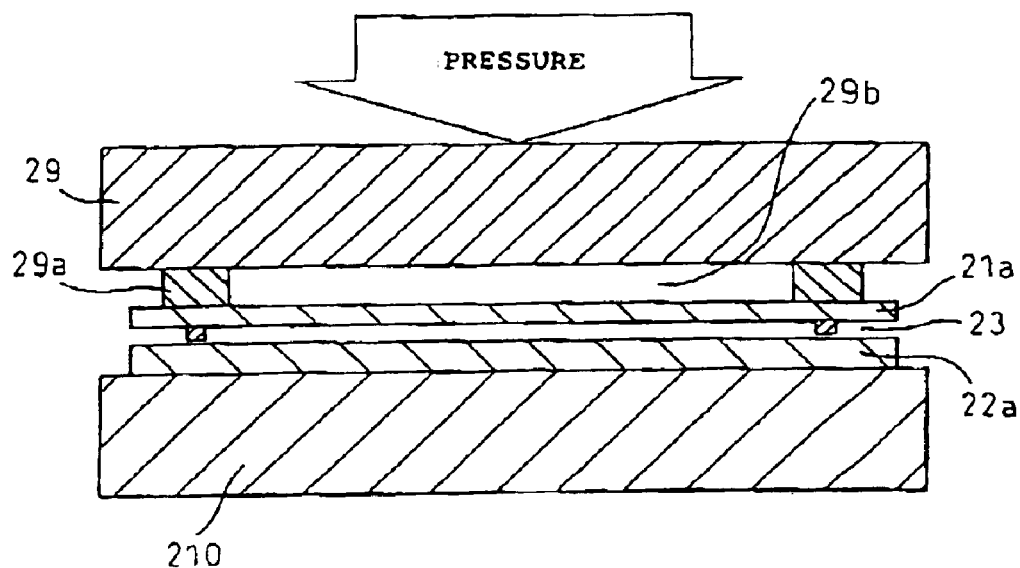
FIG. 39 is a sectional view useful for explaining a jig used in the embodiment 8.
Figure 40:
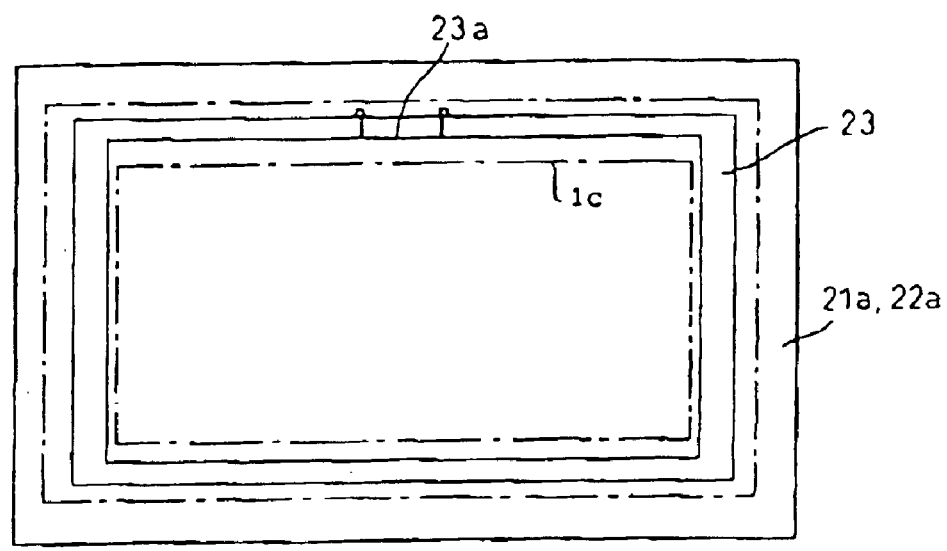
FIG. 40 is a plan view showing a pair of glass substrates used in the embodiment 8.

Referring to FIGS. 38 to 40, the pair of glass substrates 21a and 22a were superposed in Steps A to E, and are clamped between upper and lower jigs 29 and 210 in Step F as shown in FIG. 39. The upper jig 29 had projections 29a having an outer circumferential surface matching with the shape of the seal portion 23 around its outer circumference. As a result, an area 29b encompassed by the projections 29a was defined. The lower jig 210 has a planar shape.

Figure 41:
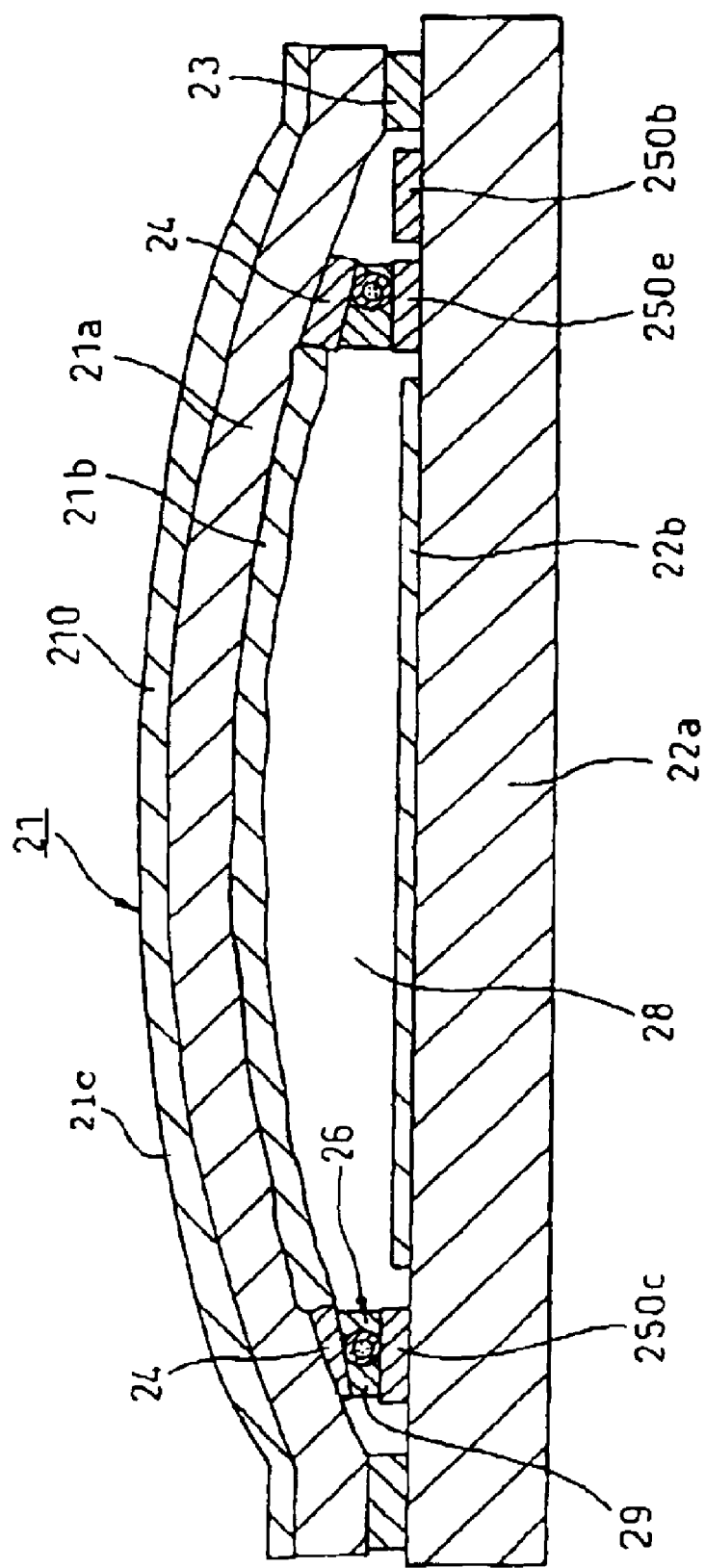
FIG. 41 is a sectional view showing the touch area produced in the embodiment 8.
Figure 42:
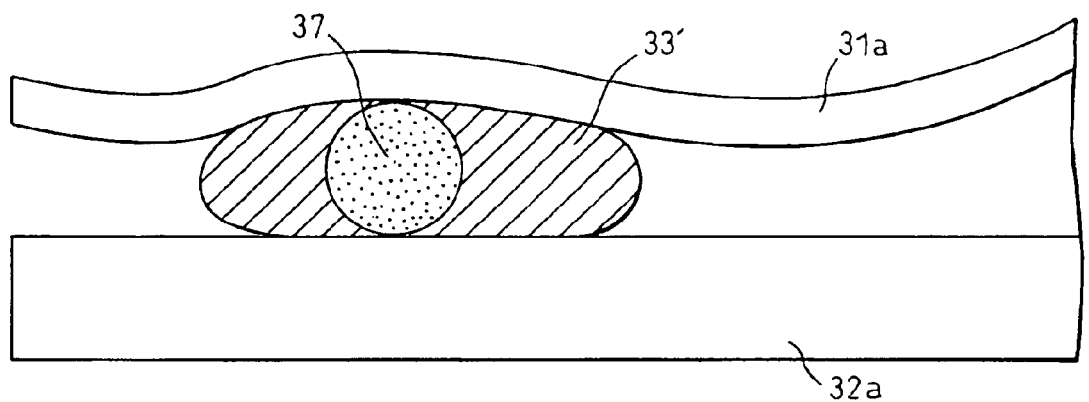
FIG. 42 is a sectional view useful for explaining a prior art example.
Figure 43:
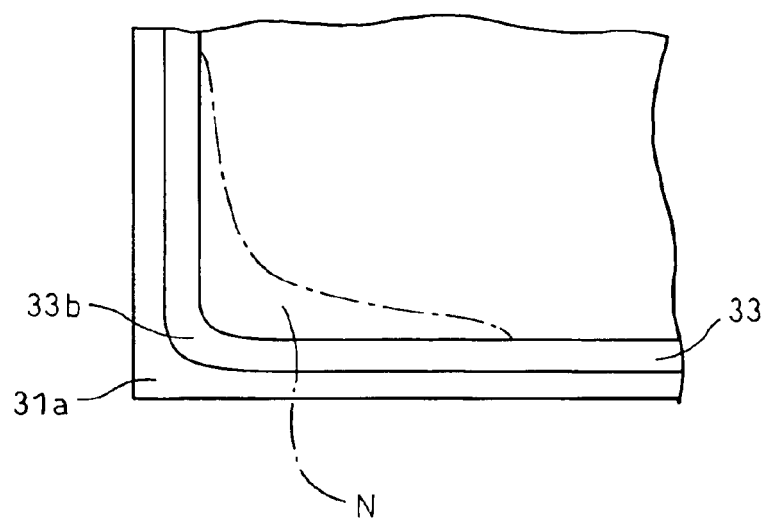
FIG. 43 is a plan view useful for explaining a prior art example.

The pair of glass substrates 21a and 22a was pressed by the jigs at a pressure of 0.1 to 3 Kgf/cm². The area 29b of the jig 29 did not impart pressure to the touch area 21c of the glass substrate 21a, but the pressure was applied to only the portion corresponding to the seal portion 23 (indicated by one-dot-chain line in FIG. 40). Because the pressure was applied in this way to only the portion corresponding to the seal portion 23, the outer peripheral portion of the glass substrate 21a that was as thin as 0.4 mm was reduced and undergoes deformation to a thickness of 3 μm throughout the entire periphery. As a result, the gap between the pair of glass substrates 21a and 22a was small in the proximity of the seal portion 23 and was great in the touch area 1c, and these substrates 21a and 22a described the drum-like convex shape as shown in FIG. 41.

In the next step H, while the jigs 29 and 210 clamped the glass substrates 21a and 22a to impart the pressure to the substrates as described above the substrates 21a and 22a were left standing at 150° C. for one hour inside the furnace in the same way as in Example 5.

After the seal portion 23 was set, the pair of glass substrates 21a and 22a was withdrawn from the furnace and were naturally cooled down to the room temperature. When these glass substrates 21a and 22a were examined, they kept, as such, the drum-like shape before setting of the seal portion 23. At this time, the occurrence of the Newton's rings was not confirmed.

Next, in Step I, the seal port 23a of the seal portion 23 (see FIG. 40) was sealed with a UV setting type resin.

[Other Embodiments]

The invention is not limited to the embodiments described above. For example, the seal portion 23 is formed of the thermosetting resin but may of course be formed of the UV setting type resin. The gas to be charged between the pair of glass substrates 21a and 22a may of course be an inert gas besides air.

In the foregoing Example 6, the corner spacer 211 is formed of the resist and expands the opposing gap between the glass substrates 21 and 22a at the portion corresponding to each corner 23b of the seal portion 23. However, it is also possible to employ the following method. For example, the spacer is not mixed with the thermosetting resin for forming the seal portion 23, and the resin is shaped into the shape of the seal portion by using the dispenser or printing. Next, the spacer is applied to the portion of this thermosetting resin corresponding to the corner of the seal portion.

According to this method, the resin is crushed under the state where the portion corresponding to the thermosetting resin is pressed, but the spacer portion is not crushed. In consequence, the opposing gap between the glass substrates 21a and 22a expands from the resin towards the spacer.

In Example 6, the seal portion 23 is set in step H while the pressure is applied to the portion corresponding to the seal portion 23, but the seal portion 23 may of course be set without the application of the pressure.

Further, the glass substrate 21a having the touch area 21c is caused to undergo deformation to describe the drum shape among the pair of glass substrates 21a and 22a. However, the shape is not limited to the drum shape. It is of course possible to cause deformation of not only the glass substrate 21a but also the glass substrate 22a so as to expand the gap of the space 28 between the substrates.

Though the foregoing embodiments use the glass substrate as the transparent insulating substrate, a transparent resin substrate may of course be used.

As described above, it is one of the objects of this invention to provide a touch panel that avoids the occurrence of the Newton's rings. To solve this problem, in a touch panel 1 including a pair of transparent glass substrates 1a and 2a each having a transparent conductive film and so arranged as to oppose each other through a seal portion 3 and to define a space 8 between them, corners 3b are formed on the seal portion 3 in such a fashion as to correspond to the corners of the glass substrates 1a and 2a, and the sectional shape of at least the corner portion 3b of the seal portion is set so that it is wide at the portion adjacent to the inside of the space 8 and is relatively narrow at the portion adjacent to the outside of the space 8. In this way, it is possible to avoid the occurrence of the Newton's rings that are particularly likely to occur at the corners between the glass substrates 1a and 2a.

What is claimed is:

1. A touch panel including a pair of transparent glass substrates each having a transparent conductive film, and arranged in such a fashion as to oppose each other on the side of said transparent conductive films and to be bonded to each other through a seal portion, wherein a thickness of said seal portion is set to be not greater than 5 μm (exclusive of 0); one of said glass substrates has a touch area, and a thickness of said one glass substrate is from 0.3 mm to 0.4 mm; a Young's modulus of said one glass substrate is from 730,000 kgf/cm² to 750,000 kgf/cm²; said seal portion is formed of a thermosetting type epoxy resin having a moisture permeability not exceeding $8 \times 10^{-12}$ g·cm/cm²·sec·cmHg when said seal portion is left standing under a condition of 65° C. and 95% RH; said touch panel further includes a wiring portion connected to said transparent conductive film of either one of said pair of glass substrates, and a wiring portion formed on the other of said glass substrates; said touch panel further includes a transfer portion for electrically connecting both of said wiring portions, disposed between both of said wiring portions; said transfer portion is positioned more inward than said seal portion between said pair of glass substrates; and a sum of the thickness t1 of said transfer portion and both of said wiring portions and a thickness t2 of said seal portion satisfy the relation t1>t2.

2. A touch panel according to claim 1, wherein the thickness of said one glass substrate is 0.4 mm.

3. A touch panel according to claim 1, wherein said one substrates having said touch area among said pair of glass substrates has an outwardly protruding shape as said relation t1>t2 is satisfied.

4. A touch panel according to claim 1, wherein said transfer portion comprises electrically conductive particles being resin particles with metal films plated on the surfaces of said resin particles.

5. A touch panel according to claim 1, wherein said wiring portion comprises a baked body of an organic metal compound.

6. A touch panel according to claim 1, which is used for an automobile.

7. A touch panel according to claim 6, which is disposed on a display side of a display device for navigation.

8. A touch panel according to claim 7, wherein said display device is a liquid crystal display.

9. A display device including said touch panel according to claim 1 and a display device, wherein said touch panel is disposed on a display side of said display device.

10. A display device according to claim 9, wherein said display is a liquid crystal display device.

11. A method for producing a touch panel including a pair of transparent glass substrates each having a transparent conductive film, and arranged in such a fashion to oppose each other on the side of said transparent conductive films through a seal portion, one of said glass substrates having a touch area, said method comprising the steps of:
preparing a pair of glass substrates each having a transparent conductive film formed thereon, either one of said glass substrates having a seal material formed thereon;
pressing said pair of glass substrates and setting said seal material to not greater than 8 μm (exclusive of 0) as a predetermined thickness;
expanding a gap between said pair of glass substrates; and
setting said seal material to provide the predetermined thickness thereof of not greater than 8 μm.
wherein said step of preparing said pair of glass substrates includes the steps of:
preparing a pair of glass substrates each having said transparent conductive film in advance formed thereon;
forming a wiring portion to be connected to said transparent conductive film of either one of said pair of glass substrates;
forming a wiring portion on the other of said glass substrates; and
forming a seal material on said one glass substrate in such a fashion as to be positioned between said pair of glass substrates more outside than both of said wiring portions and said transparent conductive films;
wherein said transparent conductive film on each of said pair of glass substrates is directly exposed to said space on the entire surface with the exception of the connection portion with said wiring portions;
wherein said step of preparing said pair of glass substrates includes the step of forming a seal material on said pair of glass substrates and forming a transfer portion on said wiring portion of said one glass substrate; said transfer portion is formed of conductive particles comprising resin particles and metal films plated onto surface of said resin particles; and said wiring portions of said pair of glass substrates are electrically connected through said transfer portion when said pair of glass substrates are so arranged as to oppose each other through said seal material.

12. A method for producing a touch panel according to claim 11, wherein said gap is charged into said space between said pair of glass substrates to expand said gap.

13. A method for producing a touch panel according to claim 11, wherein a gas is charged into said space under the state where a pressing force is not imparted to said pair of glass substrates.

14. A method for producing a touch panel according to claim 11, wherein setting of said seal material is conducted under the state where a pressing force is not imparted to said pair of glass substrates.

15. A touch panel for an automobile, comprising first and second transparent glass substrates each having a transparent conductive film, and arranged in such a fashion to oppose each other on the side of the transparent conductive films and to form a space between them, and to be bonded to each other through a seal portion, wherein
the first glass substrate has a touch area;
a thickness glass substrate is from 0.3 mm to 0.4 mm;
a Young's modulus of the first glass substrates is from 730,000 kgf/cm$^2$ to 750,000 kgf/cm$^2$.
an operation load at the touch area is set to 110 gf±90 gf;
a thickness of the seal portion is set to a range of from 4 μm; and
the seal portion has a moisture permeability not exceeding 8 ×10$^{-12}$ g.cm/cm$^2$.sec.cmHg when said seal portion is left standing under a condition of 65° C. and 95% RH.

16. A touch panel for an automobile according to claim 15, wherein said touch panel further comprises
a first wiring portion connected to said transparent conductive film of a first glass substrates, and
a second wiring portion formed on the second glass substrates;
said touch panel further comprises a fransfer portion for electrically connecting both the first and second wiring portions, disposed between the first and second wiring portions;
said transfer portion is positioned more inward as compared to said seal portion between the first and second glass substrates; and
a sum of the thickness t1 of said transfer portion and the first and second wiring portions and thickness t2 of said seal portion satisifies the relation (t1>t2).

17. A touch panel for an automobile according to claim 16, wherein the first substrate has an outwardly protruding shape when said relation (t1>t2) is satisfied.

18. A touch panel for an automobile according to claim 16, wherein said transparent conductive film on each of the first and second glass substrates is directly exposed to a space defined between the first and second glass substrates on the entire surface with the exception of a connection portion with said wiring portions.

19. A touch panel for an automobile according to claim 16, wherein said transfer portion comprises electrically conductive particles being resin particles with metal films plated on the surfaces of said resin particles.

20. A touch panel for an automobile according to claim 16, wherein said wiring portion is covered with said seal portion.

21. A touch panel for an automobile according to claim 16, wherein said wiring comprises a baked body of an organic metal compound.

22. A touch panel for an automobile according to claim 15, wherein the thickness of the first glass substrate is about 0.4 mm, and the thickness of said seal portion is set to a range of from 2 μm to 8 μm.

23. A touch panel for an automobile according to claim 15, wherein said seal portion is formed of a thermosetting type epoxy resin.

24. A touch panel for an automobile according to claim 15, wherein the touch panel is disposed on a display side device for navigation.

25. A touch panel for an automobile according to claim 24, wherein said display device is a liquid crystal display device.

26. A device including said touch panel according to claim 15 and a display device, wherein said touch panel is disposed on a display side of said display device.

27. A display device according to claim 26, wherein said display is a liquid crystal display device.

* * * * *